US009996229B2

(12) United States Patent
Erenrich et al.

(10) Patent No.: US 9,996,229 B2
(45) Date of Patent: *Jun. 12, 2018

(54) SYSTEMS AND METHODS FOR ANALYZING PERFORMANCE OF AN ENTITY

(71) Applicant: PALANTIR TECHNOLOGIES INC., Palo Alto, CA (US)

(72) Inventors: Daniel Erenrich, Mountain View, CA (US); Anirvan Mukherjee, Mountain View, CA (US); William Dwyer, Palo Alto, CA (US)

(73) Assignee: Palantir Technologies Inc., Palo Alto, CA (US)

( * ) Notice: Subject to any disclaimer, the term of this patent is extended or adjusted under 35 U.S.C. 154(b) by 733 days.

This patent is subject to a terminal disclaimer.

(21) Appl. No.: 14/571,060

(22) Filed: Dec. 15, 2014

(65) Prior Publication Data

US 2015/0100907 A1 Apr. 9, 2015

Related U.S. Application Data

(63) Continuation of application No. 14/045,720, filed on Oct. 3, 2013, now Pat. No. 8,938,686.

(51) Int. Cl.
*G06F 3/048* (2013.01)
*G06F 3/0484* (2013.01)
(Continued)

(52) U.S. Cl.
CPC ........ *G06F 3/0484* (2013.01); *G06F 17/2247* (2013.01); *G06Q 10/0639* (2013.01); *G06Q 10/06395* (2013.01)

(58) Field of Classification Search
None
See application file for complete search history.

(56) References Cited

U.S. PATENT DOCUMENTS 4,899,161 A 2/1990 Morin et al.
4,958,305 A 9/1990 Piazza
(Continued)

FOREIGN PATENT DOCUMENTS

AU 2014250678 2/2016
AU 2014203669 5/2016
(Continued)

OTHER PUBLICATIONS

"A First Look: Predicting Market Demand for Food Retail using a Huff Analysis," TRF Policy Solutions, Jul. 2012, pp. 30.
(Continued)

*Primary Examiner* — Hua Lu
(74) *Attorney, Agent, or Firm* — Sheppard Mullin Richter & Hampton LLP

(57) ABSTRACT

Systems and methods are provided for analyzing entity performance. In accordance with one implementation, a method is provided that includes receiving data associated with a geographic region and transforming the received data into an object model. The method also includes analyzing the object model to associate the received data with a plurality of entities and to associate the received data with a plurality of sub-geographic regions of the geographic region. The method also includes applying a prediction model to the plurality of sub-geographic regions using the object model to determine a predicted performance for at least one entity of the plurality of entities. Further, the method includes determining actual performance for the at least one entity and providing a user interface that includes information associated with the predicted performance, the actual performance, or a combination of the predicted performance and the actual performance.

20 Claims, 15 Drawing Sheets

(51) Int. Cl.
  *G06F 17/22* (2006.01)
  *G06Q 10/06* (2012.01)

(56) References Cited

U.S. PATENT DOCUMENTS

| | | |
|---|---|---|
| 5,109,399 A | 4/1992 | Thompson |
| 5,241,625 A | 8/1993 | Epard et al. |
| 5,329,108 A | 7/1994 | Lamoure |
| 5,412,769 A | 5/1995 | Maruoka et al. |
| 5,414,838 A | 5/1995 | Kolton et al. |
| 5,444,819 A | 8/1995 | Negishi |
| 5,454,104 A | 9/1995 | Steidlmayer et al. |
| 5,632,009 A | 5/1997 | Rao et al. |
| 5,632,987 A | 5/1997 | Rao et al. |
| 5,670,987 A | 9/1997 | Doi et al. |
| 5,754,182 A | 5/1998 | Kobayashi |
| 5,781,704 A | 7/1998 | Rossmo |
| 5,798,769 A | 8/1998 | Chiu et al. |
| 5,819,226 A | 10/1998 | Gopinathan et al. |
| 5,819,238 A | 10/1998 | Fernholz |
| 5,826,021 A | 10/1998 | Mastors et al. |
| 5,832,218 A | 11/1998 | Gibbs et al. |
| 5,845,300 A | 12/1998 | Comer |
| 5,872,973 A | 2/1999 | Mitchell et al. |
| 5,878,434 A | 3/1999 | Draper et al. |
| 5,892,900 A | 4/1999 | Ginter et al. |
| 5,897,636 A | 4/1999 | Kaeser |
| 5,966,706 A | 10/1999 | Biliris et al. |
| 6,006,242 A | 12/1999 | Poole et al. |
| 6,012,042 A | 1/2000 | Black et al. |
| 6,057,757 A | 5/2000 | Arrowsmith et al. |
| 6,065,026 A | 5/2000 | Cornelia et al. |
| 6,072,942 A | 6/2000 | Stockwell et al. |
| 6,091,956 A | 7/2000 | Hollenberg |
| 6,094,643 A | 7/2000 | Anderson et al. |
| 6,101,479 A | 8/2000 | Shaw |
| 6,104,401 A | 8/2000 | Parsons |
| 6,134,582 A | 10/2000 | Kennedy |
| 6,157,747 A | 12/2000 | Szeliski et al. |
| 6,161,098 A | 12/2000 | Wallman |
| 6,173,067 B1 | 1/2001 | Payton et al. |
| 6,178,432 B1 | 1/2001 | Cook et al. |
| 6,219,053 B1 | 4/2001 | Tachibana et al. |
| 6,232,971 B1 | 5/2001 | Haynes |
| 6,237,138 B1 | 5/2001 | Hameluck et al. |
| 6,243,706 B1 | 6/2001 | Moreau et al. |
| 6,243,717 B1 | 6/2001 | Gordon et al. |
| 6,247,019 B1 | 6/2001 | Davies |
| 6,279,018 B1 | 8/2001 | Kudrolli et al. |
| 6,289,338 B1 | 9/2001 | Stoffel et al. |
| 6,313,833 B1 | 11/2001 | Knight |
| 6,341,310 B1 | 1/2002 | Leshem et al. |
| 6,349,315 B1 | 2/2002 | Sonoyama et al. |
| 6,366,933 B1 | 4/2002 | Ball et al. |
| 6,369,835 B1 | 4/2002 | Lin |
| 6,389,289 B1 | 5/2002 | Voce et al. |
| 6,414,683 B1 | 7/2002 | Gueziec |
| 6,430,305 B1 | 8/2002 | Decker |
| 6,456,997 B1 | 9/2002 | Shukla |
| 6,463,404 B1 | 10/2002 | Appleby |
| 6,483,509 B1 | 11/2002 | Rabenhorst |
| 6,496,817 B1 | 12/2002 | Whang et al. |
| 6,513,019 B2 | 1/2003 | Lewis |
| 6,519,627 B1 | 2/2003 | Dan et al. |
| 6,523,019 B1 | 2/2003 | Borthwick |
| 6,529,900 B1 | 3/2003 | Patterson et al. |
| 6,532,449 B1 | 3/2003 | Goertzel et al. |
| 6,549,944 B1 | 4/2003 | Weinberg et al. |
| 6,560,620 B1 | 5/2003 | Ching |
| 6,581,068 B1 | 6/2003 | Bensoussan et al. |
| 6,594,672 B1 | 7/2003 | Lampson et al. |
| 6,631,496 B1 | 10/2003 | Li et al. |
| 6,640,231 B1 | 10/2003 | Andersen et al. |
| 6,642,945 B1 | 11/2003 | Sharpe |
| 6,662,103 B1 | 12/2003 | Skolnick et al. |
| 6,662,202 B1 | 12/2003 | Krusche et al. |
| 6,674,434 B1 | 1/2004 | Chojnacki et al. |
| 6,714,936 B1 | 3/2004 | Nevin, III |
| 6,748,481 B1 | 6/2004 | Parry et al. |
| 6,757,445 B1 | 6/2004 | Knopp |
| 6,775,675 B1 | 8/2004 | Nwabueze et al. |
| 6,801,201 B2 | 10/2004 | Escher |
| 6,820,135 B1 | 11/2004 | Dingman |
| 6,828,920 B2 | 12/2004 | Owen et al. |
| 6,839,745 B1 | 1/2005 | Dingari et al. |
| 6,876,981 B1 | 4/2005 | Berckmans |
| 6,877,137 B1 | 4/2005 | Rivette et al. |
| 6,907,426 B2 | 6/2005 | Hellerstein et al. |
| 6,920,453 B2 | 7/2005 | Mannila et al. |
| 6,944,821 B1 | 9/2005 | Bates et al. |
| 6,976,210 B1 | 12/2005 | Silva et al. |
| 6,978,419 B1 | 12/2005 | Kantrowitz |
| 6,980,984 B1 | 12/2005 | Huffman et al. |
| 6,985,950 B1 | 1/2006 | Hanson et al. |
| 7,036,085 B2 | 4/2006 | Barros |
| 7,043,449 B1 | 5/2006 | Li et al. |
| 7,043,702 B2 | 5/2006 | Chi et al. |
| 7,055,110 B2 | 5/2006 | Kupka et al. |
| 7,058,648 B1 | 6/2006 | Lightfoot et al. |
| 7,086,028 B1 | 8/2006 | Davis et al. |
| 7,089,541 B2 | 8/2006 | Ungar |
| 7,111,231 B1 | 9/2006 | Huck et al. |
| 7,133,409 B1 | 11/2006 | Willardson |
| 7,139,800 B2 | 11/2006 | Bellotti et al. |
| 7,158,878 B2 | 1/2007 | Rasmussen et al. |
| 7,162,475 B2 | 1/2007 | Ackerman |
| 7,168,039 B2 | 1/2007 | Bertram |
| 7,171,427 B2 | 1/2007 | Witkowski |
| 7,174,377 B2 | 2/2007 | Bernard et al. |
| 7,181,423 B2 | 2/2007 | Blanchard et al. |
| 7,185,065 B1 | 2/2007 | Holtzman et al. |
| 7,213,030 B1 | 5/2007 | Jenkins |
| 7,216,299 B2 | 5/2007 | Knight |
| 7,237,192 B1 | 6/2007 | Stephenson et al. |
| 7,246,090 B1 | 7/2007 | Thomas |
| 7,269,786 B1 | 9/2007 | Malloy et al. |
| 7,278,105 B1 | 10/2007 | Kitts |
| 7,290,698 B2 | 11/2007 | Poslinski et al. |
| 7,333,998 B2 | 2/2008 | Heckerman et al. |
| 7,356,504 B2 | 4/2008 | Müller |
| 7,370,047 B2 | 5/2008 | Gorman |
| 7,375,732 B2 | 5/2008 | Arcas |
| 7,379,811 B2 | 5/2008 | Rasmussen et al. |
| 7,379,903 B2 | 5/2008 | Joseph |
| 7,392,254 B1 | 6/2008 | Jenkins |
| 7,401,038 B2 | 7/2008 | Masuda |
| 7,403,921 B2 | 7/2008 | Tanpoco et al. |
| 7,403,922 B1 | 7/2008 | Lewis et al. |
| 7,403,942 B1 | 7/2008 | Bayliss |
| 7,426,654 B2 | 9/2008 | Adams et al. |
| 7,437,728 B2 | 10/2008 | Stackhouse et al. |
| 7,441,182 B2 | 10/2008 | Beilinson et al. |
| 7,451,397 B2 | 11/2008 | Weber et al. |
| 7,454,466 B2 | 11/2008 | Bellotti et al. |
| 7,457,706 B2 | 11/2008 | Malero et al. |
| 7,461,158 B2 | 12/2008 | Rider et al. |
| 7,467,375 B2 | 12/2008 | Tondreau et al. |
| 7,469,238 B2 | 12/2008 | Satchwell |
| 7,487,139 B2 | 2/2009 | Fraleigh et al. |
| 7,502,786 B2 | 3/2009 | Liu et al. |
| 7,519,470 B2 | 4/2009 | Brasche et al. |
| 7,525,422 B2 | 4/2009 | Bishop et al. |
| 7,529,195 B2 | 5/2009 | Gorman |
| 7,529,727 B2 | 5/2009 | Arning et al. |
| 7,529,734 B2 | 5/2009 | Dirisala |
| 7,533,069 B2 | 5/2009 | Fairweather |
| 7,539,666 B2 | 5/2009 | Ashworth et al. |
| 7,542,934 B2 | 6/2009 | Markel |
| 7,558,677 B2 | 6/2009 | Jones |
| 7,574,409 B2 | 8/2009 | Patinkin |
| 7,574,428 B2 | 8/2009 | Leiserowitz et al. |
| 7,579,965 B2 | 8/2009 | Bucholz |
| 7,587,352 B2 | 9/2009 | Arnott |
| 7,590,582 B2 | 9/2009 | Dunne |

(56) References Cited

U.S. PATENT DOCUMENTS

| | | | |
|---|---|---|---|
| 7,596,285 B2 | 9/2009 | Brown et al. |
| 7,614,006 B2 | 11/2009 | Molander |
| 7,617,232 B2 | 11/2009 | Gabbert et al. |
| 7,620,582 B2 | 11/2009 | Masuda |
| 7,620,628 B2 | 11/2009 | Kapur et al. |
| 7,627,489 B2 | 12/2009 | Schaeffer et al. |
| 7,627,812 B2 | 12/2009 | Chamberlain et al. |
| 7,630,931 B1 | 12/2009 | Rachev et al. |
| 7,634,717 B2 | 12/2009 | Chamberlain et al. |
| 7,657,478 B2 | 2/2010 | De Diego |
| 7,663,621 B1 | 2/2010 | Allen et al. |
| 7,685,042 B1 | 3/2010 | Monroe et al. |
| 7,685,083 B2 | 3/2010 | Fairweather |
| 7,703,021 B1 | 4/2010 | Flam |
| 7,706,817 B2 | 4/2010 | Bamrah et al. |
| 7,712,049 B2 | 5/2010 | Williams et al. |
| 7,716,077 B1 | 5/2010 | Mikurak |
| 7,716,227 B1 | 5/2010 | Hao et al. |
| 7,725,530 B2 | 5/2010 | Sah et al. |
| 7,725,547 B2 | 5/2010 | Albertson et al. |
| 7,725,728 B2 | 5/2010 | Ama et al. |
| 7,730,082 B2 | 6/2010 | Sah et al. |
| 7,730,109 B2 | 6/2010 | Rohrs et al. |
| 7,739,246 B2 | 6/2010 | Mooney et al. |
| 7,756,843 B1 | 7/2010 | Palmer |
| 7,757,220 B2 | 7/2010 | Griffith et al. |
| 7,765,489 B1 | 7/2010 | Shah |
| 7,770,100 B2 | 8/2010 | Chamberlain et al. |
| 7,791,616 B2 | 9/2010 | Ioup et al. |
| 7,805,457 B1 | 9/2010 | Viola et al. |
| 7,809,703 B2 | 10/2010 | Balabhadrapatruni et al. |
| 7,818,658 B2 | 10/2010 | Chen |
| 7,835,966 B2 | 11/2010 | Satchwell |
| 7,848,995 B2 | 12/2010 | Dalal |
| 7,870,493 B2 | 1/2011 | Pall et al. |
| 7,872,647 B2 | 1/2011 | Mayer et al. |
| 7,877,421 B2 | 1/2011 | Berger et al. |
| 7,880,921 B2 | 2/2011 | Dattilo et al. |
| 7,894,984 B2 | 2/2011 | Rasmussen et al. |
| 7,899,611 B2 | 3/2011 | Downs et al. |
| 7,899,796 B1 | 3/2011 | Borthwick et al. |
| 7,912,842 B1 | 3/2011 | Bayliss |
| 7,917,376 B2 | 3/2011 | Bellin et al. |
| 7,920,963 B2 | 4/2011 | Jouline et al. |
| 7,933,862 B2 | 4/2011 | Chamberlain et al. |
| 8,085,268 B2 | 4/2011 | Carrino et al. |
| 7,941,321 B2 | 5/2011 | Greenstein et al. |
| 7,941,336 B1 | 5/2011 | Robin-Jan |
| 7,945,852 B1 | 5/2011 | Pilskains |
| 7,958,147 B1 | 6/2011 | Turner et al. |
| 7,962,281 B2 | 6/2011 | Rasmussen et al. |
| 7,962,495 B2 | 6/2011 | Jain et al. |
| 7,962,848 B2 | 6/2011 | Bertram |
| 7,966,199 B1 | 6/2011 | Frasher |
| 7,970,240 B1 | 6/2011 | Chao et al. |
| 7,971,150 B2 | 6/2011 | Raskutti et al. |
| 7,984,374 B2 | 6/2011 | Caro et al. |
| 8,001,465 B2 | 8/2011 | Kudrolli et al. |
| 8,001,482 B2 | 8/2011 | Bhattiprolu et al. |
| 8,010,507 B2 | 8/2011 | Poston et al. |
| 8,010,545 B2 | 8/2011 | Stefik et al. |
| 8,015,487 B2 | 9/2011 | Roy et al. |
| 8,024,778 B2 | 9/2011 | Cash et al. |
| 8,036,632 B1 | 10/2011 | Cona et al. |
| 8,036,971 B2 | 10/2011 | Aymeloglu et al. |
| 8,041,714 B2 | 10/2011 | Aymeloglu et al. |
| 8,046,283 B2 | 10/2011 | Burns |
| 8,054,756 B2 | 11/2011 | Chand et al. |
| 8,065,080 B2 | 11/2011 | Koch |
| 8,073,857 B2 | 12/2011 | Sreekanth |
| 8,103,543 B1 | 1/2012 | Zwicky |
| 8,112,425 B2 | 2/2012 | Baum et al. |
| 8,117,022 B2 | 2/2012 | Linker |
| 8,126,848 B2 | 2/2012 | Wagner |
| 8,134,457 B2 | 3/2012 | Velipasalar et al. |
| 8,145,703 B2 | 3/2012 | Frishert et al. |
| 8,185,819 B2 | 5/2012 | Sah et al. |
| 8,196,184 B2 | 6/2012 | Amirov et al. |
| 8,214,361 B1 | 7/2012 | Sandler et al. |
| 8,214,490 B1 | 7/2012 | Vos et al. |
| 8,214,764 B2 | 7/2012 | Gemmell et al. |
| 8,219,550 B2 | 7/2012 | Merz et al. |
| 8,225,201 B2 | 7/2012 | Michael |
| 8,229,902 B2 | 7/2012 | Vishniac et al. |
| 8,229,947 B2 | 7/2012 | Fujinaga |
| 8,230,333 B2 | 7/2012 | Decherd et al. |
| 8,271,461 B2 | 9/2012 | Pike et al. |
| 8,280,880 B1 | 10/2012 | Aymeloglu et al. |
| 8,290,838 B1 | 10/2012 | Thakur et al. |
| 8,290,926 B2 | 10/2012 | Ozzie et al. |
| 8,290,942 B2 | 10/2012 | Jones et al. |
| 8,301,464 B1 | 10/2012 | Cave et al. |
| 8,301,904 B1 | 10/2012 | Gryaznov |
| 8,302,855 B2 | 11/2012 | Ma et al. |
| 8,312,367 B2 | 11/2012 | Foster |
| 8,312,546 B2 | 11/2012 | Alme |
| 8,325,178 B1 | 12/2012 | Doyle, Jr. |
| 8,326,727 B2 | 12/2012 | Aymeloglu et al. |
| 8,352,881 B2 | 1/2013 | Champion et al. |
| 8,364,642 B1 | 1/2013 | Garrod |
| 8,368,695 B2 | 2/2013 | Howell et al. |
| 8,386,377 B1 | 2/2013 | Xiong et al. |
| 8,392,556 B2 | 3/2013 | Goulet et al. |
| 8,397,171 B2 | 3/2013 | Klassen et al. |
| 8,400,448 B1 | 3/2013 | Doyle, Jr. |
| 8,412,707 B1 | 4/2013 | Mianji |
| 8,417,715 B1 | 4/2013 | Bruckhaus et al. |
| 8,422,825 B1 | 4/2013 | Neophytou et al. |
| 8,429,527 B1 | 4/2013 | Arbogast |
| 8,447,722 B1 | 5/2013 | Ahuja et al. |
| 8,452,790 B1 | 5/2013 | Mianji |
| 8,463,036 B1 | 6/2013 | Ramesh et al. |
| 8,473,454 B2 | 6/2013 | Evanitsky et al. |
| 8,484,115 B2 | 7/2013 | Aymeloglu et al. |
| 8,484,549 B2 | 7/2013 | Burr et al. |
| 8,489,331 B2 | 7/2013 | Kopf et al. |
| 8,489,641 B1 | 7/2013 | Seefeld et al. |
| 8,494,941 B2 | 7/2013 | Aymeloglu et al. |
| 8,494,984 B2 | 7/2013 | Hwang et al. |
| 8,508,533 B2 | 8/2013 | Cervelli et al. |
| 8,510,743 B2 | 8/2013 | Hackborn et al. |
| 8,514,082 B2 | 8/2013 | Cova et al. |
| 8,514,229 B2 | 8/2013 | Cervelli et al. |
| 8,515,207 B2 | 8/2013 | Chau |
| 8,554,579 B2 | 10/2013 | Tribble et al. |
| 8,554,653 B2 | 10/2013 | Falkenborg et al. |
| 8,554,709 B2 | 10/2013 | Goodson et al. |
| 8,554,719 B2 | 10/2013 | McGrew |
| 8,560,413 B1 | 10/2013 | Quarterman |
| 8,564,596 B2 | 10/2013 | Carrino et al. |
| 8,577,911 B1 | 11/2013 | Stepinski et al. |
| 8,589,273 B2 | 11/2013 | Creeden et al. |
| 8,595,234 B2 | 11/2013 | Siripuapu et al. |
| 8,600,872 B1 | 12/2013 | Yan |
| 8,601,326 B1 | 12/2013 | Kirn |
| 8,620,641 B2 | 12/2013 | Farnsworth et al. |
| 8,639,552 B1 | 1/2014 | Chen et al. |
| 8,639,757 B1 | 1/2014 | Zang et al. |
| 8,646,080 B2 | 2/2014 | Williamson et al. |
| 8,666,861 B2 | 3/2014 | Li et al. |
| 8,676,857 B1 | 3/2014 | Adams et al. |
| 8,688,573 B1 | 4/2014 | Ruknoic et al. |
| 8,689,108 B1 | 4/2014 | Duffield et al. |
| 8,713,467 B1 | 4/2014 | Goldenberg et al. |
| 8,726,379 B1 | 5/2014 | Stiansen et al. |
| 8,732,574 B2 | 5/2014 | Burr et al. |
| 8,738,486 B2 | 5/2014 | McGeehan |
| 8,739,278 B2 | 5/2014 | Varghese |
| 8,799,799 B1 | 5/2014 | Cervelli et al. |
| 8,742,934 B1 | 6/2014 | Sarpy et al. |
| 8,744,890 B1 | 6/2014 | Bernier |
| 8,745,516 B2 | 6/2014 | Mason et al. |
| 8,781,169 B2 | 7/2014 | Jackson et al. |
| 8,787,939 B2 | 7/2014 | Papakipos et al. |

(56) References Cited

U.S. PATENT DOCUMENTS

| | | |
|---|---|---|
| 8,788,407 B1 | 7/2014 | Singh et al. |
| 8,798,354 B1 | 8/2014 | Bunzel et al. |
| 8,812,444 B2 | 8/2014 | Garrod et al. |
| 8,812,960 B1 | 8/2014 | Sun et al. |
| 8,830,322 B2 | 9/2014 | Nerayoff et al. |
| 8,832,594 B1 | 9/2014 | Thompson et al. |
| 8,838,538 B1 | 9/2014 | Landau et al. |
| 8,855,999 B1 | 10/2014 | Elliot |
| 8,868,537 B1 | 10/2014 | Colgrove et al. |
| 8,903,717 B2 | 12/2014 | Elliot |
| 8,917,274 B2 | 12/2014 | Ma et al. |
| 8,924,388 B2 | 12/2014 | Elliot et al. |
| 8,924,389 B2 | 12/2014 | Elliot et al. |
| 8,924,872 B1 | 12/2014 | Bogomolov et al. |
| 8,937,619 B2 | 1/2015 | Sharma et al. |
| 8,938,434 B2 | 1/2015 | Jain et al. |
| 8,938,686 B1 | 1/2015 | Erenrich et al. |
| 8,949,164 B1 | 2/2015 | Mohler |
| 9,009,171 B1 | 4/2015 | Grossman et al. |
| 9,009,827 B1 | 4/2015 | Albertson et al. |
| 9,021,260 B1 | 4/2015 | Falk et al. |
| 9,021,384 B1 | 4/2015 | Beard et al. |
| 9,032,531 B1 | 5/2015 | Scorvo et al. |
| 9,043,696 B1 | 5/2015 | Meiklejohn et al. |
| 9,043,894 B1 | 5/2015 | Dennison et al. |
| 9,058,315 B2 | 6/2015 | Burr et al. |
| 9,069,842 B2 | 6/2015 | Melby |
| 9,100,428 B1 | 8/2015 | Visbal |
| 9,105,000 B1 | 8/2015 | White et al. |
| 9,116,975 B2 | 8/2015 | Shankar et al. |
| 9,129,219 B1 | 9/2015 | Robertson et al. |
| 9,146,954 B1 | 9/2015 | Boe et al. |
| 9,230,060 B2 | 1/2016 | Friedlander et al. |
| 9,286,373 B2 | 3/2016 | Elliot et al. |
| 9,348,499 B2 | 5/2016 | Aymeloglu et al. |
| 9,348,851 B2 | 5/2016 | Kirn |
| 2001/0011243 A1 | 8/2001 | Dembo et al. |
| 2001/0027424 A1 | 10/2001 | Torigoe |
| 2002/0003539 A1 | 1/2002 | Abe |
| 2002/0007239 A1 | 1/2002 | Alcaly et al. |
| 2002/0007331 A1 | 1/2002 | Lo et al. |
| 2002/0026404 A1 | 2/2002 | Thompson |
| 2002/0030701 A1 | 3/2002 | Knight |
| 2002/0032677 A1 | 3/2002 | Morgenthaler et al. |
| 2002/0033848 A1 | 3/2002 | Sciammarella et al. |
| 2002/0035590 A1 | 3/2002 | Eibach et al. |
| 2002/0059126 A1 | 5/2002 | Ricciardi |
| 2002/0065708 A1 | 5/2002 | Senay et al. |
| 2002/0087570 A1 | 7/2002 | Jacquez et al. |
| 2002/0091707 A1 | 7/2002 | Keller |
| 2002/0095360 A1 | 7/2002 | Joao |
| 2002/0095658 A1 | 7/2002 | Shulman |
| 2002/0099870 A1 | 7/2002 | Miller et al. |
| 2002/0103705 A1 | 8/2002 | Brady |
| 2002/0116120 A1 | 8/2002 | Ruiz et al. |
| 2002/0130867 A1 | 9/2002 | Yang et al. |
| 2002/0138383 A1 | 9/2002 | Rhee |
| 2002/0147671 A1 | 10/2002 | Sloan et al. |
| 2002/0147805 A1 | 10/2002 | Leshem et al. |
| 2002/0156812 A1 | 10/2002 | Krasnoiarov et al. |
| 2002/0174201 A1 | 11/2002 | Ramer et al. |
| 2002/0194058 A1 | 12/2002 | Eldering |
| 2002/0194119 A1 | 12/2002 | Wright et al. |
| 2003/0009392 A1 | 1/2003 | Perkowski |
| 2003/0009399 A1 | 1/2003 | Boerner |
| 2003/0028560 A1 | 2/2003 | Kudrolli et al. |
| 2003/0036848 A1 | 2/2003 | Sheha et al. |
| 2003/0036927 A1 | 2/2003 | Bowen |
| 2003/0039948 A1 | 2/2003 | Donahue |
| 2003/0052896 A1 | 3/2003 | Higgins et al. |
| 2003/0061132 A1 | 3/2003 | Mason et al. |
| 2003/0065605 A1 | 4/2003 | Gatto |
| 2003/0065606 A1 | 4/2003 | Satchwell |
| 2003/0065607 A1 | 4/2003 | Satchwell |
| 2003/0074187 A1 | 4/2003 | Ait-Mokhtar et al. |
| 2003/0078827 A1 | 4/2003 | Hoffman |
| 2003/0088438 A1 | 5/2003 | Maughan et al. |
| 2003/0093401 A1 | 5/2003 | Czahkowski et al. |
| 2003/0103049 A1 | 6/2003 | Kindratenko et al. |
| 2003/0105759 A1 | 6/2003 | Bess et al. |
| 2003/0115481 A1 | 6/2003 | Baird et al. |
| 2003/0126102 A1 | 7/2003 | Borthwick |
| 2003/0130996 A1 | 7/2003 | Bayerl et al. |
| 2003/0140106 A1 | 7/2003 | Raguseo |
| 2003/0144868 A1* | 7/2003 | MacIntyre ........ G06F 17/30536 705/7.38 |
| 2003/0163352 A1 | 8/2003 | Surpin et al. |
| 2003/0171942 A1 | 9/2003 | Gaito |
| 2003/0172014 A1 | 9/2003 | Quackenbush et al. |
| 2003/0172021 A1 | 9/2003 | Huang |
| 2003/0172053 A1 | 9/2003 | Fairweather |
| 2003/0177112 A1 | 9/2003 | Gardner |
| 2003/0182177 A1 | 9/2003 | Gallagher |
| 2003/0182313 A1 | 9/2003 | Federwisch et al. |
| 2003/0184588 A1 | 10/2003 | Lee |
| 2003/0187761 A1 | 10/2003 | Olsen et al. |
| 2003/0212718 A1 | 11/2003 | Tester |
| 2003/0225755 A1 | 12/2003 | Iwayama et al. |
| 2003/0229848 A1 | 12/2003 | Arend et al. |
| 2004/0003009 A1 | 1/2004 | Wilmot |
| 2004/0006523 A1 | 1/2004 | Coker |
| 2004/0030492 A1 | 2/2004 | Fox et al. |
| 2004/0032432 A1 | 2/2004 | Baynger |
| 2004/0034570 A1 | 2/2004 | Davis |
| 2004/0039498 A1 | 2/2004 | Ollis et al. |
| 2004/0044648 A1 | 3/2004 | Anfindsen et al. |
| 2004/0064256 A1 | 4/2004 | Barinek et al. |
| 2004/0083466 A1 | 4/2004 | Dapp et al. |
| 2004/0085318 A1 | 5/2004 | Hassler et al. |
| 2004/0088177 A1 | 5/2004 | Travis et al. |
| 2004/0095349 A1 | 5/2004 | Bito et al. |
| 2004/0098236 A1 | 5/2004 | Mayer et al. |
| 2004/0111410 A1 | 6/2004 | Burgoon et al. |
| 2004/0111480 A1 | 6/2004 | Yue |
| 2004/0117387 A1 | 6/2004 | Civetta et al. |
| 2004/0126840 A1 | 7/2004 | Cheng et al. |
| 2004/0133500 A1 | 7/2004 | Thompson et al. |
| 2004/0143602 A1 | 7/2004 | Ruiz et al. |
| 2004/0143796 A1 | 7/2004 | Lerner et al. |
| 2004/0153418 A1 | 8/2004 | Hanweck |
| 2004/0153451 A1 | 8/2004 | Phillips et al. |
| 2004/0163039 A1 | 8/2004 | McPherson et al. |
| 2004/0193599 A1 | 9/2004 | Liu et al. |
| 2004/0193600 A1 | 9/2004 | Kaasten et al. |
| 2004/0204821 A1 | 10/2004 | Tu |
| 2004/0205492 A1 | 10/2004 | Newsome |
| 2004/0205524 A1 | 10/2004 | Richter et al. |
| 2004/0210763 A1 | 10/2004 | Jonas |
| 2004/0221223 A1 | 11/2004 | Yu et al. |
| 2004/0236688 A1 | 11/2004 | Bozeman |
| 2004/0260702 A1 | 12/2004 | Cragun et al. |
| 2004/0267746 A1 | 12/2004 | Marcjan et al. |
| 2005/0010472 A1 | 1/2005 | Quatse et al. |
| 2005/0027705 A1 | 2/2005 | Sadri et al. |
| 2005/0028094 A1 | 2/2005 | Allyn |
| 2005/0031197 A1 | 2/2005 | Knopp |
| 2005/0034062 A1 | 2/2005 | Bufkin et al. |
| 2005/0039116 A1 | 2/2005 | Slack-Smith |
| 2005/0039119 A1 | 2/2005 | Parks et al. |
| 2005/0060712 A1 | 3/2005 | Miller et al. |
| 2005/0060713 A1 | 3/2005 | Miller et al. |
| 2005/0065811 A1 | 3/2005 | Chu et al. |
| 2005/0075962 A1 | 4/2005 | Dunne |
| 2005/0075966 A1 | 4/2005 | Duka |
| 2005/0078858 A1 | 4/2005 | Yao et al. |
| 2005/0080769 A1 | 4/2005 | Gemmell |
| 2005/0086207 A1 | 4/2005 | Heuer et al. |
| 2005/0090911 A1 | 4/2005 | Ingargiola et al. |
| 2005/0091186 A1 | 4/2005 | Elish |
| 2005/0097441 A1 | 5/2005 | Herbach et al. |
| 2005/0102328 A1 | 5/2005 | Ring et al. |
| 2005/0108001 A1 | 5/2005 | Aarskog |
| 2005/0125715 A1 | 6/2005 | Franco et al. |
| 2005/0131935 A1 | 6/2005 | O'Leary et al. |

(56) References Cited

U.S. PATENT DOCUMENTS

| | | |
|---|---|---|
| 2005/0133588 A1 | 6/2005 | Williams |
| 2005/0149455 A1 | 7/2005 | Bruesewitz et al. |
| 2005/0154628 A1 | 7/2005 | Eckart et al. |
| 2005/0154769 A1 | 7/2005 | Eckart et al. |
| 2005/0162523 A1 | 7/2005 | Darrell et al. |
| 2005/0166144 A1 | 7/2005 | Gross |
| 2005/0171881 A1 | 8/2005 | Ghassemieh et al. |
| 2005/0180330 A1 | 8/2005 | Shapiro |
| 2005/0182502 A1 | 8/2005 | Iyengar |
| 2005/0182709 A1 | 8/2005 | Belcsak et al. |
| 2005/0182793 A1 | 8/2005 | Keenan et al. |
| 2005/0183005 A1 | 8/2005 | Denoue et al. |
| 2005/0210409 A1 | 9/2005 | Jou |
| 2005/0246327 A1 | 11/2005 | Yeung et al. |
| 2005/0251786 A1 | 11/2005 | Citron et al. |
| 2005/0256703 A1 | 11/2005 | Markel |
| 2005/0262004 A1 | 11/2005 | Sakata et al. |
| 2005/0262057 A1 | 11/2005 | Lesh et al. |
| 2005/0262493 A1 | 11/2005 | Schmidt et al. |
| 2005/0262512 A1 | 11/2005 | Schmidt et al. |
| 2005/0267652 A1 | 12/2005 | Allstadt et al. |
| 2006/0010130 A1 | 1/2006 | Leff et al. |
| 2006/0020398 A1 | 1/2006 | Vernon et al. |
| 2006/0026120 A1 | 2/2006 | Carolan et al. |
| 2006/0026170 A1 | 2/2006 | Kreitler et al. |
| 2006/0026561 A1 | 2/2006 | Bauman et al. |
| 2006/0031779 A1 | 2/2006 | Theurer et al. |
| 2006/0052984 A1 | 3/2006 | Nakadate et al. |
| 2006/0053097 A1 | 3/2006 | King et al. |
| 2006/0053170 A1 | 3/2006 | Hill et al. |
| 2006/0059072 A1 | 3/2006 | Boglaev |
| 2006/0059139 A1 | 3/2006 | Robinson |
| 2006/0059423 A1 | 3/2006 | Lehmann et al. |
| 2006/0064181 A1 | 3/2006 | Kato |
| 2006/0069503 A1 | 3/2006 | Suomela et al. |
| 2006/0074881 A1 | 4/2006 | Vembu et al. |
| 2006/0080139 A1 | 4/2006 | Mainzer |
| 2006/0080283 A1 | 4/2006 | Shipman |
| 2006/0080316 A1 | 4/2006 | Gilmore et al. |
| 2006/0080619 A1 | 4/2006 | Carlson et al. |
| 2006/0116943 A1 | 6/2006 | Willain |
| 2006/0129746 A1 | 6/2006 | Porter |
| 2006/0136513 A1 | 6/2006 | Ngo et al. |
| 2006/0139375 A1 | 6/2006 | Rasmussen et al. |
| 2006/0142949 A1 | 6/2006 | Helt |
| 2006/0143034 A1 | 6/2006 | Rothermel |
| 2006/0143075 A1 | 6/2006 | Carr et al. |
| 2006/0143079 A1 | 6/2006 | Basak et al. |
| 2006/0146050 A1 | 7/2006 | Yamauchi |
| 2006/0149596 A1 | 7/2006 | Surpin et al. |
| 2006/0178915 A1 | 8/2006 | Chao |
| 2006/0178954 A1 | 8/2006 | Thukral et al. |
| 2006/0184889 A1 | 8/2006 | Molander |
| 2006/0203337 A1 | 9/2006 | White |
| 2006/0209085 A1 | 9/2006 | Wong et al. |
| 2006/0218206 A1 | 9/2006 | Bourbonnais et al. |
| 2006/0218491 A1 | 9/2006 | Grossman et al. |
| 2006/0218637 A1 | 9/2006 | Thomas et al. |
| 2006/0224356 A1 | 10/2006 | Castelli et al. |
| 2006/0235786 A1 | 10/2006 | DiSalvo |
| 2006/0241974 A1 | 10/2006 | Chao et al. |
| 2006/0242040 A1 | 10/2006 | Rader |
| 2006/0242630 A1 | 10/2006 | Koike et al. |
| 2006/0251307 A1 | 11/2006 | Florin et al. |
| 2006/0253502 A1 | 11/2006 | Raman et al. |
| 2006/0265311 A1 | 11/2006 | Dean et al. |
| 2006/0265397 A1 | 11/2006 | Bryan et al. |
| 2006/0265417 A1 | 11/2006 | Amato et al. |
| 2006/0271277 A1 | 11/2006 | Hu et al. |
| 2006/0277460 A1 | 12/2006 | Forstall et al. |
| 2006/0279630 A1 | 12/2006 | Aggarwal et al. |
| 2007/0000999 A1 | 1/2007 | Kubo et al. |
| 2007/0011150 A1 | 1/2007 | Frank |
| 2007/0011304 A1 | 1/2007 | Error |
| 2007/0016363 A1 | 1/2007 | Huang et al. |
| 2007/0024620 A1 | 2/2007 | Muller-Fischer et al. |
| 2007/0038646 A1 | 2/2007 | Thota |
| 2007/0038962 A1 | 2/2007 | Fuchs et al. |
| 2007/0043686 A1 | 2/2007 | Teng et al. |
| 2007/0055598 A1 | 3/2007 | Arnott et al. |
| 2007/0057966 A1 | 3/2007 | Ohno et al. |
| 2007/0061259 A1 | 3/2007 | Zoldi et al. |
| 2007/0061752 A1 | 3/2007 | Cory |
| 2007/0067233 A1 | 3/2007 | Dalal |
| 2007/0067285 A1 | 3/2007 | Blume |
| 2007/0078832 A1 | 4/2007 | Ott et al. |
| 2007/0083541 A1 | 4/2007 | Fraleigh et al. |
| 2007/0091868 A1 | 4/2007 | Hollman et al. |
| 2007/0094389 A1 | 4/2007 | Nussey et al. |
| 2007/0106582 A1 | 5/2007 | Baker et al. |
| 2007/0112714 A1 | 5/2007 | Fairweather |
| 2007/0113164 A1 | 5/2007 | Hansen et al. |
| 2007/0118527 A1 | 5/2007 | Winje et al. |
| 2007/0136095 A1 | 6/2007 | Weinstein |
| 2007/0136115 A1 | 6/2007 | Doganaksoy et al. |
| 2007/0150369 A1 | 6/2007 | Zivin |
| 2007/0150801 A1 | 6/2007 | Chidlovskii et al. |
| 2007/0156673 A1 | 7/2007 | Maga |
| 2007/0162454 A1 | 7/2007 | D'Albora et al. |
| 2007/0168269 A1 | 7/2007 | Chuo |
| 2007/0168270 A1 | 7/2007 | De Diego Arozamena et al. |
| 2007/0168871 A1 | 7/2007 | Jenkins |
| 2007/0174760 A1 | 7/2007 | Chamberlain et al. |
| 2007/0178501 A1 | 8/2007 | Rabinowitz et al. |
| 2007/0185867 A1 | 8/2007 | Maga |
| 2007/0188516 A1 | 8/2007 | Loup et al. |
| 2007/0192122 A1 | 8/2007 | Routson et al. |
| 2007/0192265 A1 | 8/2007 | Chopin et al. |
| 2007/0198571 A1 | 8/2007 | Ferguson et al. |
| 2007/0208497 A1 | 9/2007 | Downs et al. |
| 2007/0208498 A1 | 9/2007 | Barker et al. |
| 2007/0208736 A1 | 9/2007 | Tanigawa et al. |
| 2007/0219882 A1 | 9/2007 | May |
| 2007/0226617 A1 | 9/2007 | Traub et al. |
| 2007/0233756 A1 | 10/2007 | D'Souza et al. |
| 2007/0239606 A1 | 10/2007 | Eisen |
| 2007/0240062 A1 | 10/2007 | Christena et al. |
| 2007/0245339 A1 | 10/2007 | Bauman et al. |
| 2007/0258642 A1 | 11/2007 | Thota |
| 2007/0266336 A1 | 11/2007 | Nojima et al. |
| 2007/0271317 A1 | 11/2007 | Carmel |
| 2007/0282951 A1 | 12/2007 | Selimis et al. |
| 2007/0284433 A1 | 12/2007 | Domenica et al. |
| 2007/0294643 A1 | 12/2007 | Kyle |
| 2007/0295797 A1 | 12/2007 | Herman et al. |
| 2007/0299697 A1 | 12/2007 | Friedlander et al. |
| 2008/0005063 A1 | 1/2008 | Seeds |
| 2008/0010605 A1 | 1/2008 | Frank |
| 2008/0015920 A1 | 1/2008 | Fawls et al. |
| 2008/0016155 A1 | 1/2008 | Khalatian |
| 2008/0040250 A1 | 2/2008 | Salter |
| 2008/0040275 A1 | 2/2008 | Paulsen et al. |
| 2008/0040684 A1 | 2/2008 | Crump |
| 2008/0046481 A1 | 2/2008 | Gould et al. |
| 2008/0046803 A1 | 2/2008 | Beauchamp et al. |
| 2008/0051989 A1 | 2/2008 | Welsh |
| 2008/0052142 A1 | 2/2008 | Bailey et al. |
| 2008/0069081 A1 | 3/2008 | Chand et al. |
| 2008/0077597 A1 | 3/2008 | Butler |
| 2008/0077642 A1 | 3/2008 | Carbone et al. |
| 2008/0082486 A1 | 4/2008 | Lermant et al. |
| 2008/0082578 A1 | 4/2008 | Hogue et al. |
| 2008/0091693 A1 | 4/2008 | Murthy |
| 2008/0098085 A1 | 4/2008 | Krane et al. |
| 2008/0103798 A1 | 5/2008 | Domenikos et al. |
| 2008/0103996 A1 | 5/2008 | Forman et al. |
| 2008/0104019 A1 | 5/2008 | Nath |
| 2008/0109714 A1 | 5/2008 | Kumar et al. |
| 2008/0126344 A1 | 5/2008 | Hoffman et al. |
| 2008/0126951 A1 | 5/2008 | Sood et al. |
| 2008/0140387 A1 | 6/2008 | Linker |
| 2008/0140576 A1 | 6/2008 | Lewis et al. |
| 2008/0148398 A1 | 6/2008 | Mezack et al. |
| 2008/0155440 A1 | 6/2008 | Trevor et al. |

(56) References Cited

U.S. PATENT DOCUMENTS

| | | |
|---|---|---|
| 2008/0162616 A1 | 7/2008 | Gross et al. |
| 2008/0163073 A1 | 7/2008 | Becker et al. |
| 2008/0172607 A1 | 7/2008 | Baer |
| 2008/0183639 A1 | 7/2008 | DiSalvo |
| 2008/0192053 A1 | 8/2008 | Howell et al. |
| 2008/0195417 A1 | 8/2008 | Surpin et al. |
| 2008/0195608 A1 | 8/2008 | Clover |
| 2008/0195672 A1 | 8/2008 | Hamel et al. |
| 2008/0208735 A1 | 8/2008 | Balet et al. |
| 2008/0208820 A1 | 8/2008 | Usey et al. |
| 2008/0222038 A1 | 9/2008 | Eden et al. |
| 2008/0222295 A1 | 9/2008 | Robinson et al. |
| 2008/0223834 A1 | 9/2008 | Griffiths et al. |
| 2008/0228467 A1 | 9/2008 | Womack et al. |
| 2008/0243711 A1 | 10/2008 | Aymeloglu et al. |
| 2008/0249820 A1 | 10/2008 | Pathria |
| 2008/0249957 A1 | 10/2008 | Masuyama et al. |
| 2008/0249983 A1 | 10/2008 | Meisels et al. |
| 2008/0255973 A1 | 10/2008 | El Wade et al. |
| 2008/0263468 A1* | 10/2008 | Cappione .......... G01N 35/00722 715/771 |
| 2008/0267107 A1 | 10/2008 | Rosenberg |
| 2008/0267386 A1 | 10/2008 | Cooper |
| 2008/0270316 A1 | 10/2008 | Guidotti et al. |
| 2008/0270468 A1 | 10/2008 | Mao |
| 2008/0276167 A1 | 11/2008 | Michael |
| 2008/0278311 A1 | 11/2008 | Grange et al. |
| 2008/0281580 A1 | 11/2008 | Zabokritski |
| 2008/0288306 A1* | 11/2008 | MacIntyre ........ G06F 17/30536 705/7.29 |
| 2008/0288471 A1 | 11/2008 | Wu et al. |
| 2008/0294678 A1 | 11/2008 | Gorman et al. |
| 2008/0301042 A1 | 12/2008 | Patzer |
| 2008/0301643 A1 | 12/2008 | Appleton et al. |
| 2008/0313132 A1 | 12/2008 | Hao et al. |
| 2008/0313243 A1 | 12/2008 | Poston et al. |
| 2009/0002492 A1 | 1/2009 | Velipasalar et al. |
| 2009/0005987 A1 | 1/2009 | Vengroff et al. |
| 2009/0006271 A1 | 1/2009 | Crowder |
| 2009/0018996 A1* | 1/2009 | Hunt .................. G06Q 30/02 |
| 2009/0027418 A1 | 1/2009 | Maru et al. |
| 2009/0030915 A1 | 1/2009 | Winter et al. |
| 2009/0031401 A1 | 1/2009 | Cudich et al. |
| 2009/0043801 A1 | 2/2009 | LeClair |
| 2009/0055251 A1 | 2/2009 | Shah et al. |
| 2009/0055487 A1 | 2/2009 | Moraes et al. |
| 2009/0076845 A1 | 3/2009 | Bellin et al. |
| 2009/0088964 A1 | 4/2009 | Schaaf et al. |
| 2009/0089651 A1 | 4/2009 | Herberger et al. |
| 2009/0094166 A1 | 4/2009 | Aymeloglu et al. |
| 2009/0094270 A1 | 4/2009 | Alirez et al. |
| 2009/0100018 A1 | 4/2009 | Roberts |
| 2009/0106178 A1 | 4/2009 | Chu |
| 2009/0106242 A1 | 4/2009 | McGrew |
| 2009/0106308 A1 | 4/2009 | Killian et al. |
| 2009/0112678 A1 | 4/2009 | Luzardo |
| 2009/0112745 A1 | 4/2009 | Stefanescu |
| 2009/0112922 A1 | 4/2009 | Barinaga |
| 2009/0115786 A1 | 5/2009 | Shmiaski et al. |
| 2009/0119309 A1 | 5/2009 | Gibson et al. |
| 2009/0125359 A1 | 5/2009 | Knapic |
| 2009/0125369 A1 | 5/2009 | Kloostra et al. |
| 2009/0125459 A1 | 5/2009 | Norton et al. |
| 2009/0132347 A1 | 5/2009 | Anderson et al. |
| 2009/0132921 A1 | 5/2009 | Hwangbo et al. |
| 2009/0132953 A1 | 5/2009 | Reed et al. |
| 2009/0138307 A1 | 5/2009 | Belcsak et al. |
| 2009/0143052 A1 | 6/2009 | Bates et al. |
| 2009/0144262 A1 | 6/2009 | White et al. |
| 2009/0144274 A1 | 6/2009 | Fraleigh et al. |
| 2009/0150868 A1 | 6/2009 | Chakra et al. |
| 2009/0157732 A1 | 6/2009 | Hao et al. |
| 2009/0158185 A1 | 6/2009 | Lacevic et al. |
| 2009/0164387 A1 | 6/2009 | Armstrong et al. |
| 2009/0164934 A1 | 6/2009 | Bhattiprolu et al. |
| 2009/0171759 A1 | 7/2009 | McGeehan |
| 2009/0171939 A1 | 7/2009 | Athsani et al. |
| 2009/0171955 A1 | 7/2009 | Merz et al. |
| 2009/0172511 A1* | 7/2009 | Decherd ............. G06F 17/3087 715/207 |
| 2009/0172821 A1 | 7/2009 | Daira et al. |
| 2009/0177962 A1 | 7/2009 | Gusmorino et al. |
| 2009/0179892 A1 | 7/2009 | Tsuda et al. |
| 2009/0187464 A1 | 7/2009 | Bai et al. |
| 2009/0187546 A1 | 7/2009 | Whyte et al. |
| 2009/0187548 A1 | 7/2009 | Ji et al. |
| 2009/0193050 A1 | 7/2009 | Olson et al. |
| 2009/0199106 A1 | 8/2009 | Jonsson et al. |
| 2009/0216562 A1 | 8/2009 | Faulkner et al. |
| 2009/0222400 A1 | 9/2009 | Kupershmidt et al. |
| 2009/0222759 A1 | 9/2009 | Drieschner |
| 2009/0222760 A1 | 9/2009 | Halverson et al. |
| 2009/0228365 A1 | 9/2009 | Tomchek et al. |
| 2009/0228507 A1 | 9/2009 | Jain et al. |
| 2009/0234720 A1 | 9/2009 | George et al. |
| 2009/0248757 A1 | 10/2009 | Havewala et al. |
| 2009/0249244 A1 | 10/2009 | Robinson et al. |
| 2009/0254970 A1 | 10/2009 | Agarwal et al. |
| 2009/0271343 A1 | 10/2009 | Vaiciulis et al. |
| 2009/0281839 A1 | 11/2009 | Lynn et al. |
| 2009/0282068 A1 | 11/2009 | Shockro et al. |
| 2009/0287470 A1 | 11/2009 | Farnsworth et al. |
| 2009/0292626 A1 | 11/2009 | Oxford |
| 2009/0299830 A1 | 12/2009 | West et al. |
| 2009/0307049 A1 | 12/2009 | Elliott et al. |
| 2009/0313250 A1 | 12/2009 | Folting et al. |
| 2009/0313311 A1 | 12/2009 | Hoffmann et al. |
| 2009/0313463 A1 | 12/2009 | Pang et al. |
| 2009/0319418 A1 | 12/2009 | Herz |
| 2009/0319515 A1 | 12/2009 | Minton et al. |
| 2009/0319891 A1 | 12/2009 | MacKinlay |
| 2009/0327157 A1 | 12/2009 | Dunne |
| 2010/0011282 A1 | 1/2010 | Dollard et al. |
| 2010/0030722 A1 | 2/2010 | Goodson et al. |
| 2010/0031141 A1 | 2/2010 | Summers et al. |
| 2010/0042922 A1 | 2/2010 | Bradateanu et al. |
| 2010/0057600 A1 | 3/2010 | Johansen et al. |
| 2010/0057622 A1 | 3/2010 | Faith et al. |
| 2010/0057716 A1 | 3/2010 | Stefik et al. |
| 2010/0063961 A1 | 3/2010 | Guiheneuf et al. |
| 2010/0070426 A1 | 3/2010 | Aymeloglu et al. |
| 2010/0070427 A1 | 3/2010 | Aymeloglu et al. |
| 2010/0070523 A1 | 3/2010 | Delgo et al. |
| 2010/0070531 A1 | 3/2010 | Aymeloglu et al. |
| 2010/0070842 A1 | 3/2010 | Aymeloglu et al. |
| 2010/0070844 A1 | 3/2010 | Aymeloglu et al. |
| 2010/0070845 A1 | 3/2010 | Facemire et al. |
| 2010/0070897 A1 | 3/2010 | Aymeloglu et al. |
| 2010/0076813 A1 | 3/2010 | Ghosh et al. |
| 2010/0076968 A1 | 3/2010 | Boyns et al. |
| 2010/0082541 A1 | 4/2010 | Kottomtharayil |
| 2010/0082671 A1 | 4/2010 | Li et al. |
| 2010/0094765 A1 | 4/2010 | Nandy |
| 2010/0098318 A1 | 4/2010 | Anderson |
| 2010/0100963 A1 | 4/2010 | Mahaffey |
| 2010/0103124 A1 | 4/2010 | Kruzeniski et al. |
| 2010/0106420 A1 | 4/2010 | Mattikalli et al. |
| 2010/0114817 A1 | 5/2010 | Broeder et al. |
| 2010/0114831 A1 | 5/2010 | Gilbert et al. |
| 2010/0114887 A1 | 5/2010 | Conway et al. |
| 2010/0122152 A1 | 5/2010 | Chamberlain et al. |
| 2010/0131457 A1 | 5/2010 | Heimendinger |
| 2010/0131502 A1 | 5/2010 | Fordham |
| 2010/0145909 A1 | 6/2010 | Ngo |
| 2010/0161735 A1 | 6/2010 | Sharma |
| 2010/0162176 A1 | 6/2010 | Dunton |
| 2010/0169192 A1 | 7/2010 | Zoldi et al. |
| 2010/0174754 A1* | 7/2010 | B'Far ................. G06F 17/30507 707/794 |
| 2010/0191563 A1 | 7/2010 | Schlaifer et al. |
| 2010/0198684 A1 | 8/2010 | Eraker et al. |
| 2010/0199225 A1 | 8/2010 | Coleman et al. |
| 2010/0204983 A1 | 8/2010 | Chung et al. |
| 2010/0205108 A1 | 8/2010 | Mun |

(56) References Cited

U.S. PATENT DOCUMENTS

| | | |
|---|---|---|
| 2010/0223260 A1 | 9/2010 | Wu |
| 2010/0228812 A1 | 9/2010 | Uomini |
| 2010/0235915 A1 | 9/2010 | Memon et al. |
| 2010/0250412 A1 | 9/2010 | Wagner |
| 2010/0262688 A1 | 10/2010 | Hussain et al. |
| 2010/0280851 A1 | 11/2010 | Merkin |
| 2010/0280857 A1 | 11/2010 | Liu et al. |
| 2010/0283787 A1 | 11/2010 | Hamedi et al. |
| 2010/0293174 A1 | 11/2010 | Bennett et al. |
| 2010/0306032 A1 | 12/2010 | Jolley |
| 2010/0306285 A1 | 12/2010 | Shah et al. |
| 2010/0306713 A1 | 12/2010 | Geisner et al. |
| 2010/0312530 A1 | 12/2010 | Capriotti |
| 2010/0312837 A1 | 12/2010 | Bodapati et al. |
| 2010/0313119 A1 | 12/2010 | Baldwin et al. |
| 2010/0313239 A1 | 12/2010 | Chakra et al. |
| 2010/0318924 A1 | 12/2010 | Frankel et al. |
| 2010/0321399 A1 | 12/2010 | Ellren et al. |
| 2010/0325526 A1 | 12/2010 | Ellis et al. |
| 2010/0325581 A1 | 12/2010 | Finkelstein et al. |
| 2010/0330801 A1 | 12/2010 | Rouh |
| 2011/0004498 A1 | 1/2011 | Readshaw |
| 2011/0004626 A1 | 1/2011 | Naeymi-Rad et al. |
| 2011/0029526 A1 | 2/2011 | Knight et al. |
| 2011/0047159 A1 | 2/2011 | Baid et al. |
| 2011/0055074 A1 | 3/2011 | Chen et al. |
| 2011/0060753 A1 | 3/2011 | Shaked et al. |
| 2011/0061013 A1 | 3/2011 | Bilicki et al. |
| 2011/0066497 A1 | 3/2011 | Gopinath et al. |
| 2011/0074811 A1 | 3/2011 | Hanson et al. |
| 2011/0078055 A1 | 3/2011 | Faribault et al. |
| 2011/0078173 A1 | 3/2011 | Seligmann et al. |
| 2011/0093327 A1 | 4/2011 | Fordyce, III et al. |
| 2011/0099133 A1 | 4/2011 | Chang et al. |
| 2011/0099628 A1 | 4/2011 | Lanxner et al. |
| 2011/0117878 A1 | 5/2011 | Barash et al. |
| 2011/0119100 A1 | 5/2011 | Ruhl et al. |
| 2011/0131122 A1 | 6/2011 | Griffin et al. |
| 2011/0131547 A1 | 6/2011 | Elaasar |
| 2011/0137766 A1 | 6/2011 | Rasmussen et al. |
| 2011/0153384 A1 | 6/2011 | Horne et al. |
| 2011/0161096 A1 | 6/2011 | Buehler et al. |
| 2011/0161137 A1 | 6/2011 | Ubalde et al. |
| 2011/0161409 A1 | 6/2011 | Nair |
| 2011/0167060 A1 | 7/2011 | Merz et al. |
| 2011/0167710 A1 | 7/2011 | Ramakrishnan et al. |
| 2011/0170799 A1 | 7/2011 | Carrino et al. |
| 2011/0173032 A1 | 7/2011 | Payne et al. |
| 2011/0173049 A1* | 7/2011 | McHale .................. G06Q 10/04 705/7.36 |
| 2011/0173093 A1 | 7/2011 | Psota et al. |
| 2011/0179042 A1 | 7/2011 | Aymeloglu et al. |
| 2011/0179048 A1 | 7/2011 | Satlow |
| 2011/0181598 A1 | 7/2011 | O'Neall et al. |
| 2011/0185316 A1 | 7/2011 | Reid et al. |
| 2011/0208565 A1 | 8/2011 | Ross et al. |
| 2011/0208724 A1 | 8/2011 | Jones et al. |
| 2011/0208822 A1 | 8/2011 | Rathod |
| 2011/0213655 A1 | 9/2011 | Henkin |
| 2011/0218934 A1 | 9/2011 | Elser |
| 2011/0218955 A1 | 9/2011 | Tang |
| 2011/0219321 A1 | 9/2011 | Gonzalez et al. |
| 2011/0219450 A1 | 9/2011 | McDougal et al. |
| 2011/0225198 A1 | 9/2011 | Edwards et al. |
| 2011/0225482 A1 | 9/2011 | Chan et al. |
| 2011/0225586 A1 | 9/2011 | Bentley et al. |
| 2011/0231305 A1 | 9/2011 | Winters |
| 2011/0238495 A1 | 9/2011 | Kang |
| 2011/0238553 A1 | 9/2011 | Raj et al. |
| 2011/0252282 A1 | 10/2011 | Meek et al. |
| 2011/0258158 A1 | 10/2011 | Resende et al. |
| 2011/0258216 A1 | 10/2011 | Supakkul et al. |
| 2011/0270604 A1 | 11/2011 | Qi et al. |
| 2011/0270705 A1 | 11/2011 | Parker |
| 2011/0270834 A1 | 11/2011 | Sokolan et al. |
| 2011/0289397 A1 | 11/2011 | Eastmond et al. |
| 2011/0289407 A1 | 11/2011 | Naik et al. |
| 2011/0289420 A1 | 11/2011 | Morioka et al. |
| 2011/0291851 A1 | 12/2011 | Whisenant |
| 2011/0295649 A1 | 12/2011 | Fine |
| 2011/0307382 A1 | 12/2011 | Siegel et al. |
| 2011/0310005 A1 | 12/2011 | Chen et al. |
| 2011/0314007 A1 | 12/2011 | Dassa et al. |
| 2011/0314024 A1 | 12/2011 | Chang et al. |
| 2012/0004894 A1 | 1/2012 | Butler |
| 2012/0004904 A1 | 1/2012 | Shin et al. |
| 2012/0011238 A1 | 1/2012 | Rathod |
| 2012/0011245 A1 | 1/2012 | Gillette et al. |
| 2012/0019559 A1 | 1/2012 | Siler et al. |
| 2012/0022945 A1 | 1/2012 | Falkenborg et al. |
| 2012/0036013 A1 | 2/2012 | Neuhaus et al. |
| 2012/0036434 A1 | 2/2012 | Oberstein |
| 2012/0050293 A1 | 3/2012 | Carlhian et al. |
| 2012/0054284 A1 | 3/2012 | Rakshit |
| 2012/0059853 A1 | 3/2012 | Jagota |
| 2012/0065987 A1 | 3/2012 | Farooq et al. |
| 2012/0066166 A1 | 3/2012 | Curbera et al. |
| 2012/0066296 A1 | 3/2012 | Appleton et al. |
| 2012/0072825 A1 | 3/2012 | Sherkin et al. |
| 2012/0075324 A1 | 3/2012 | Cardno et al. |
| 2012/0078595 A1 | 3/2012 | Balandin et al. |
| 2012/0079363 A1 | 3/2012 | Folting et al. |
| 2012/0084117 A1 | 4/2012 | Tavares et al. |
| 2012/0084118 A1 | 4/2012 | Bai et al. |
| 2012/0084184 A1 | 4/2012 | Raleigh |
| 2012/0084287 A1 | 4/2012 | Lakshminarayan et al. |
| 2012/0089606 A1 | 4/2012 | Eshwar et al. |
| 2012/0106801 A1 | 5/2012 | Jackson |
| 2012/0116828 A1 | 5/2012 | Shannon |
| 2012/0117082 A1 | 5/2012 | Koperda et al. |
| 2012/0131512 A1 | 5/2012 | Takeuchi et al. |
| 2012/0136804 A1 | 5/2012 | Lucia |
| 2012/0144335 A1* | 6/2012 | Abeln .................... G06Q 10/06 715/771 |
| 2012/0158585 A1 | 6/2012 | Ganti |
| 2012/0159307 A1 | 6/2012 | Chung et al. |
| 2012/0159362 A1 | 6/2012 | Brown et al. |
| 2012/0159399 A1 | 6/2012 | Bastide et al. |
| 2012/0170847 A1 | 7/2012 | Tsukidate |
| 2012/0173381 A1 | 7/2012 | Smith |
| 2012/0173985 A1 | 7/2012 | Peppel |
| 2012/0188252 A1 | 7/2012 | Law |
| 2012/0191446 A1 | 7/2012 | Binsztok et al. |
| 2012/0196557 A1 | 8/2012 | Reich et al. |
| 2012/0196558 A1 | 8/2012 | Reich et al. |
| 2012/0197651 A1 | 8/2012 | Robinson et al. |
| 2012/0197657 A1 | 8/2012 | Prodanovic |
| 2012/0197660 A1 | 8/2012 | Prodanovic |
| 2012/0203708 A1 | 8/2012 | Psota et al. |
| 2012/0206469 A1 | 8/2012 | Hulubei et al. |
| 2012/0208636 A1 | 8/2012 | Feige |
| 2012/0215784 A1 | 8/2012 | King et al. |
| 2012/0221511 A1 | 8/2012 | Gibson et al. |
| 2012/0221553 A1 | 8/2012 | Wittmer et al. |
| 2012/0221580 A1* | 8/2012 | Barney ............. G06F 17/30675 707/748 |
| 2012/0226523 A1 | 9/2012 | Weiss |
| 2012/0226590 A1 | 9/2012 | Love et al. |
| 2012/0245976 A1 | 9/2012 | Kumar et al. |
| 2012/0246148 A1 | 9/2012 | Dror |
| 2012/0254129 A1 | 10/2012 | Wheeler et al. |
| 2012/0271827 A1 | 10/2012 | Merz |
| 2012/0278249 A1 | 11/2012 | Duggal et al. |
| 2012/0284345 A1 | 11/2012 | Costenaro et al. |
| 2012/0290879 A1 | 11/2012 | Shibuya et al. |
| 2012/0296907 A1 | 11/2012 | Long et al. |
| 2012/0311684 A1 | 12/2012 | Paulsen et al. |
| 2012/0323888 A1 | 12/2012 | Osann, Jr. |
| 2012/0330801 A1 | 12/2012 | McDougal et al. |
| 2012/0330973 A1 | 12/2012 | Ghuneim et al. |
| 2013/0006426 A1 | 1/2013 | Healey et al. |
| 2013/0006725 A1 | 1/2013 | Simanek et al. |
| 2013/0006916 A1 | 1/2013 | McBride et al. |
| 2013/0006947 A1 | 1/2013 | Akinyemi et al. |

(56) References Cited

U.S. PATENT DOCUMENTS

| | | |
|---|---|---|
| 2013/0016106 A1 | 1/2013 | Yip et al. |
| 2013/0018796 A1 | 1/2013 | Kolhatkar et al. |
| 2013/0021445 A1 | 1/2013 | Cossette-Pacheco et al. |
| 2013/0024268 A1 | 1/2013 | Manickavelu |
| 2013/0046635 A1 | 2/2013 | Grigg et al. |
| 2013/0046842 A1 | 2/2013 | Muntz et al. |
| 2013/0050217 A1 | 2/2013 | Armitage |
| 2013/0054306 A1 | 2/2013 | Bhalla |
| 2013/0055264 A1 | 2/2013 | Burr et al. |
| 2013/0057551 A1 | 3/2013 | Ebert et al. |
| 2013/0060786 A1 | 3/2013 | Serrano et al. |
| 2013/0061169 A1 | 3/2013 | Pearcy et al. |
| 2013/0073377 A1* | 3/2013 | Heath .................. G06Q 30/02 705/14.39 |
| 2013/0073454 A1 | 3/2013 | Busch |
| 2013/0078943 A1 | 3/2013 | Biage et al. |
| 2013/0096968 A1 | 4/2013 | Van Pelt et al. |
| 2013/0096988 A1 | 4/2013 | Grossman et al. |
| 2013/0097130 A1 | 4/2013 | Bingol et al. |
| 2013/0097482 A1 | 4/2013 | Marantz et al. |
| 2013/0110746 A1 | 5/2013 | Ahn |
| 2013/0110822 A1 | 5/2013 | Ikeda et al. |
| 2013/0110877 A1 | 5/2013 | Bonham et al. |
| 2013/0111320 A1 | 5/2013 | Campbell et al. |
| 2013/0117011 A1 | 5/2013 | Ahmed et al. |
| 2013/0117651 A1 | 5/2013 | Waldman et al. |
| 2013/0124193 A1 | 5/2013 | Holmberg |
| 2013/0132348 A1 | 5/2013 | Garrod |
| 2013/0101159 A1 | 6/2013 | Rosen |
| 2013/0150004 A1 | 6/2013 | Rosen |
| 2013/0151148 A1 | 6/2013 | Parundekar et al. |
| 2013/0151388 A1 | 6/2013 | Falkenborg et al. |
| 2013/0151453 A1 | 6/2013 | Bhanot et al. |
| 2013/0157234 A1 | 6/2013 | Gulli et al. |
| 2013/0166348 A1 | 6/2013 | Scotto |
| 2013/0166480 A1 | 6/2013 | Popescu et al. |
| 2013/0166550 A1 | 6/2013 | Buchmann et al. |
| 2013/0176321 A1 | 7/2013 | Mitchell et al. |
| 2013/0179420 A1 | 7/2013 | Park et al. |
| 2013/0185245 A1 | 7/2013 | Anderson |
| 2013/0185307 A1 | 7/2013 | El-Yaniv et al. |
| 2013/0224696 A1 | 8/2013 | Wolfe et al. |
| 2013/0225212 A1 | 8/2013 | Khan |
| 2013/0226318 A1 | 8/2013 | Procyk |
| 2013/0226879 A1 | 8/2013 | Talukder et al. |
| 2013/0226944 A1 | 8/2013 | Baid et al. |
| 2013/0226953 A1 | 8/2013 | Markovich et al. |
| 2013/0238616 A1 | 9/2013 | Rose et al. |
| 2013/0238664 A1 | 9/2013 | Hsu et al. |
| 2013/0246170 A1 | 9/2013 | Gross et al. |
| 2013/0246316 A1 | 9/2013 | Zhao et al. |
| 2013/0246537 A1 | 9/2013 | Gaddala |
| 2013/0246597 A1 | 9/2013 | Iizawa et al. |
| 2013/0251233 A1 | 9/2013 | Yang et al. |
| 2013/0261957 A1 | 10/2013 | Mahapatro et al. |
| 2013/0262203 A1 | 10/2013 | Frederick et al. |
| 2013/0262328 A1 | 10/2013 | Federgreen |
| 2013/0262527 A1 | 10/2013 | Hunter et al. |
| 2013/0263019 A1 | 10/2013 | Castellanos et al. |
| 2013/0267207 A1 | 10/2013 | Hao et al. |
| 2013/0268520 A1 | 10/2013 | Fisher et al. |
| 2013/0275186 A1 | 10/2013 | Olives et al. |
| 2013/0279757 A1 | 10/2013 | Kephart |
| 2013/0282696 A1 | 10/2013 | John et al. |
| 2013/0290011 A1 | 10/2013 | Lynn et al. |
| 2013/0290825 A1 | 10/2013 | Arndt et al. |
| 2013/0293553 A1 | 11/2013 | Burr et al. |
| 2013/0297619 A1 | 11/2013 | Chandarsekaran et al. |
| 2013/0304770 A1 | 11/2013 | Boero et al. |
| 2013/0311375 A1 | 11/2013 | Priebatsch |
| 2013/0325826 A1 | 12/2013 | Agarwal et al. |
| 2014/0006404 A1 | 1/2014 | McGrew et al. |
| 2014/0012724 A1 | 1/2014 | O'Leary et al. |
| 2014/0012796 A1 | 1/2014 | Petersen et al. |
| 2014/0019936 A1 | 1/2014 | Cohanoff |
| 2014/0032506 A1 | 1/2014 | Hoey et al. |
| 2014/0033010 A1 | 1/2014 | Richardt et al. |
| 2014/0040371 A1 | 2/2014 | Gurevich et al. |
| 2014/0047357 A1 | 2/2014 | Alfaro et al. |
| 2014/0058914 A1 | 2/2014 | Song et al. |
| 2014/0059038 A1 | 2/2014 | McPherson et al. |
| 2014/0067611 A1 | 3/2014 | Adachi et al. |
| 2014/0068487 A1 | 3/2014 | Steiger et al. |
| 2014/0074855 A1 | 3/2014 | Zhao et al. |
| 2014/0089339 A1 | 3/2014 | Siddiqui et al. |
| 2014/0095273 A1 | 4/2014 | Tang et al. |
| 2014/0095363 A1 | 4/2014 | Caldwell |
| 2014/0095509 A1 | 4/2014 | Patton |
| 2014/0108068 A1 | 4/2014 | Williams |
| 2014/0108074 A1 | 4/2014 | Miller et al. |
| 2014/0108380 A1 | 4/2014 | Gotz et al. |
| 2014/0108985 A1 | 4/2014 | Scott et al. |
| 2014/0123279 A1 | 5/2014 | Bishop et al. |
| 2014/0129261 A1 | 5/2014 | Bothwell et al. |
| 2014/0129936 A1 | 5/2014 | Richards et al. |
| 2014/0136285 A1 | 5/2014 | Carvalho |
| 2014/0143009 A1 | 5/2014 | Brice et al. |
| 2014/0149436 A1 | 5/2014 | Bahrami et al. |
| 2014/0156527 A1 | 6/2014 | Grigg et al. |
| 2014/0157172 A1 | 6/2014 | Peery et al. |
| 2014/0164502 A1 | 6/2014 | Khodorenko et al. |
| 2014/0189536 A1 | 7/2014 | Lange et al. |
| 2014/0195515 A1 | 7/2014 | Baker et al. |
| 2014/0195887 A1 | 7/2014 | Ellis et al. |
| 2014/0222521 A1 | 8/2014 | Chait |
| 2014/0222752 A1 | 8/2014 | Isman et al. |
| 2014/0222793 A1 | 8/2014 | Sadkin et al. |
| 2014/0229554 A1 | 8/2014 | Grunin et al. |
| 2014/0244284 A1 | 8/2014 | Smith |
| 2014/0244388 A1 | 8/2014 | Manouchehri et al. |
| 2014/0258246 A1 | 9/2014 | Lo Faro et al. |
| 2014/0267294 A1 | 9/2014 | Ma |
| 2014/0267295 A1 | 9/2014 | Sharma |
| 2014/0279824 A1 | 9/2014 | Tamayo |
| 2014/0279865 A1 | 9/2014 | Kumar |
| 2014/0310266 A1 | 10/2014 | Greenfield |
| 2014/0316911 A1 | 10/2014 | Gross |
| 2014/0333651 A1 | 11/2014 | Cervelli et al. |
| 2014/0337772 A1 | 11/2014 | Cervelli et al. |
| 2014/0344230 A1 | 11/2014 | Krause et al. |
| 2014/0351070 A1 | 11/2014 | Christner et al. |
| 2014/0358603 A1 | 12/2014 | Viger et al. |
| 2014/0358789 A1 | 12/2014 | Boding et al. |
| 2014/0358829 A1 | 12/2014 | Hurwitz |
| 2014/0366132 A1 | 12/2014 | Stiansen et al. |
| 2015/0003734 A1 | 1/2015 | Barrett et al. |
| 2015/0012509 A1 | 1/2015 | Kirn |
| 2015/0019394 A1 | 1/2015 | Unser et al. |
| 2015/0046481 A1 | 2/2015 | Elliot |
| 2015/0046870 A1 | 2/2015 | Goldenberg et al. |
| 2015/0073929 A1 | 3/2015 | Psota et al. |
| 2015/0073954 A1 | 3/2015 | Braff |
| 2015/0089424 A1 | 3/2015 | Duffield et al. |
| 2015/0095773 A1 | 4/2015 | Gonsalves et al. |
| 2015/0100897 A1 | 4/2015 | Sun et al. |
| 2015/0100907 A1 | 4/2015 | Erenrich et al. |
| 2015/0106379 A1 | 4/2015 | Elliot et al. |
| 2015/0134512 A1 | 5/2015 | Mueller |
| 2015/0134666 A1 | 5/2015 | Gattiker et al. |
| 2015/0135256 A1 | 5/2015 | Hoy et al. |
| 2015/0161611 A1 | 6/2015 | Duke et al. |
| 2015/0169709 A1 | 6/2015 | Kara et al. |
| 2015/0169726 A1 | 6/2015 | Kara et al. |
| 2015/0170077 A1 | 6/2015 | Kara et al. |
| 2015/0178877 A1 | 6/2015 | Bogomolov et al. |
| 2015/0186821 A1 | 7/2015 | Wang et al. |
| 2015/0187036 A1 | 7/2015 | Wang et al. |
| 2015/0188872 A1 | 7/2015 | White |
| 2015/0254220 A1 | 9/2015 | Burr et al. |
| 2015/0309719 A1 | 10/2015 | Ma et al. |
| 2015/0317342 A1 | 11/2015 | Grossman et al. |
| 2015/0324868 A1 | 11/2015 | Kaftan et al. |
| 2015/0338233 A1 | 11/2015 | Cervelli et al. |
| 2015/0347903 A1 | 12/2015 | Saxena et al. |

(56) References Cited

U.S. PATENT DOCUMENTS

| | | |
|---|---|---|
| 2015/0378996 A1 | 12/2015 | Kesin et al. |
| 2015/0379413 A1 | 12/2015 | Robertson et al. |
| 2016/0004667 A1 | 1/2016 | Chakerian et al. |
| 2016/0004764 A1 | 1/2016 | Chakerian et al. |
| 2016/0026923 A1 | 1/2016 | Erenrich et al. |
| 2016/0034545 A1 | 2/2016 | Shankar et al. |
| 2016/0055501 A1 | 2/2016 | Mukherjee et al. |
| 2016/0098173 A1 | 4/2016 | Slawinski et al. |

FOREIGN PATENT DOCUMENTS

| | | |
|---|---|---|
| CN | 102546446 | 7/2012 |
| CN | 103167093 | 6/2013 |
| CN | 102054015 | 5/2014 |
| DE | 102014103482 | 9/2014 |
| DE | 102014204827 | 9/2014 |
| DE | 102014204830 | 9/2014 |
| DE | 102014204834 | 9/2014 |
| DE | 102014213036 | 1/2015 |
| DE | 102014215621 | 2/2015 |
| EP | 0763201 | 3/1997 |
| EP | 1109116 | 6/2001 |
| EP | 1146649 | 10/2001 |
| EP | 1672527 | 6/2006 |
| EP | 2487610 | 8/2012 |
| EP | 2551799 | 1/2013 |
| EP | 2560134 | 2/2013 |
| EP | 2575107 | 4/2013 |
| EP | 2778913 | 9/2014 |
| EP | 2778914 | 9/2014 |
| EP | 2778977 | 9/2014 |
| EP | 2835745 | 2/2015 |
| EP | 2835770 | 2/2015 |
| EP | 2838039 | 2/2015 |
| EP | 2846241 | 3/2015 |
| EP | 2851852 | 3/2015 |
| EP | 2858014 | 4/2015 |
| EP | 2858018 | 4/2015 |
| EP | 2863326 | 4/2015 |
| EP | 2863346 | 4/2015 |
| EP | 2869211 | 5/2015 |
| EP | 2884439 | 6/2015 |
| EP | 2884440 | 6/2015 |
| EP | 2889814 | 7/2015 |
| EP | 2891992 | 7/2015 |
| EP | 2892197 | 7/2015 |
| EP | 2940603 | 11/2015 |
| EP | 2940609 | 11/2015 |
| EP | 2963595 | 1/2016 |
| EP | 2988258 | 2/2016 |
| EP | 3035214 | 6/2016 |
| GB | 2366498 | 3/2002 |
| GB | 2513472 | 10/2014 |
| GB | 2513721 | 11/2014 |
| GB | 2516155 | 1/2015 |
| GB | 2517582 | 2/2015 |
| GB | 2518745 | 4/2015 |
| NL | 2012778 | 11/2014 |
| NL | 2013134 | 1/2015 |
| NL | 2013306 | 2/2015 |
| NZ | 624557 | 12/2014 |
| WO | WO 1995/032424 | 11/1995 |
| WO | WO 2000/009529 | 2/2000 |
| WO | WO 2001/025906 | 4/2001 |
| WO | WO 2001/088750 | 11/2001 |
| WO | WO 2002/065353 | 8/2002 |
| WO | WO 2004/057268 | 7/2004 |
| WO | WO 2005/013200 | 2/2005 |
| WO | WO 2005/104736 | 11/2005 |
| WO | WO 2005/116851 | 12/2005 |
| WO | WO 2008/064207 | 5/2008 |
| WO | WO 2008/121499 | 10/2008 |
| WO | WO 2009/042548 | 4/2009 |
| WO | WO 2009/051987 | 4/2009 |
| WO | WO 2009/061501 | 5/2009 |
| WO | WO 2009/123975 | 10/2009 |
| WO | WO 2010/000014 | 1/2010 |
| WO | WO 2010/030913 | 3/2010 |
| WO | WO 2010/030914 | 3/2010 |
| WO | WO 2010/030915 | 3/2010 |
| WO | WO 2010/030919 | 3/2010 |
| WO | WO 2010/030946 | 3/2010 |
| WO | WO 2010/030949 | 3/2010 |
| WO | WO 2010/098958 | 9/2010 |
| WO | WO 2011/058507 | 5/2011 |
| WO | WO 2012/061162 | 5/2012 |
| WO | WO 2012/119008 | 9/2012 |
| WO | WO 2013/010157 | 1/2013 |
| WO | WO 2013/102892 | 7/2013 |

OTHER PUBLICATIONS

"A Quick Guide to UniProtKB Swiss-Prot & TrEMBL," Sep. 2011, pp. 2.

Acklen, Laura, "Absolute Beginner's Guide to Microsoft Word 2003," Dec. 24, 2003, pp. 15-18, 34-41, 308-316.

Ananiev et al., "The New Modality API," http://web.archive.org/web/20061211011958/http://java.sun.com/developer/technicalArticles/J2SE/Desktop/javase6/modality/ Jan. 21, 2006, pp. 8.

"Andy Turner's GISRUK 2012 Notes" <https://docs.google.com/document/d/1cTmxg7mVx5gd89lqblCYvCEnHA4QAivH4l4WpyPsqE4/edit?pli=1> printed Sep. 16, 2013 in 15 pages.

Azad, Khalid, "A Visual Guide to Version Control," <http://betterexplained.com/articles/a-visual-guide-to-version-control/>, Sep. 27, 2007 in 11 pages.

Barnes et al., "Viewshed Analysis", GIS-ARC/INFO 2001, <www.evsc.virginia.edu/~jhp7e/evsc466/student_pres/Rounds.pdf>.

Beverley, Bill, "Windows Tips & Tricks," <http://alamopc.org/pcalamode/columns/beverley/bb0301.shtml>, Mar. 2001 in 5 pages.

Bluttman et al., "Excel Formulas and Functions for Dummies," 2005, Wiley Publishing, Inc., pp. 280, 284-286.

Bradbard, Matthew, "Technical Analysis Applied," <http://partners.futuresource.com/fastbreak/2007/0905.htm>, Sep. 5, 2007, pp. 6.

Breierova et al., "An Introduction to Sensitivity Analysis," Published by Massachusetts Institute of Technology, Cambridge, MA, Oct. 2001, pp. 67.

Bugzilla@Mozilla, "Bug 18726—[feature] Long-click means of invoking contextual menus not supported," http://bugzilla.mozilla.org/show_bug.cgi?id=18726 printed Jun. 13, 2013 in 11 pages.

Canese et al., "Chapter 2: PubMed: The Bibliographic Database," The NCBI Handbook, Oct. 2002, pp. 1-10.

Carver et al., "Real-Time Visibility Analysis and Rapid Viewshed Calculation Using a Voxel-Based Modelling Approach," GISRUK 2012 Conference, Apr. 11-13, Lancaster UK, Apr. 13, 2012, pp. 6.

Chen et al., "Bringing Order to the Web: Automatically Categorizing Search Results," CHI 2000, Proceedings of the SIGCHI conference on Human Factors in Computing Systems, Apr. 1-6, 2000, The Hague, The Netherlands, pp. 145-152.

Conner, Nancy, "Google Apps: The Missing Manual," May 1, 2008, pp. 15.

Delcher et al., "Identifying Bacterial Genes and Endosymbiont DNA with Glimmer," BioInformatics, vol. 23, No. 6, 2007, pp. 673-679.

Devanbu et al., "Authentic Third-party Data Publication," 2000, pp. 19, http://www.cs.ucdavis.edu/~devanbu/authdbpub.pdf.

Dramowicz, Ela, "Retail Trade Area Analysis Using the Huff Model," Directions Magazine, Jul. 2, 2005 in 10 pages, http://www.directionsmag.com/articles/retail-trade-area-analysis-using-the-huff-model/123411.

Dreyer et al., "An Object-Oriented Data Model for a Time Series Management System," Proceedings of the 7th International Working Conference on Scientific and StatisticalDatabase Management, Charlottesville, Virginia USA, Sep. 28-30, 1994, pp. 12.

Ghosh, P., "A Solution of Polygon Containment, Spatial Planning, and Other Related Problems Using Minkowski Operations," Computer Vision, Graphics, and Image Processing, 1990, vol. 49, pp. 1-35.

(56) References Cited

OTHER PUBLICATIONS

GIS-NET 3 Public—Department of Regional Planning. Planning & Zoning Information for Unincorporated LA County. Retrieved Oct. 2, 2013 from http://gis.planning.lacounty.gov/GIS-NET3_Public/Viewer.html.
Goswami, Gautam, "Quite Writly Said!," One Brick at a Time, Aug. 21, 2005, pp. 7.
Griffith, Daniel A., "A Generalized Huff Model," Geographical Analysis, Apr. 1982, vol. 14, No. 2, pp. 135-144.
Hansen et al. "Analyzing Social Media Networks with NodeXL: Insights from a Connected World", Chapter 4, pp. 53-67 and Chapter 10, pp. 143-164, published Sep. 2010.
Haralick et al., "Image Analysis Using Mathematical Morphology," Pattern Analysis and Machine Intelligence, IEEE Transactions, Jul. 1987, vol. PAMI-9, No. 4, pp. 532-550.
Hibbert et al., "Prediction of Shopping Behavior Using a Huff Model Within a GIS Framework," Healthy Eating in Context, Mar. 18, 2011, pp. 16.
Huff et al., "Calibrating the Huff Model Using ArcGIS Business Analyst," ESRI, Sep. 2008, pp. 33.
Huff, David L., "Parameter Estimation in the Huff Model," ESRI, ArcUser, Oct.-Dec. 2003, pp. 34-36.
Ipbucker, C., "Inverse Transformation for Several Pseudo-cylindrical Map Projections Using Jacobian Matrix," ICCSA 2009, Part 1 LNCS 5592, pp. 553-564.
Kahan et al., "Annotea: an open RDF infrastructure for shared WEB annotations", Computer Networks 39, pp. 589-608, 2002.
Keylines.com, "An Introduction to KeyLines and Network Visualization," Mar. 2014, <http://keylines.com/wp-content/uploads/2014/03/KeyLines-White-Paper.pdf> downloaded May 12, 2014 in 8 pages.
Keylines.com, "KeyLines Datasheet," Mar. 2014, http://keylines.com/wp-content/uploads/2014/03/KeyLines-datasheet.pdf> downloaded May 12, 2014 in 2 pages.
Keylines.com, "Visualizing Threats: Improved Cyber Security Through Network Visualization," Apr. 2014, <http://keylines.com/wp-content/uploads/2014/04/Visualizing-Threats1.pdf> downloaded May 12, 2014 in 10 pages.
Kitts, Paul, "Chapter 14: Genome Assembly and Annotation Process," The NCBI Handbook, Oct. 2002, pp. 1-21.
Levine, N., "Crime Mapping and the Crimestat Program," Geographical Analysis, 2006, vol. 38, pp. 41-56.
Liu, Tianshun, "Combining GIS and the Huff Model to Analyze Suitable Locations for a New Asian Supermarket in the Minneapolis and St. Paul, Minnesota USA," Papers in Resource Analysis, 2012, vol. 14, pp. 8.
Madden, Tom, "Chapter 16: The BLAST Sequence Analysis Tool," The NCBI Handbook, Oct. 2002, pp. 1-15.
Mandagere, Nagapramod, "Buffer Operations in GIS," http://www-users.cs.umn.edu/~npramod/enc_pdf.pdf> retrieved Jan. 28, 2010, pp. 7.
Manno et al., "Introducing Collaboration in Single-user Applications through the Centralized Control Architecture," 2010, pp. 10.
Manske, "File Saving Dialogs," <http://www.mozilla.org/editor/ui_specs/FileSaveDialogs.html>, Jan. 20, 1999, pp. 7.
Map Builder, "Rapid Mashup Development Tool for Google and Yahoo Maps!" <http://web.archive.org/web/20090626224734/http://www.mapbuilder.net/> printed Jul. 20, 2012 in 2 pages.
Map of San Jose, CA. Retrieved Oct. 2, 2013 from http://maps.bing.com.
Map of San Jose, CA. Retrieved Oct. 2, 2013 from http://maps.google.com.
Map of San Jose, CA. Retrieved Oct. 2, 2013 from http://maps.yahoo.com.
Mentzas et al. "An Architecture for Intelligent Assistance in the Forecasting Process," Proceedings of the Twenty-Eighth Hawaii International Conference on System Sciences, Jan. 3-6, 1995, vol. 3, pp. 167-176.
Microsoft—Developer Network, "Getting Started with VBA in Word 2010," Apr. 2010, <http://msdn.microsoft.com/en-us/library/ff604039%28v=office.14%29.aspx> as printed Apr. 4, 2014 in 17 pages.
Microsoft Office—Visio, "About connecting shapes," <http://office.microsoft.com/en-us/visio-help/about-connecting-shapes-HP085050369.aspx> printed Aug. 4, 2011 in 6 pages.
Microsoft Office—Visio, "Add and glue connectors with the Connector tool," <http://office.microsoft.com/en-us/visio-help/add-and-glue-connectors-with-the-connector-tool-HA010048532.aspx?CTT=1> printed Aug. 4, 2011 in 1 page.
Microsoft, "How Word Creates and Recovers the AutoRecover files," <http://support.microsoft.com/kb/107686>, Article ID: 107686, printed Feb. 11, 2010 in 3 pages.
Microsoft, "Introduction to Versioning," <http://office.microsoft.com/en-us/sharepointtechnolgy/HA010021576.aspx?mode=print>, 2007 in 3 pages.
Microsoft, "Managing Versions and Checking Documents In and Out (Windows SharePoint Services 2.0)," <http://technet.microsoft.com/en-us/library/cc287876.aspx>, Aug. 22, 2005 in 2 pages.
Mizrachi, Ilene, "Chapter 1: GenBank: The Nuckeotide Sequence Database," The NCBI Handbook, Oct. 2002, pp. 1-14.
Murray, C., Oracle Spatial Developer's Guide—6 Coordinate Systems (Spatial Reference Systems), <http://docs.oracle.com/cd/B28359_01/appdev.111/b28400.pdf>, Jun. 2009.
Open Street Map, "Amm's Diary:Unconnected ways and other data quality issues," http://www.openstreetmap.org/user/amm/diary printed Jul. 23, 2012 in 3 pages.
Palmas et al., "An Edge-Bunding Layout for Interactive Parallel Coordinates" 2014 IEEE Pacific Visualization Symposium, pp. 57-64.
POI Editor, "How to: Create Your Own Points of Interest," a<http://www.poieditor.com/articles/how_to_create_your_own_points_of_interest/> printed Jul. 22, 2012 in 4 pages.
Pozzi et al., "Vegetation and Population Density in Urban and Suburban Areas in the U.S.A." Third International Symposium of Remote Sensing of Urban Areas Istanbul, Turkey, Jun. 2002, pp. 8.
Qiu, Fang, "3d Analysis and Surface Modeling", <http://web.archive.org/web/20091202221925/http://www.utsa.edu/lrsg/Teaching/EES6513/08-3D.pdf> printed Sep. 16, 2013 in 26 pages.
Reddy et al., "Under the hood of GeoVRML 1.0," SRI International, Proceedings of the fifth symposium on Virtual Reality Modeling Language (Web3D-VRML), New York, NY, Feb. 2000, pp. 23-28. <http://pdf.aminer.org/000/648/038/under_the_hood_of_geovrml.pdf>.
Reibel et al., "Areal Interpolation of Population Counts Using Pre-classified Land Cover Data," Population Research and Policy Review, 2007, vol. 26, pp. 619-633.
Reibel, M., "Geographic Information Systems and Spatial Data Processing in Demography: a Review," Population Research and Policy Review, 2007, vol. 26, pp. 601-618.
Rizzardi et al., "Interfacing U.S. Census Map Files with Statistical Graphics Software: Application and Use in Epidemiology," Statistics in Medicine, Oct. 1993, vol. 12, No. 19-20, pp. 1953-1964.
Rouse, Margaret, "OLAP Cube," <http://searchdatamanagement.techtarget.com/definition/OLAP-cube>, Apr. 28, 2012, pp. 16.
Schwieger, V., "Sensitivity Analysis as a General Tool for Model Optimisation—Examples for Trajectory Estimation," 3rd IAG/12th FIG Symposium, Baden, Germany, May 22-24, 2006, Published by IAG, 2006, pp. 10.
Schwieger, V., "Variance-Based Sensitivity Analysis for Model Evaluation in Engineering Surveys," INGEO 2004 and FIG Regional Central and Eastern European Conference on Engineering Surveying, Nov. 11-13, 2004, Published by INGEO, Bratislava, Slovakia, 2004, pp. 10.
Sigrist, et al., "PROSITE, a Protein Domain Database for Functional Characterization and Annotation," Nucleic Acids Research, 2010, vol. 38, pp. D161-D166.
Sirotkin et al., "Chapter 13: The Processing of Biological Sequence Data at NCBI," The NCBI Handbook, Oct. 2002, pp. 1-11.

(56) References Cited

OTHER PUBLICATIONS

Snyder, "Map Projections—A Working Manual," U.S. Geological Survey Professional paper 1395, United States Government Printing Office, Washington: 1987, pp. 11-21 and 60-70.
Sonris, "Using the Area of Interest Tools," <http://web.archive.org/web/20061001053327/http://sonris-www.dnr.state.la.us/gis/instruct_files/tutslide12> printed Jan. 3, 2013 in 1 page.
Tangelder et al., "Freeform Shape Matching Using Minkowski Operations," The Netherlands, Jun. 1996, pp. 12.
"The FASTA Program Package," fasta-36.3.4, Mar. 25, 2011, pp. 29.
Traichal et al., "Forecastable Default Risk Premia and Innovations," Journal of Economics and Finance, Fall 1999, vol. 23, No. 3, pp. 214-225.
UMBC CMSC 341 Introduction to Trees dated Aug. 3, 2007.
VB Forums, "Buffer A Polygon," Internet Citation, <http://www.vbforums.com/showthread.php?198436-Buffer-a-Polygon>, Specifically Thread #1, #5 & #11 retrieved on May 2, 2013, pp. 8.
Vivid Solutions, "JTS Topology Suite: Technical Specifications," <http://www.vividsolutions.com/jts/bin/JTS%20Technical%20Specs.pdf> Version 1.4, 2003, pp. 36.
Wikipedia, "Douglas-Peucker—Algorithms," <http://de.wikipedia.org/w/index.php?title=Douglas-Peucker-Algorithmus&oldid=91846042> printed Jul. 2011, pp. 2.
Wikipedia, "Ramer-Douglas-Peucker Algorithm," <http://en.wikipedia.org/wiki/Ramer%E2%80%93Douglas%E2%80%93Peucker_algorithm> printed Jul. 2011, pp. 3.
Wongsuphasawat et al., "Visual Analytics for Transportation Incident Data Sets," Transportation Research Record 2138, 2009, pp. 135-145.
Woodbridge, Stephen, [geos-devel] Polygon simplification, <http://lists.osgeo.org/pipermail/geos-devel/2011-May/005210.html> dated May 8, 2011, pp. 3.
Yahoo, <http://web.archive.org/web/20020124161606/http://finance.yahoo.com/q?s=%5eIXIC&d=c . . . > printed Mar. 6, 2012 in 2 pages.
Issue Notification for U.S. Appl. No. 13/917,571 dated Aug. 5, 2014.
Notice of Allowance for U.S. Appl. No. 14/102,394 dated Aug. 25, 2014.
Notice of Allowance for U.S. Appl. No. 14/108,187 dated Aug. 29, 2014.
Notice of Allowance for U.S. Appl. No. 14/135,289 dated Oct. 14, 2014.
Notice of Allowance for U.S. Appl. No. 14/268,964 dated Dec. 3, 2014.
Notice of Allowance for U.S. Appl. No. 13/948,859 dated Dec. 10, 2014.
Notice of Allowance for U.S. Appl. No. 14/149,608 dated Aug. 5, 2014.
Official Communication for New Zealand Patent Application No. 624557 dated May 14, 2014.
Official Communication for New Zealand Patent Application No. 628585 dated Aug. 26, 2014.
Official Communication for European Patent Application No. 14158861.6 dated Jun. 16, 2014.
Official Communication for New Zealand Patent Application No. 622517 dated Apr. 3, 2014.
Official Communication for New Zealand Patent Application No. 628263 dated Aug. 12, 2014.
Official Communication for Great Britain Patent Application No. 1404457.2 dated Aug. 14, 2014.
Official Communication for New Zealand Patent Application No. 627962 dated Aug. 5, 2014.
Official Communication for European Patent Application No. 14159464.8 dated Jul. 31, 2014.
Official Communication for European Patent Application No. 14159464.8 dated Aug. 20, 2014.
Official Communication for European Patent Application No. 14159464.8 dated Sep. 22, 2014.
Official Communication for New Zealand Patent Application No. 628840 dated Aug. 28, 2014.
Official Communication in New Zealand Application No. 628495 dated Aug. 19, 2014.
Official Communication for Great Britain Patent Application No. 1408025.3 dated Nov. 6, 2014.
Official Communication for New Zealand Patent Application No. 622513 dated Apr. 3, 2014.
Official Communication for New Zealand Patent Application No. 628161 dated Aug. 25, 2014.
Official Communication for U.S. Appl. No. 14/289,596 dated Jul. 18, 2014.
Official Communication for U.S. Appl. No. 14/289,599 dated Jul. 22, 2014.
Official Communication for U.S. Appl. No. 14/225,160 dated Jul. 29, 2014.
Official Communication for U.S. Appl. No. 14/268,964 dated Sep. 3, 2014.
Official Communication for U.S. Appl. No. 14/225,084 dated Sep. 2, 2014.
Official Communication for U.S. Appl. No. 14/294,098 dated Aug. 15, 2014.
Official Communication for U.S. Appl. No. 14/148,568 dated Oct. 22, 2014.
Official Communication for U.S. Appl. No. 14/225,006 dated Sep. 10, 2014.
Official Communication for U.S. Appl. No. 14/294,098 dated Nov. 6, 2014.
Official Communication for U.S. Appl. No. 14/306,138 dated Sep. 23, 2014.
Official Communication for U.S. Appl. No. 14/306,154 dated Sep. 9, 2014.
Official Communication for U.S. Appl. No. 14/306,147 dated Sep. 9, 2014.
Official Communication for U.S. Appl. No. 14/319,765 dated Nov. 25, 2014.
Official Communication for U.S. Appl. No. 14/323,935 dated Nov. 28, 2014.
Official Communication for U.S. Appl. No. 14/326,738 dated Dec. 2, 2014.
Official Communication for U.S. Appl. No. 14/225,160 dated Oct. 22, 2014.
Official Communication for U.S. Appl. No. 12/840,673 dated Sep. 17, 2014.
Official Communication for U.S. Appl. No. 12/210,947 dated Aug. 19, 2014.
"A Tour of Pinboard," <http://pinboard.in/tour> as printed May 15, 2014 in 6 pages.
"A Word About Banks and the Laundering of Drug Money," Aug. 18, 2012, http://www.golemxiv.co.uk/2012/08/a-word-about-banks-and-the-laundering-of-drug-money/.
Abbey, Kristen, "Review of Google Docs," May 1, 2007, pp. 2.
About 80 Minutes, "Palantir in a Number of Parts—Part 6—Graph," Mar. 21, 2013, pp. 1-6, retrieved from the internet http://about80minutes.blogspot.nl/2013/03/palantir-in-number-of-parts-part-6-graph.html retrieved on Aug. 18, 2015.
Adams et al., "Worklets: A Service-Oriented Implementation of Dynamic Flexibility in Workflows," R. Meersman, Z. Tari et al. (Eds.): OTM 2006, LNCS, 4275, pp. 291-308, 2006.
Alur et al., "Chapter 2: IBM InfoSphere DataStage Stages," IBM InfoSphere DataStage Data Flow and Job Design, Jul. 1, 2008, pp. 35-137.
Amnet, "5 Great Tools for Visualizing Your Twitter Followers," posted Aug. 4, 2010, http://www.amnetblog.com/component/content/article/115-5-grate-tools-for-visualizing-your-twitter-followers.html.
Anonymous, "A Real-World Problem of Matching Records," Nov. 2006, <http://grupoweb.upf.es/bd-web/slides/ullman.pdf> pp. 1-16.
Anonymous, "BackTult—JD Edwards One World Version Control System", in 1 page, Jul. 23, 2007.

(56) References Cited

OTHER PUBLICATIONS

Appacts, "Smart Thinking for Super Apps," <http://www.appacts.com> Printed Jul. 18, 2013 in 4 pages.
Apsalar, "Data Powered Mobile Advertising," "Free Mobile App Analytics" and various analytics related screen shots <http://apsalar.com> Printed Jul. 18, 2013 in 8 pages.
Boyce, Jim, "Microsoft Outlook 2010 Inside Out," Aug. 1, 2010, retrieved from the internet https://capdtron.files.wordpress.com/2013/01/outlook-2010-inside_out.pdf.
Brandel, Mary, "Data Loss Prevention Dos and Don'ts," <http://web.archive.org/web/20080724024847/http://www.csoonline.com/article/221272/Dos_and_Don_ts_for_Data_Loss_Prevention>, Oct. 10, 2007, pp. 5.
Capptain—Pilot Your Apps, <http://www.capptain.com> Printed Jul. 18, 2013 in 6 pages.
Celik, Tantek, "CSS Basic User Interface Module Level 3 (CSS3 UI)," Section 8 Resizing and Overflow, Jan. 17, 2012, retrieved from internet http://www.w3.org/TR/2012/WD-css3-ui-20120117/#resizing-amp-overflow retrieved on May 18, 2015.
Chaudhuri et al., "An Overview of Business Intelligence Technology," Communications of the ACM, Aug. 2011, vol. 54, No. 8.
Chung, Chin-Wan, "Dataplex: An Access to Heterogeneous Distributed Databases," Communications of the ACM, Association for Computing Machinery, Inc., vol. 33, No. 1, Jan. 1, 1990, pp. 70-80.
Cohn, et al., "Semi-supervised clustering with user feedback," Constrained Clustering: Advances in Algorithms, Theory, and Applications 4.1 (2003): 17-32.
Countly Mobile Analytics, <http://count.ly/> Printed Jul. 18, 2013 in 9 pages.
"GrabUp—What a Timesaver!" <http://atlchris.com/191/grabup/>, Aug. 11, 2008, pp. 3.
Definition "Identify", downloaded Jan. 22, 2015, 1 page.
Definition "Overlay", downloaded Jan. 22, 2015, 1 page.
Delicious, <http://delicious.com/> as printed May 15, 2014 in 1 page.
Distimo—App Analytics, <http://www.distimo.com/app-analytics> Printed Jul. 18, 2013 in 5 pages.
"E-MailRelay," <http://web.archive.org/web/20080821175021/http://emailrelay.sourceforge.net/> Aug. 21, 2008, pp. 2.
Ferreira et al., "A Scheme for Analyzing Electronic Payment Systems," Basil 1997.
Flurry Analytics, <http://www.flurry.com/> Printed Jul. 18, 2013 in 14 pages.
Galliford, Miles, "SnagIt Versus Free Screen Capture Software: Critical Tools for Website Owners," <http://www.subhub.com/articles/free-screen-capture-software>, Mar. 27, 2008, pp. 11.
Gesher, Ari, "Palantir Screenshots in the Wild: Swing Sightings," The Palantir Blog, Sep. 11, 2007, pp. 1-12, retrieved from the internet https://www.palantir.com/2007/09/palantir-screenshots/ retrieved on Aug. 18, 2015.
Google Analytics Official Website—Web Analytics & Reporting, <http://www.google.com/analytics.index.html> Printed Jul. 18, 2013 in 22 pages.
Gorr et al., "Crime Hot Spot Forecasting: Modeling and Comparative Evaluation", Grant 98-IJ-CX-K005, May 6, 2002, 37 pages.
Gu et al., "Record Linkage: Current Practice and Future Directions," Jan. 15, 2004, pp. 32.
Hardesty, "Privacy Challenges: Analysis: It's Surprisingly Easy to Identify Individuals from Credit-Card Metadata," MIT News on Campus and Around the World, MIT News Office, Jan. 29, 2015, 3 pages.
Hogue et al., "Thresher: Automating the Unwrapping of Semantic Content from the World Wide Web," 14th International Conference on World Wide Web, WWW 2005: Chiba, Japan, May 10-14, 2005, pp. 86-95.
Hua et al., "A Multi-attribute Data Structure with Parallel Bloom Filters for Network Services", HiPC 2006, LNCS 4297, pp. 277-288, 2006.
"HunchLab: Heat Map and Kernel Density Calculation for Crime Analysis," Azavea Journal, printed from www.azavea.com/blogs/newsletter/v4i4/kernel-density-capabilities-added-to-hunchlab/ on Sep. 9, 2014, 2 pages.
Jelen, Bill, "Excel 2013 in Depth, Video Enhanced Edition," Jan. 25, 2013.
JetScreenshot.com, "Share Screenshots via Internet in Seconds," <http://web.archive.org/web/20130807164204/http://www.jetscreenshot.com/>, Aug. 7, 2013, pp. 1.
Johnson, Steve, "Access 2013 on demand," Access 2013 on Demand, May 9, 2013, Que Publishing.
Kontagent Mobile Analytics, <http://www.kontagent.com/> Printed Jul. 18, 2013 in 9 pages.
Kwout, <http://web.archive.org/web/20080905132448/http://www.kwout.com/> Sep. 5, 2008, pp. 2.
Li et al., "Interactive Multimodal Visual Search on Mobile Device," IEEE Transactions on Multimedia, vol. 15, No. 3, Apr. 1, 2013, pp. 594-607.
Lim et al., "Resolving Attribute Incompatibility in Database Integration: An Evidential Reasoning Approach," Department of Computer Science, University of Minnesota, 1994, <http://reference.kfupm.edu.sa/content/r/e/resolving_attribute_incompatibility_in_d_531691.pdf> pp. 1-10.
Litwin et al., "Multidatabase Interoperability," IEEE Computer, Dec. 1986, vol. 19, No. 12, http://www.lamsade.dauphine.fr/~litwin/mdb-interoperability.pdf, pp. 10-18.
Localytics—Mobile App Marketing & Analytics, <http://www.localytics.com/> Printed Jul. 18, 2013 in 12 pages.
Microsoft Windows, "Microsoft Windows Version 2002 Print Out 2," 2002, pp. 1-6.
Microsoft, "Registering an Application to a URI Scheme," <http://msdn.microsoft.com/en-us/library/aa767914.aspx>, printed Apr. 4, 2009 in 4 pages.
Microsoft, "Using the Clipboard," <http://msdn.microsoft.com/en-us/library/ms649016.aspx>, printed Jun. 8, 2009 in 20 pages.
Mixpanel—Mobile Analytics, <https://mixpanel.com/> Printed Jul. 18, 2013 in 13 pages.
"Money Laundering Risks and E-Gaming: A European Overview and Assessment," 2009, http://www.cf.ac.uk/socsi/resources/Levi_Final_Money_Laundering_Risks_egaming.pdf.
Nadeau et al., "A Survey of Named Entity Recognition and Classification," Jan. 15, 2004, pp. 20.
Nierman, "Evaluating Structural Similarity in XML Documents", 6 pages, 2002.
Nin et al., "On the Use of Semantic Blocking Techniques for Data Cleansing and Integration," 11th International Database Engineering and Applications Symposium, 2007, pp. 9.
Nitro, "Trick: How to Capture a Screenshot as PDF, Annotate, Then Share It," <http://blog.nitropdf.com/2008/03/04/trick-how-to-capture-a-screenshot-as-pdf-annotate-it-then-share/>, Mar. 4, 2008, pp. 2.
Nolan et al., "MCARTA: A Malicious Code Automated Run-Time Analysis Framework," Homeland Security, 2012 IEEE Conference on Technologies for, Nov. 13, 2012, pp. 13-17.
Olanoff, Drew, "Deep Dive with the New Google Maps for Desktop with Google Earth Integration, It's More than Just a Utility," May 15, 2013, pp. 1-6, retrieved from the internet: http://web.archive.org/web/20130515230641/http://techcrunch.com/2013/05/15/deep-dive-with-the-new-google-maps-for-desktop-with-google-earth-integration-its-more-than-just-a-utility/.
Online Tech Tips, "Clip2Net—Share files, folders and screenshots easily," <http://www.online-tech-tips.com/free-software-downloads/share-files-folders-screenshots/>, Apr. 2, 2008, pp. 5.
Open Web Analytics (OWA), <http://www.openwebanalytics.com/> Printed Jul. 19, 2013 in 5 pages.
O'Reilly.com, http://oreilly.com/digitalmedia/2006/01/01/mac-os-x-screenshot-secrets.html published Jan. 1, 2006 in 10 pages.
Palantir Technolgies, "Palantir Labs—Timeline," Oct. 1, 2010, retrieved from the internet https://www.youtube.com/watch?v=JCgDW5bru9M retrieved on Aug. 19, 2015.
Perdisci et al., "Behavioral Clustering of HTTP-Based Malware and Signature Generation Using Malicious Network Traces," USENIX, Mar. 18, 2010, pp. 1-14.

(56) References Cited

OTHER PUBLICATIONS

Piwik—Free Web Analytics Software. <http://piwik.org/> Printed Jul. 19, 2013 in18 pages.
"Potential Money Laundering Warning Signs," snapshot taken 2003, https://web.archive.org/web/20030816090055/http://finsolinc.com/ANTI-MONEY%20LAUNDERING%20TRAINING%20GUIDES.pdf.
Pythagoras Communications Ltd., "Microsoft CRM Duplicate Detection," Sep. 13, 2011, https://www.youtube.com/watch?v=j-7Qis0D0Kc.
Qiang et al., "A Mutual-Information-Based Approach to Entity Reconciliation in Heterogeneous Databases," Proceedings of 2008 International Conference on Computer Science & Software Engineering, IEEE Computer Society, New York, NY, Dec. 12-14, 2008, pp. 666-669.
Quest, "Toad for ORACLE 11.6—Guide to Using Toad," Sep. 24, 2012, pp. 1-162.
"Refresh CSS Ellipsis When Resizing Container—Stack Overflow," Jul. 31, 2013, retrieved from internet http://stackoverflow.com/questions/17964681/refresh-css-ellipsis-when-resizing-container, retrieved on May 18, 2015.
Schroder, Stan, "15 Ways to Create Website Screenshots," <http://mashable.com/2007/08/24/web-screenshots/>, Aug. 24, 2007, pp. 2.
Sekine et al., "Definition, Dictionaries and Tagger for Extended Named Entity Hierarchy," May 2004, pp. 1977-1980.
Shi et al., "A Scalable Implementation of Malware Detection Based on Network Connection Behaviors," 2013 International Conference on Cyber-Enabled Distributed Computing and Knowledge Discovery, IEEE, Oct. 10, 2013, pp. 59-66.
SnagIt, "SnagIt 8.1.0 Print Out 2," Software release date Jun. 15, 2006, pp. 1-3.
SnagIt, "SnagIt 8.1.0 Print Out," Software release date Jun. 15, 2006, pp. 6.
SnagIt, "SnagIt Online Help Guide," <http://download.techsmith.com/snagit/docs/onlinehelp/enu/snagit_help.pdf>, TechSmith Corp., Version 8.1, printed Feb. 7, 2007, pp. 284.
StatCounter—Free Invisible Web Tracker, Hit Counter and Web Stats, <http://statcounter.com/> Printed Jul. 19, 2013 in 17 pages.
Symantec Corporation, "E-Security Begins with Sound Security Policies," Announcement Symantec, Jun. 14, 2001.
TestFlight—Beta Testing on the Fly, <http://testflightapp.com/> Printed Jul. 18, 2013 in 3 pages.
Thompson, Mick, "Getting Started with GEO," Getting Started with GEO, Jul. 26, 2011.
trak.io, <http://trak.io/> printed Jul. 18, 2013 in 3 pages.
Umagandhi et al., "Search Query Recommendations Using Hybrid User Profile with Query Logs," International Journal of Computer Applications, vol. 80, No. 10, Oct. 1, 2013, pp. 7-18.
UserMetrix, <http://usermetrix.com/android-analytics> printed Jul. 18, 2013 in 3 pages.
"Using Whois Based Geolocation and Google Maps API for Support Cybercrime Investigations," http://wseas.us/e-library/conferences/2013/Dubrovnik/TELECIRC/TELECIRC-32.pdf.
Valentini et al., "Ensembles of Learning Machines", M. Marinaro and R. Tagliaferri (Eds.): WIRN VIETRI 2002, LNCS 2486, pp. 3-20.
Vose et al., "Help File for ModelRisk Version 5," 2007, Vose Software, pp. 349-353. [Uploaded in 2 Parts].
Wang et al., "Research on a Clustering Data De-Duplication Mechanism Based on Bloom Filter," IEEE 2010, 5 pages.
Warren, Christina, "TUAW Faceoff: Screenshot apps on the firing line," <http://www.tuaw.com/2008/05/05/tuaw-faceoff-screenshot-apps-on-the-firing-line/>, May 5, 2008, pp. 11.
Wikipedia, "Federated Database System," Sep. 7, 2013, retrieved from the internet on Jan. 27, 2015 http://en.wikipedia.org/w/index.php?title=Federated_database_system&oldid=571954221.
Wikipedia, "Multimap," Jan. 1, 2013, https://en.wikipedia.org/w/index.php?title=Multimap&oldid=530800748.
Winkler, William E., "Bureau of the Census Statistical Research Division Record Linkage Software and Methods for Merging Administrative Lists," Statistical Research Report Series No. RR2001/03, Jul. 23, 2001, https://www.census.gov/srd/papers/pdf/rr2001-03.pdf, retrieved on Mar. 9, 2016.
Wright et al., "Palantir Technologies VAST 2010 Challenge Text Records—Investigations into Arms Dealing," Oct. 29, 2010, pp. 1-10, retrieved from the internet http://hcil2.cs.umd.edu/newvarepository/VAST%20Challenge%202010/challenges/MC1%20-%20Investigations%20into%20Arms%20Dealing/entries/Palantir%20Technologies/ retrieved on Aug. 20, 2015.
Yang et al., "HTML Page Analysis Based on Visual Cues", A129, pp. 859-864, 2001.
Zhao et al., "Entity Matching Across Heterogeneous Data Sources: An Approach Based on Constrained Cascade Generalization," Data & Knowledge Engineering, vol. 66, No. 3, Sep. 2008, pp. 368-381.
European Search Report for European Patent Application No. 09812700.3 dated Apr. 3, 2014.
Notice of Acceptance for Australian Patent Application No. 2014203669 dated Jan. 21, 2016.
Notice of Acceptance for Australian Patent Application No. 2014250678 dated Oct. 7, 2015.
Notice of Allowance for U.S. Appl. No. 14/306,154 dated Mar. 31, 2017.
Notice of Allowance for U.S. Appl. No. 12/556,307 dated Mar. 21, 2016.
Notice of Allowance for U.S. Appl. No. 12/556,307 dated Jan. 4, 2016.
Notice of Allowance for U.S. Appl. No. 12/556,318 dated Nov. 2, 2015.
Notice of Allowance for U.S. Appl. No. 13/247,987 dated Mar. 17, 2016.
Notice of Allowance for U.S. Appl. No. 14/094,418 dated Jan. 25, 2016.
Notice of Allowance for U.S. Appl. No. 14/192,767 dated Dec. 16, 2014.
Notice of Allowance for U.S. Appl. No. 14/225,084 dated May 4, 2015.
Notice of Allowance for U.S. Appl. No. 14/265,637 dated Feb. 13, 2015.
Notice of Allowance for U.S. Appl. No. 14/294,098 dated Dec. 29, 2014.
Notice of Allowance for U.S. Appl. No. 14/304,741 dated Apr. 7, 2015.
Notice of Allowance for U.S. Appl. No. 14/306,138 dated Mar. 30, 2017.
Notice of Acceptance for Australian Patent Application No. 2013251186 dated Nov. 6, 2015.
Notice of Allowance for U.S. Appl. No. 14/319,161 dated May 4, 2015.
Notice of Allowance for U.S. Appl. No. 14/323,935 dated Oct. 1, 2015.
Notice of Allowance for U.S. Appl. No. 14/326,738 dated Nov. 18, 2015.
Notice of Allowance for U.S. Appl. No. 14/473,552 dated Jul. 24, 2015.
Notice of Allowance for U.S. Appl. No. 14/473,860 dated Jan. 5, 2015.
Notice of Allowance for U.S. Appl. No. 14/479,863 dated Mar. 31, 2015.
Notice of Allowance for U.S. Appl. No. 14/504,103 dated May 18, 2015.
Notice of Allowance for U.S. Appl. No. 14/552,336 dated Nov. 3, 2015.
Notice of Allowance for U.S. Appl. No. 14/616,080 dated Apr. 2, 2015.
Notice of Allowance for U.S. Appl. No. 14/746,671 dated Jan. 21, 2016.
Notice of Allowance for U.S. Appl. No. 14/923,364 dated May 6, 2016.
Notice of Allowance for U.S. Appl. No. 14/948,009 dated May 6, 2016.
Official Commuincation for Australian Patent Application No. 2014202442 dated Mar. 19, 2015.

(56) References Cited

OTHER PUBLICATIONS

Official Communciation for Australian Patent Application No. 2014201506 dated Feb. 27, 2015.
Official Communication for Australian Patent Application No. 2013251186 dated Mar. 12, 2015.
Official Communication for Australian Patent Application No. 2014201507 dated Feb. 27, 2015.
Official Communication for Australian Patent Application No. 2014201511 dated Feb. 27, 2015.
Official Communication for Australian Patent Application No. 2014203669 dated May 29, 2015.
Official Communication for Australian Patent Application No. 2014210604 dated Jun. 5, 2015.
Official Communication for Australian Patent Application No. 2014210614 dated Jun. 5, 2015.
Official Communication for Australian Patent Application No. 2014213553 dated May 7, 2015.
Official Communication for Australian Patent Application No. 2014250678 dated Jun. 17, 2015.
Official Communication for Canadian Patent Application No. 2831660 dated Jun. 9, 2015.
Official Communication for European Patent Application No. 10188239.7 dated Mar. 24, 2016.
Official Communication for European Patent Application No. 12181585.6 dated Sep. 4, 2015.
Official Communication for European Patent Application No. 14158958.0 dated Mar. 11, 2016.
Official Communication for European Patent Application No. 14158958.0 dated Apr. 16, 2015.
Official Communication for European Patent Application No. 14158958.0 dated Jun. 3, 2014.
Official Communication for European Patent Application No. 14158977.0 dated Jun. 10, 2014.
Official Communication for European Patent Application No. 14158977.0 dated Mar. 11, 2016.
Official Communication for European Patent Application No. 14158977.0 dated Apr. 16, 2015.
Official Communication for European Patent Application No. 14180142.3 dated Feb. 6, 2015.
Official Communication for European Patent Application No. 14180281.9 dated Jan. 26, 2015.
Official Communication for European Patent Application No. 14180321.3 dated Apr. 17, 2015.
Official Communication for European Patent Application No. 14180432.8 dated Jun. 23, 2015.
Official Communication for European Patent Application No. 14186225.0 dated Feb. 13, 2015.
Official Communication for European Patent Application No. 14187739.9 dated Jul. 6, 2015.
Official Communication for European Patent Application No. 14187996.5 dated Feb. 12, 2015.
Official Communication for European Patent Application No. 14189344.6 dated Feb. 20, 2015.
Official Communication for European Patent Application No. 14189347.9 dated Mar. 4, 2015.
Official Communication for European Patent Application No. 14189802.3 dated May 11, 2015.
Official Communication for European Patent Application No. 14191540.5 dated May 27, 2015.
Official Communication for European Patent Application No. 14197879.1 dated Apr. 28, 2015.
Official Communication for European Patent Application No. 14197895.7 dated Apr. 28, 2015.
Official Communication for European Patent Application No. 14197938.5 dated Apr. 28, 2015.
Official Communication for European Patent Application No. 14199182.8 dated Mar. 13, 2015.
Official Communication for European Patent Application No. 14200246.8 dated May 29, 2015.
Official Communication for European Patent Application No. 14200298.9 dated May 13, 2015.
Official Communication for European Patent Application No. 15155845.9 dated Oct. 6, 2015.
Official Communication for European Patent Application No. 15165244.3 dated Aug. 27, 2015.
Official Communication for European Patent Application No. 15166137.8 dated Sep. 14, 2015.
Official Communication for European Patent Application No. 15175106.2 dated Nov. 5, 2015.
Official Communication for European Patent Application No. 15175151.8 dated Nov. 25, 2015.
Official Communication for European Patent Application No. 15181419.1 dated Sep. 29, 2015.
Official Communication for European Patent Application No. 15183721.8 dated Nov. 23, 2015.
Official Communication for European Patent Application No. 15184764.7 dated Dec. 14, 2015.
Official Communication for European Patent Application No. 15200073.3 dated Mar. 30, 2016.
Official Communication for Great Britain Patent Application No. 1404486.1 dated May 21, 2015.
Official Communication for Great Britain Patent Application No. 1404486.1 dated Aug. 27, 2014.
Official Communication for Great Britain Patent Application No. 1404489.5 dated May 21, 2015.
Official Communication for Great Britain Patent Application No. 1404489.5 dated Aug. 27, 2014.
Official Communication for Great Britain Patent Application No. 1404489.5 dated Oct. 6, 2014.
Official Communication for Great Britain Patent Application No. 1404499.4 dated Jun. 11, 2015.
Official Communication for Great Britain Patent Application No. 1404499.4 dated Aug. 20, 2014.
Official Communication for Great Britain Patent Application No. 1404499.4 dated Sep. 29, 2014.
Official Communication for Great Britain Patent Application No. 1404574.4 dated Dec. 18, 2014.
Official Communication for Great Britain Patent Application No. 1411984.6 dated Dec. 22, 2014.
Official Communication for Great Britain Patent Application No. 1411984.6 dated Jan. 8, 2016.
Official Communication for Great Britain Patent Application No. 1413935.6 dated Jan. 27, 2015.
Official Communication for Netherlands Patent Application No. 2011729 dated Aug. 13, 2015.
Official Communication for Netherlands Patent Application No. 2012417 dated Sep. 18, 2015.
Official Communication for Netherlands Patent Application No. 2012421 dated Sep. 18, 2015.
Official Communication for Netherlands Patent Application No. 2012437 dated Sep. 18, 2015.
Official Communication for Netherlands Patent Application No. 2012438 dated Sep. 21, 2015.
Official Communication for Netherlands Patent Application No. 2013134 dated Apr. 20, 2015.
Official Communication for Netherlands Patent Application No. 2013306 dated Apr. 24, 2015.
Official Communication for New Zealand Patent Application No. 622389 dated Mar. 20, 2014.
Official Communication for New Zealand Patent Application No. 622404 dated Mar. 20, 2014.
Official Communication for New Zealand Patent Application No. 622439 dated Mar. 24, 2014.
Official Communication for New Zealand Patent Application No. 622439 dated Jun. 6, 2014.
Official Communication for New Zealand Patent Application No. 622473 dated Jun. 19, 2014.
Official Communication for New Zealand Patent Application No. 622473 dated Mar. 27, 2014.
Official Communication for New Zealand Patent Application No. 622484 dated Apr. 2, 2014.

(56) References Cited

OTHER PUBLICATIONS

Official Communication for U.S. Appl. No. 12/556,307 dated Oct. 1, 2013.
Official Communication for U.S. Appl. No. 12/556,307 dated Feb. 13, 2012.
Official Communication for U.S. Appl. No. 12/556,307 dated Mar. 14, 2014.
Official Communication for U.S. Appl. No. 12/556,307 dated Sep. 2, 2011.
Official Communication for U.S. Appl. No. 12/556,307 dated Jun. 9, 2015.
Official Communication for U.S. Appl. No. 12/556,318 dated Jul. 2, 2015.
Official Communication for U.S. Appl. No. 12/556,321 dated Jul. 7, 2015.
Official Communication for U.S. Appl. No. 13/247,987 dated Apr. 2, 2015.
Official Communication for U.S. Appl. No. 13/247,987 dated Sep. 22, 2015.
Official Communication for U.S. Appl. No. 13/669,274 dated Aug. 26, 2015.
Official Communication for U.S. Appl. No. 13/669,274 dated May 6, 2015.
Official Communication for U.S. Appl. No. 13/827,491 dated Dec. 1, 2014.
Official Communication for U.S. Appl. No. 13/827,491 dated Apr. 22, 2014.
Official Communication for U.S. Appl. No. 13/827,491 dated Jun. 22, 2015.
Official Communication for U.S. Appl. No. 13/827,491 dated May 22, 2017.
Official Communication for U.S. Appl. No. 13/827,491 dated Sep. 28, 2016.
Official Communication for U.S. Appl. No. 13/827,491 dated Mar. 30, 2016.
Official Communication for U.S. Appl. No. 13/827,491 dated Oct. 9, 2015.
Official Communication for U.S. Appl. No. 13/831,791 dated Mar. 4, 2015.
Official Communication for U.S. Appl. No. 13/835,688 dated Jun. 17, 2015.
Official Communication for U.S. Appl. No. 13/839,026 dated Aug. 4, 2015.
Official Communication for U.S. Appl. No. 14/014,313 dated Jun. 18, 2015.
Official Communication for U.S. Appl. No. 14/014,313 dated Feb. 26, 2016.
Official Communication for U.S. Appl. No. 14/045,720 dated Mar. 24, 2014.
Official Communication for U.S. Appl. No. 14/045,720 dated Dec. 27, 2013.
Official Communication for U.S. Appl. No. 14/045,720 dated Sep. 9, 2014.
Official Communication for U.S. Appl. No. 14/134,558 dated Oct. 7, 2015.
Official Communication for U.S. Appl. No. 14/141,252 dated Oct. 8, 2015.
Official Communication for U.S. Appl. No. 14/148,568 dated Mar. 26, 2015.
Official Communication for U.S. Appl. No. 14/196,814 dated May 5, 2015.
Official Communication for U.S. Appl. No. 14/225,006 dated Sep. 2, 2015.
Official Communication for U.S. Appl. No. 14/225,006 dated Dec. 21, 2015.
Official Communication for U.S. Appl. No. 14/225,006 dated Feb. 27, 2015.
Official Communication for U.S. Appl. No. 14/225,084 dated Sep. 11, 2015.
Official Communication for U.S. Appl. No. 14/225,084 dated Feb. 20, 2015.
Official Communication for U.S. Appl. No. 14/225,084 dated Jan. 4, 2016.
Official Communication for U.S. Appl. No. 14/225,160 dated Feb. 11, 2015.
Official Communication for U.S. Appl. No. 14/225,160 dated Aug. 12, 2015.
Official Communication for U.S. Appl. No. 14/225,160 dated May 20, 2015.
Official Communication for U.S. Appl. No. 14/289,596 dated Jan. 26, 2015.
Official Communication for U.S. Appl. No. 14/289,596 dated Apr. 30, 2015.
Official Communication for U.S. Appl. No. 14/289,599 dated May 29, 2015.
Official Communication for U.S. Appl. No. 14/304,741 dated Mar. 3, 2015.
Official Communication for U.S. Appl. No. 14/304,741 dated Aug. 6, 2014.
Official Communication for U.S. Appl. No. 14/306,138 dated Sep. 14, 2015.
Official Communication for U.S. Appl. No. 14/306,138 dated Mar. 17, 2016.
Official Communication for U.S. Appl. No. 14/306,138 dated Feb. 18, 2015.
Official Communication for U.S. Appl. No. 14/306,138 dated Dec. 24, 2015.
Official Communication for U.S. Appl. No. 14/306,138 dated May 26, 2015.
Official Communication for U.S. Appl. No. 14/306,138 dated Dec. 3, 2015.
Official Communication for U.S. Appl. No. 14/306,138 dated Jul. 8, 2016.
Official Communication for U.S. Appl. No. 14/306,147 dated Feb. 19, 2015.
Official Communication for U.S. Appl. No. 14/306,147 dated Oct. 13, 2016.
Official Communication for U.S. Appl. No. 14/306,147 dated Dec. 24, 2015.
Official Communication for U.S. Appl. No. 14/306,147 dated Jun. 3, 2016.
Official Communication for U.S. Appl. No. 14/306,147 dated Mar. 4, 2016.
Official Communication for U.S. Appl. No. 14/306,147 dated Apr. 7, 2017.
Official Communication for U.S. Appl. No. 14/306,147 dated Aug. 7, 2015.
Official Communication for U.S. Appl. No. 14/306,154 dated Feb. 1, 2016.
Official Communication for U.S. Appl. No. 14/306,154 dated Mar. 11, 2015.
Official Communication for U.S. Appl. No. 14/306,154 dated May 15, 2015.
Official Communication for U.S. Appl. No. 14/306,154 dated Nov. 16, 2015.
Official Communication for U.S. Appl. No. 14/306,154 dated Mar. 17, 2016.
Official Communication for U.S. Appl. No. 14/306,154 dated Jul. 6, 2015.
Official Communication for U.S. Appl. No. 14/306,154 dated Jul. 8, 2016.
Official Communication for U.S. Appl. No. 14/319,161 dated Jan. 23, 2015.
Official Communication for U.S. Appl. No. 14/319,765 dated Feb. 1, 2016.
Official Communication for U.S. Appl. No. 14/319,765 dated Sep. 10, 2015.
Official Communication for U.S. Appl. No. 14/319,765 dated Jun. 16, 2015.
Official Communication for U.S. Appl. No. 14/319,765 dated Feb. 4, 2015.

(56) References Cited

OTHER PUBLICATIONS

Official Communication for U.S. Appl. No. 14/323,935 dated Jun. 22, 2015.
Official Communication for U.S. Appl. No. 14/323,935 dated Mar. 31, 2015.
Official Communication for U.S. Appl. No. 14/326,738 dated Jul. 31, 2015.
Official Communication for U.S. Appl. No. 14/326,738 dated Mar. 31, 2015.
Official Communication for U.S. Appl. No. 14/451,221 dated Oct. 21, 2014.
Official Communication for U.S. Appl. No. 14/463,615 dated Sep. 10, 2015.
Official Communication for U.S. Appl. No. 14/463,615 dated Nov. 13, 2014.
Official Communication for U.S. Appl. No. 14/463,615 dated Mar. 21, 2016.
Official Communication for U.S. Appl. No. 14/463,615 dated May 21, 2015.
Official Communication for U.S. Appl. No. 14/463,615 dated Jan. 28, 2015.
Official Communication for U.S. Appl. No. 14/463,615 dated Dec. 9, 2015.
Official Communication for U.S. Appl. No. 14/473,552 dated Feb. 24, 2015.
Official Communication for U.S. Appl. No. 14/479,863 dated Dec. 26, 2014.
Official Communication for U.S. Appl. No. 14/483,527 dated Jun. 22, 2015.
Official Communication for U.S. Appl. No. 14/483,527 dated Jan. 28, 2015.
Official Communication for U.S. Appl. No. 14/483,527 dated Oct. 28, 2015.
Official Communication for U.S. Appl. No. 14/486,991 dated Mar. 10, 2015.
Official Communication for U.S. Appl. No. 14/504,103 dated Mar. 31, 2015.
Official Communication for U.S. Appl. No. 14/504,103 dated Feb. 5, 2015.
Official Communication for U.S. Appl. No. 14/516,386 dated Feb. 24, 2016.
Official Communication for U.S. Appl. No. 14/526,066 dated Jan. 21, 2016.
Official Communication for U.S. Appl. No. 14/526,066 dated May 6, 2016.
Official Communication for U.S. Appl. No. 14/552,336 dated Jul. 20, 2015.
Official Communication for U.S. Appl. No. 14/562,524 dated Nov. 10, 2015.
Official Communication for U.S. Appl. No. 14/562,524 dated Sep. 14, 2015.
Official Communication for U.S. Appl. No. 14/562,524 dated Feb. 18, 2016.
Official Communication for U.S. Appl. No. 14/571,098 dated Nov. 10, 2015.
Official Communication for U.S. Appl. No. 14/571,098 dated Mar. 11, 2015.
Official Communication for U.S. Appl. No. 14/571,098 dated Feb. 23, 2016.
Official Communication for U.S. Appl. No. 14/571,098 dated Aug. 24, 2015.
Official Communication for U.S. Appl. No. 14/571,098 dated Aug. 5, 2015.
Official Communication for U.S. Appl. No. 14/579,752 dated Aug. 19, 2015.
Official Communication for U.S. Appl. No. 14/579,752 dated May 26, 2015.
Official Communication for U.S. Appl. No. 14/631,633 dated Sep. 10, 2015.
Official Communication for U.S. Appl. No. 14/639,606 dated Oct. 16, 2015.
Official Communication for U.S. Appl. No. 14/639,606 dated May 18, 2015.
Official Communication for U.S. Appl. No. 14/639,606 dated Jul. 24, 2015.
Official Communication for U.S. Appl. No. 14/645,304 dated Jan. 25, 2016.
Official Communication for U.S. Appl. No. 14/676,621 dated Oct. 29, 2015.
Official Communication for U.S. Appl. No. 14/676,621 dated Jul. 30, 2015.
Official Communication for U.S. Appl. No. 14/746,671 dated Nov. 12, 2015.
Official Communication for U.S. Appl. No. 14/746,671 dated Sep. 28, 2015.
Official Communication for U.S. Appl. No. 14/800,447 dated Dec. 10, 2015.
Official Communication for U.S. Appl. No. 14/800,447 dated Mar. 3, 2016.
Official Communication for U.S. Appl. No. 14/800,447 dated Jun. 6, 2016.
Official Communication for U.S. Appl. No. 14/813,749 dated Sep. 28, 2015.
Official Communication for U.S. Appl. No. 14/842,734 dated Nov. 19, 2015.
Official Communication for U.S. Appl. No. 14/874,690 dated Dec. 21, 2015.
Official Communication for U.S. Appl. No. 14/923,374 dated May 23, 2016.
Official Communication for U.S. Appl. No. 14/923,374 dated Feb. 9, 2016.
Official Communication for U.S. Appl. No. 14/948,009 dated Feb. 25, 2016.
Official Communication for U.S. Appl. No. 14/975,215 dated May 19, 2016.
Official Communication for U.S. Appl. No. 15/017,324 dated Apr. 22, 2016.
Restriction Requirement for U.S. Appl. No. 13/839,026 dated Apr. 2, 2015.

* cited by examiner

SYSTEMS AND METHODS FOR ANALYZING PERFORMANCE OF AN ENTITY

CROSS REFERENCE TO RELATED APPLICATION

This application is a continuation of U.S. Non-Provisional application Ser. No. 14/045,720, filed on Oct. 3, 2013, the disclosure of which is expressly incorporated herein by reference in its entirety.

BACKGROUND

The amount of information being processed and stored is rapidly increasing as technology advances present an ever-increasing ability to generate and store data. This data is commonly stored in computer-based systems in structured data stores. For example, one common type of data store is a so-called "flat" file such as a spreadsheet, plain-text document, or XML document. Another common type of data store is a relational database comprising one or more tables. Other examples of data stores that comprise structured data include, without limitation, files systems, object collections, record collections, arrays, hierarchical trees, linked lists, stacks, and combinations thereof.

Numerous organizations, including industry, retail, and government entities, recognize that important information and decisions can be drawn if massive data sets can be analyzed to identify patterns of behavior. Collecting and classifying large sets of data in an appropriate manner allows these entities to more quickly and efficiently identify these patterns, thereby allowing them to make more informed decisions.

BRIEF DESCRIPTION OF THE DRAWINGS

Reference will now be made to the accompanying drawings which illustrate exemplary embodiments of the present disclosure and in which.

DESCRIPTION OF THE EMBODIMENTS

Reference will now be made in detail to the embodiments, the examples of which are illustrated in the accompanying drawings. Whenever possible, the same reference numbers will be used throughout the drawings to refer to the same or like parts.

Figure 1:
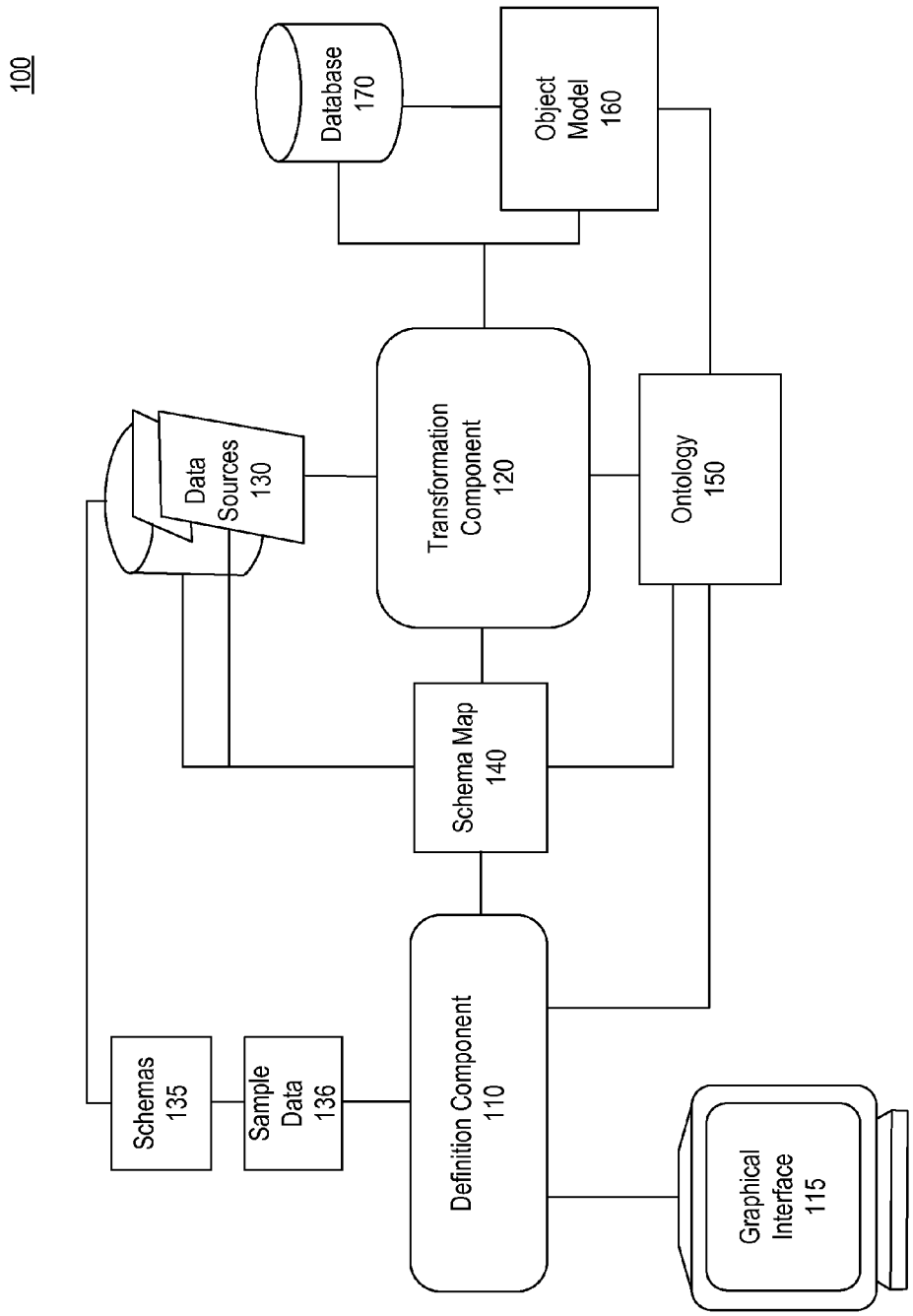
FIG. 1 illustrates, in block diagram form, an exemplary data fusion system for providing interactive data analysis, consistent with embodiments of the present disclosure.
Figure 2:
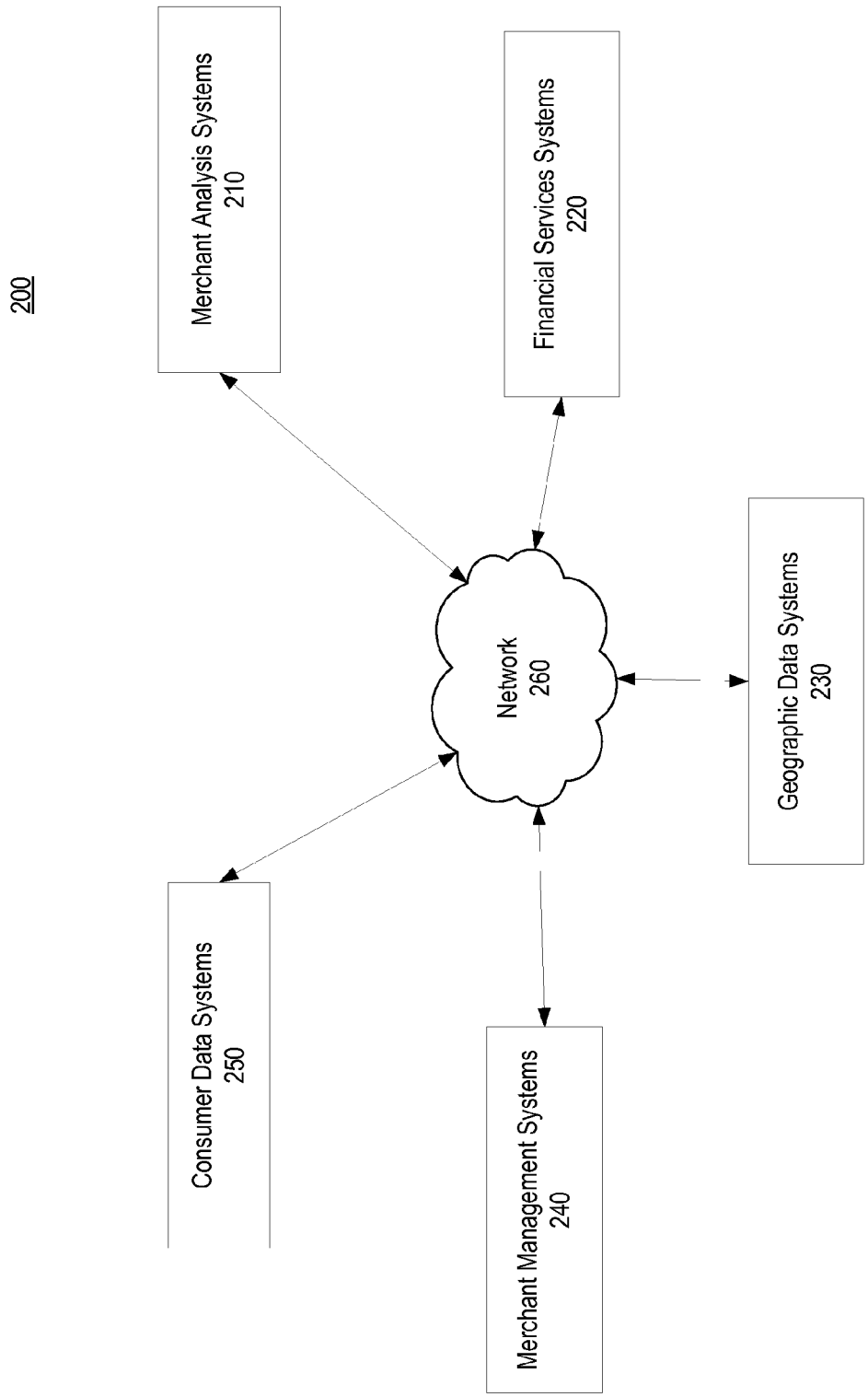
FIG. 2 is a block diagram of an exemplary system for analyzing performance of an entity, consistent with embodiments of the present disclosure.

FIG. 1 illustrates, in block diagram form, an exemplary data fusion system 100 for providing interactive data analysis, consistent with embodiments of the present disclosure. Among other things, data fusion system 100 facilitates transformation of one or more data sources, such as data sources 130 (e.g., financial services systems 220, geographic data systems 230, merchant management systems 240 and/or consumer data systems 250, as shown in FIG. 2) into an object model 160 whose semantics are defined by an ontology 150. The transformation can be performed for a variety of reasons. For example, a database administrator can import data from data sources 130 into a database 170 for persistently storing object model 160. As another example, a data presentation component (not depicted) can transform input data from data sources 130 "on the fly" into object model 160. The object model 160 can then be utilized, in conjunction with ontology 150, for analysis through graphs and/or other data visualization techniques.

Data fusion system 100 comprises a definition component 110 and a translation component 120, both implemented by one or more processors of one or more computing devices or systems executing hardware and/or software-based logic for providing various functionality and features of the present disclosure, as described herein. As will be appreciated from the present disclosure, data fusion system 100 can comprise fewer or additional components that provide the various functionalities and features described herein. Moreover, the number and arrangement of the components of data fusion system 100 responsible for providing the various functionalities and features described herein can further vary from embodiment to embodiment.

Definition component 110 generates and/or modifies ontology 150 and a schema map 140. Exemplary embodiments for defining an ontology (such as ontology 150) are described in U.S. Pat. No. 7,962,495 (the '495 patent), issued on Jun. 14, 2011, the entire contents of which are expressly incorporated herein by reference for all purposes. Consistent with certain embodiments disclosed in the '495 patent, a dynamic ontology may be used to create a database. To create a database ontology, one or more object types may be defined, where each object type includes one or more properties. The attributes of object types or property types of the ontology can be edited or modified at any time. And, for each property type, at least one parser definition may be created. The attributes of a parser definition can be edited or modified at any time.

In some embodiments, each property type is declared to be representative of one or more object types. A property type is representative of an object type when the property type is intuitively associated with the object type. In some embodiments, each property type has one or more components and a base type. In some embodiments, a property type can comprise a string, a date, a number, or a composite type consisting of two or more string, date, or number elements. Thus, property types are extensible and can represent complex data structures. Further, a parser definition can reference a component of a complex property type as a unit or token.

An example of a property having multiple components is an Address property having a City component and a State component. An example of raw input data is "Los Angeles, Calif." An example parser definition specifies an association of imported input data to object property components as follows: {CITY}, {STATE}→Address:State, Address:City. In some embodiments, the association {CITY}, {STATE} is defined in a parser definition using regular expression symbology. The association {CITY}, {STATE} indicates that a city string followed by a state string, and separated by a comma, comprises valid input data for a property of type Address. In contrast, input data of "Los Angeles Calif." would not be valid for the specified parser definition, but a user could create a second parser definition that does match input data of "Los Angeles Calif." The definition Address:City, Address:State specifies that matching input data values map to components named "City" and "State" of the Address property. As a result, parsing the input data using the parser definition results in assigning the value "Los Angeles" to the Address:City component of the Address property, and the value "CA" to the Address:State component of the Address property.

According to some embodiments, schema map 140 can define how various elements of schemas 135 for data sources 130 map to various elements of ontology 150. Definition component 110 receives, calculates, extracts, or otherwise identifies schemas 135 for data sources 130. Schemas 135 define the structure of data sources 130; for example, the names and other characteristics of tables, files, columns, fields, properties, and so forth. Definition component 110 furthermore optionally identifies sample data 136 from data sources 130. Definition component 110 can further identify object type, relationship, and property definitions from ontology 150, if any already exist. Definition component 110 can further identify pre-existing mappings from schema map 140, if such mappings exist.

Based on the identified information, definition component 110 can generate a graphical user interface 115. Graphical user interface 115 can be presented to users of a computing device via any suitable output mechanism (e.g., a display screen, an image projection, etc.), and can further accept input from users of the computing device via any suitable input mechanism (e.g., a keyboard, a mouse, a touch screen interface, etc.). Graphical user interface 115 features a visual workspace that visually depicts representations of the elements of ontology 150 for which mappings are defined in schema map 140.

In some embodiments, transformation component 120 can be invoked after schema map 140 and ontology 150 have been defined or redefined. Transformation component 120 identifies schema map 140 and ontology 150. Transformation component 120 further reads data sources 130 and identifies schemas 135 for data sources 130. For each element of ontology 150 described in schema map 140, transformation component 120 iterates through some or all of the data items of data sources 130, generating elements of object model 160 in the manner specified by schema map 140. In some embodiments, transformation component 120 can store a representation of each generated element of object model 160 in a database 170. In some embodiments, transformation component 120 is further configured to synchronize changes in object model 160 back to data sources 130.

Data sources 130 can be one or more sources of data, including, without limitation, spreadsheet files, databases, email folders, document collections, media collections, contact directories, and so forth. Data sources 130 can include data structures stored persistently in non-volatile memory. Data sources 130 can also or alternatively include temporary data structures generated from underlying data sources via data extraction components, such as a result set returned from a database server executing an database query.

Schema map 140, ontology 150, and schemas 135 can be stored in any suitable structures, such as XML files, database tables, and so forth. In some embodiments, ontology 150 is maintained persistently. Schema map 140 can or cannot be maintained persistently, depending on whether the transformation process is perpetual or a one-time event. Schemas 135 need not be maintained in persistent memory, but can be cached for optimization.

Object model 160 comprises collections of elements such as typed objects, properties, and relationships. The collections can be structured in any suitable manner. In some embodiments, a database 170 stores the elements of object model 160, or representations thereof. In some embodiments, the elements of object model 160 are stored within database 170 in a different underlying format, such as in a series of object, property, and relationship tables in a relational database.

According to some embodiments, the functionalities, techniques, and components described herein are implemented by one or more special-purpose computing devices. The special-purpose computing devices can be hard-wired to perform the techniques, or can include digital electronic devices such as one or more application-specific integrated circuits (ASICs) or field programmable gate arrays (FPGAs) that are persistently programmed to perform the techniques, or can include one or more general purpose hardware processors programmed to perform the techniques pursuant to program instructions in firmware, memory, other storage, or a combination. Such special-purpose computing devices can also combine custom hard-wired logic, ASICs, or FPGAs with custom programming to accomplish the techniques. The special-purpose computing devices can be desktop computer systems, portable computer systems, handheld devices, networking devices, or any other device that incorporates hard-wired and/or program logic to implement the techniques.

In embodiments described herein, data fusion system 100 can provide an entity, such as a retail merchant, to analyze information to identify behaviors to allow that entity to make more informed decisions. Such information can allow retail entities, such as a retail merchant, to determine where to place their retail locations. Entities having more than one location (e.g., a merchant with a chain store or a franchise model) typically evaluate the performance of their locations and may adjust their business models or work flows when the locations under-perform. Typically, entities evaluate the performance of their locations based on period-to-period metrics. For example, an entity can evaluate a location's performance by comparing the current month's sales to the previous month's sales. In addition, entitles can evaluate each of its locations' performance using comparative analysis. For example, an entity might compare the sales at a first location with the sales at a second location. As entities generally measure the performance of its locations based on its own transaction data (e.g., the entity's sales across some or all of its locations), current methods of measuring performance do not consider sales made by competitors or demographic features of the areas of the entity's locations.

Since current performance evaluation methods do not consider the sales of competitors or the demographic features of the region of the entity location, measured performance may not represent the true performance of an entity. For instance, although an entity location in a low consumer spend capacity area might have less sales than an entity location in a high consumer spend capacity area, it may be performing better than what could be expected for that area in light of, for example, the low number of consumers residing in the area or the low income of the area. Entity location performance can be adversely impacted by the close proximity of another location of the entity, but the entity location can be performing better than expected given the competition from the other entity location. Conversely, while an entity location in a dense, high-income area might have the highest sales of all entity locations, it can be under-performing because, for instance, consumer spend capacity is high and the entity location could generate more sales.

Consistent with embodiments of the present disclosure, the performance of entities can be analyzed based on how the entity is expected to perform given the location of the entity. For a given entity location, the disclosed embodiments may be implemented to consider, for example, consumer demographic features of the entity location's area and the proximity of competitors to the entity location (including the proximity of other close-by entity locations). Based on these and/or similar factors, a prediction of the amount of sales or number transactions for an entity location can be determined and compared to the actual amount of sales or transactions for the entity location to determine the performance of the entity location. In some embodiments, the entity can be a merchant. For purposes of illustration, exemplary embodiments for analyzing entity performance are described herein with reference to "merchants." However, the exemplary embodiments and techniques described herein may be applied to other types of entities (e.g., service providers, governmental agencies, etc.) within the spirit and scope of this disclosure.

FIG. 2 is a block diagram of an exemplary system 200 for performing one or more operations for analyzing performance of an entity, consistent with disclosed embodiments. In some embodiments, the entity is a merchant and system 200 can include merchant analysis system 210, one or more financial services systems 220, one or more geographic data systems 230, one or more merchant management systems 240, and one or more consumer data systems 250. The components and arrangement of the components included in system 200 can vary depending on the embodiment. For example, the functionality described below with respect to financial services systems 220 can be embodied in consumer data systems 250, or vice-versa. Thus, system 200 can include fewer or additional components that perform or assist in the performance of one or more processes to analyze merchants, consistent with the disclosed embodiments.

One or more components of system 200 can be computing systems configured to analyze merchant performance. As further described herein, components of system 200 can include one or more computing devices (e.g., computer(s), server(s), etc.), memory storing data and/or software instructions (e.g., database(s), memory devices, etc.), and other known computing components. In some embodiments, the one or more computing devices are configured to execute software or a set of programmable instructions stored on one or more memory devices to perform one or more operations, consistent with the disclosed embodiments. Components of system 200 can be configured to communicate with one or more other components of system 200, including merchant analysis system 210, one or more financial services systems 220, one or more geographic data systems 230, one or more merchant management systems 240, and one or more consumer data systems 250. In certain aspects, users can operate one or more components of system 200. The one or more users can be employees of, or associated with, the entity corresponding to the respective component(s) (e.g., someone authorized to use the underlying computing systems or otherwise act on behalf of the entity).

Figure 3:
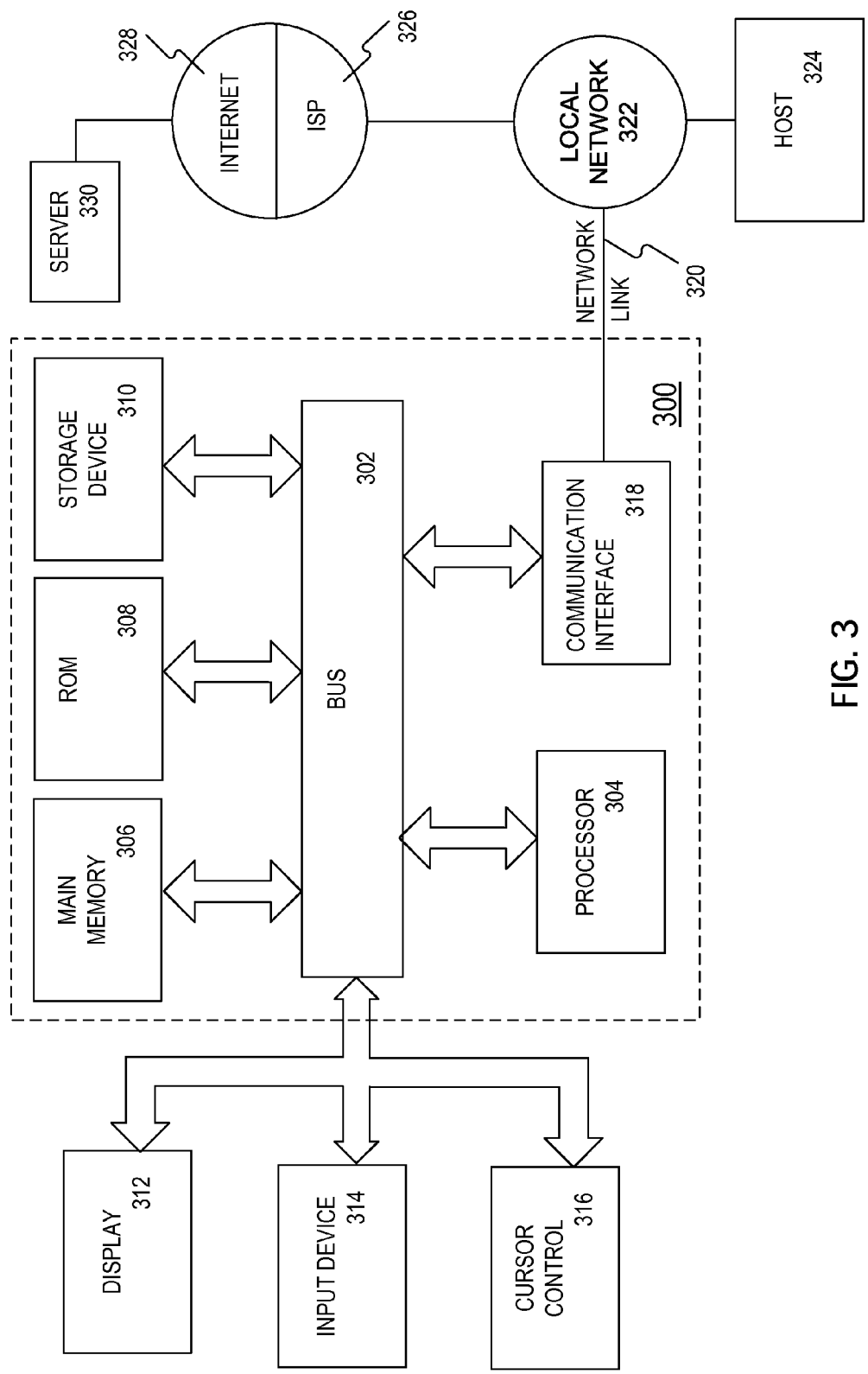
FIG. 3 is a block diagram of an exemplary computer system with which embodiments of the present disclosure can be implemented.

Merchant analysis system 210 can be a computing system configured to analyze merchant performance. For example, merchant analysis system 210 can be a computer system configured to execute software or a set of programmable instructions that collect or receive financial transaction data, consumer data, and merchant data and process it to determine the predicted spend amounts for a merchant and determine the actual spend amounts for the merchant. Merchant analysis system 210 can be configured, in some embodiments, to utilize, include, or be a data fusion system 100 (see, e.g., FIG. 1) to transform data from various data sources (such as, financial services systems 220, geographic data systems 230, merchant management systems 240, and consumer data systems 250) for processing. In some embodiments, merchant analysis system 210 can be implemented using a computer system 300, as shown in FIG. 3 and described below.

Merchant analysis system 210 can include one or more computing devices (e.g., server(s)), memory storing data and/or software instructions (e.g., database(s), memory devices, etc.) and other known computing components. According to some embodiments, merchant analysis system 210 can include one or more networked computers that execute processing in parallel or use a distributed computing architecture. Merchant analysis system 210 can be configured to communicate with one or more components of system 200, and it can be configured to provide analysis of merchants via an interface(s) accessible by users over a network (e.g., the Internet). For example, merchant analysis system 210 can include a web server that hosts a web page accessible through network 260 by merchant management systems 240. In another embodiment, merchant analysis system 210 can include an application server configured to provide data to one or more client applications executing on computing systems connected to merchant analysis system 210 via network 260.

In some embodiments, merchant analysis system 210 can be configured to determine an expected spend amount for a merchant or merchant location by processing and analyzing data collected from one or more components of system 200. For example, merchant analysis system 210 can determine that Big Box Merchant store located at 123 Main St, in Burbank, Calif. should be generating $50,000 of sales per month. The merchant analysis system 210 can also be configured to determine the actual sales for a merchant or specific merchant location by processing and analyzing data collected from one or more components of system 200. For example, merchant analysis system 210 can determine that the Big Box Merchant store located at 123 Main St, in Burbank, Calif. is actually generating $60,000 of sales per month. Merchant analysis system 210 can provide an analysis of a merchant or merchant location's performance based on the predicted sales and the actual sales for the merchant or merchant location. For example, for the Big Box Merchant store located at 123 Main St., Burbank, Calif., the merchant analysis system 210 can provide an analysis that the store is performing above expectations. Exemplary processes that can be used by merchant analysis system 210 are described below with respect to FIGS. 4 and 5.

Merchant analysis system 210 can, in some embodiments, generate a user interface communicating data related to one or more merchants or merchant locations. For example, in some embodiments, merchant analysis system 210 includes a web server that generates HTML code, or scripts capable of generating HTML code, that can be displayed in a web browser executing on computing device. Merchant analysis system 210 can also execute an application server that provides user interface objects to a client application executing on a computing device, or it can provide data that is capable of being displayed in a user interface in a client application executing on a computing device. In some embodiments, merchant analysis system 210 can generate user interfaces that can be displayed within another user interface. For example, merchant analysis system 210 can generate a user interface for display within a parent user interface that is part of a word processing application, a presentation development application, a web browser, or an illustration application, among others. As used herein, the term "generating" in reference to a user interface can include generating the code that when executed displays information (e.g., HTML) or providing commands and/or data to a set of instructions that when executed render a user interface capable of being shown on a display connected to a computing device. In some embodiments, the user interface can include a map, indications of the merchant locations on a map, and indications of the sales or transactions associated with the merchant locations. Examples of some (although not all) user interfaces that can be generated by merchant analysis system 210 are described below with respect to FIGS. 6-10.

Referring again to FIG. 2, financial services system 220 can be a computing system associated with a financial service provider, such as a bank, credit card issuer, credit bureau, credit agency, or other entity that generates, provides, manages, and/or maintains financial service accounts for one or more users. Financial services system 220 can generate, maintain, store, provide, and/or process financial data associated with one or more financial service accounts. Financial data can include, for example, financial service account data, such as financial service account identification data, account balance, available credit, existing fees, reward points, user profile information, and financial service account transaction data, such as transaction dates, transaction amounts, transaction types, and location of transaction. Financial services system 220 can include infrastructure and components that are configured to generate and/or provide financial service accounts such as credit card accounts, checking accounts, savings account, debit card accounts, loyalty or reward programs, lines of credit, and the like.

Geographic data systems 230 can include one or more computing devices configured to provide geographic data to other computing systems in system 200 such as merchant analysis system 210. For example, geographic data systems 230 can provide geodetic coordinates when provided with a street address of vice-versa. In some embodiments, geographic data systems 230 exposes an application programming interface (API) including one or more methods or functions that can be called remotely over a network, such as network 260. According to some embodiments, geographic data systems 230 can provide information concerning routes between two geographic points. For example, merchant analysis system 210 can provide two addresses and geographic data systems 230 can provide, in response, the aerial distance between the two addresses, the distance between the two addresses using roads, and/or a suggested route between the two addresses and the route's distance.

According to some embodiments, geographic data systems 230 can also provide map data to merchant analysis system 210 and/or other components of system 200. The map data can include, for example, satellite or overhead images of a geographic region or a graphic representing a geographic region. The map data can also include points of interest, such as landmarks, malls, shopping centers, schools, or popular restaurants or retailers, for example.

Merchant management systems 240 can be one or more computing devices configured to perform one or more operations consistent with disclosed embodiments. For example, merchant management systems 240 can be a desktop computer, a laptop, a server, a mobile device (e.g., tablet, smart phone, etc.), or any other type of computing device configured to request merchant analysis from merchant analysis system 210. According to some embodiments, merchant management systems 240 can comprise a network-enabled computing device operably connected to one or more other presentation devices, which can themselves constitute a computing system. For example, merchant management systems 240 can be connected to a mobile device, telephone, laptop, tablet, or other computing device.

Merchant management systems 240 can include one or more processors configured to execute software instructions stored in memory. Merchant management systems 240 can include software or a set of programmable instructions that when executed by a processor performs known Internet-related communication and content presentation processes. For example, merchant management systems 240 can execute software or a set of instructions that generates and displays interfaces and/or content on a presentation device included in, or connected to, merchant management systems 240. In some embodiments, merchant management systems 240 can be a mobile device that executes mobile device applications and/or mobile device communication software that allows merchant management systems 240 to communicate with components of system 200 over network 260. The disclosed embodiments are not limited to any particular configuration of merchant management systems 240.

Merchant management systems 240 can be one or more computing systems associated with a merchant that provides products (e.g., goods and/or services), such as a restaurant (e.g., Outback Steakhouse®, Burger King®, etc.), retailer (e.g., Amazon.com®, Target®, etc.), grocery store, mall, shopping center, service provider (e.g., utility company, insurance company, financial service provider, automobile repair services, movie theater, etc.), non-profit organization (ACLU™, AARP®, etc.) or any other type of entity that provides goods, services, and/or information that consumers (i.e., end-users or other business entities) can purchase, consume, use, etc. For ease of discussion, the exemplary embodiments presented herein relate to purchase transactions involving goods from retail merchant systems. Merchant management systems 240, however, is not limited to systems associated with retail merchants that conduct business in any particular industry or field.

Merchant management systems 240 can be associated with computer systems installed and used at a merchant brick and mortar locations where a consumer can physically visit and purchase goods and services. Such locations can include computing devices that perform financial service transactions with consumers (e.g., Point of Sale (POS) terminal(s), kiosks, etc.). Merchant management systems 240 can also include back- and/or front-end computing components that store data and execute software or a set of instructions to perform operations consistent with disclosed embodiments, such as computers that are operated by employees of the merchant (e.g., back office systems, etc.). Merchant management systems 240 can also be associated with a merchant that provides goods and/or service via known online or e-commerce types of solutions. For example, such a merchant can sell products via a website using known online or e-commerce systems and solutions to market, sell, and process online transactions. Merchant management systems 240 can include one or more servers that are configured to execute stored software or a set of instructions to perform operations associated with a merchant, including one or more processes associated with processing purchase transactions, generating transaction data, generating product data (e.g., SKU data) relating to purchase transactions, for example.

Consumer data systems 250 can include one or more computing devices configured to provide demographic data regarding consumers. For example, consumer data systems 250 can provide information regarding the name, address, gender, income level, age, email address, or other information about consumers. Consumer data systems 250 can include public computing systems such as computing systems affiliated with the U.S. Bureau of the Census, the U.S. Bureau of Labor Statistics, or FedStats, or it can include private computing systems such as computing systems affiliated with financial institutions, credit bureaus, social media sites, marketing services, or some other organization that collects and provides demographic data.

Network 260 can be any type of network or combination of networks configured to provide electronic communications between components of system 200. For example, network 260 can be any type of network (including infrastructure) that provides communications, exchanges information, and/or facilitates the exchange of information, such as the Internet, a Local Area Network, or other suitable connection(s) that enables the sending and receiving of information between the components of system 200. Network 260 may also comprise any combination of wired and wireless networks. In other embodiments, one or more components of system 200 can communicate directly through a dedicated communication link(s), such as links between merchant analysis system 210, financial services system 220, geographic data systems 230, merchant management systems 240, and consumer data systems 250.

As noted above, merchant analysis system 210 can include a data fusion system (e.g., data fusion system 100) for organizing data received from one or more of the components of system 200.

By way of example, FIG. 3 is a block diagram of an exemplary computer system 300, consistent with embodiments of the present disclosure. The components of system 200 such as merchant analysis system 210, financial service systems 220, geographic data systems 230, merchant management systems 240, and consumer data systems 250 may include the architecture based on or similar to that of computer system 300.

As illustrated in FIG. 3, computer system 300 includes a bus 302 or other communication mechanism for communicating information, and a hardware processor 304 coupled with bus 302 for processing information. Hardware processor 304 can be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also can be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 can be coupled via bus 302 to a display 312, such as a cathode ray tube (CRT), liquid crystal display, or touch screen, for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. The input device typically has two degrees of freedom in two axes, a first axis (for example, x) and a second axis (for example, y), that allows the device to specify positions in a plane.

Computer system 300 can implement the techniques described herein using customized hard-wired logic, one or more ASICs or FPGAs, firmware and/or program logic which in combination with the computer system causes or programs computer system 300 to be a special-purpose machine. According to some embodiments, the operations, functionalities, and techniques disclosed herein are performed by computer system 300 in response to processor 304 executing one or more sequences of one or more instructions contained in main memory 306. Such instructions can be read into main memory 306 from another storage medium, such as storage device 310. Execution of the sequences of instructions contained in main memory 306 causes processor 304 to perform the process steps described herein. In alternative embodiments, hard-wired circuitry can be used in place of or in combination with software instructions.

The term "storage media" as used herein refers to any non-transitory media that stores data and/or instructions that cause a machine to operate in a specific fashion. Such storage media can comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from, but can be used in conjunction with, transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media can be involved in carrying one or more sequences of one or more instructions to processor 304 for execution. For example, the instructions can initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 can optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 can be an integrated services digital network (ISDN) card, cable modem, satellite modem, or a modem to provide a data communication connection to a corresponding type of telephone line. As another example, communication interface 318 can be a local area network (LAN) card to provide a data communication connection to a compatible LAN. Wireless links can also be implemented. In any such implementation, communication interface 318 sends and receives electrical, electromagnetic or optical signals that carry digital data streams representing various types of information.

Network link 320 typically provides data communication through one or more networks to other data devices. For example, network link 320 can provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 can transmit a requested code for an application program through Internet 328, ISP 326, local network 322 and communication interface 318. The received code can be executed by processor 304 as it is received, and/or stored in storage device 310, or other non-volatile storage for later execution.

Figure 4:
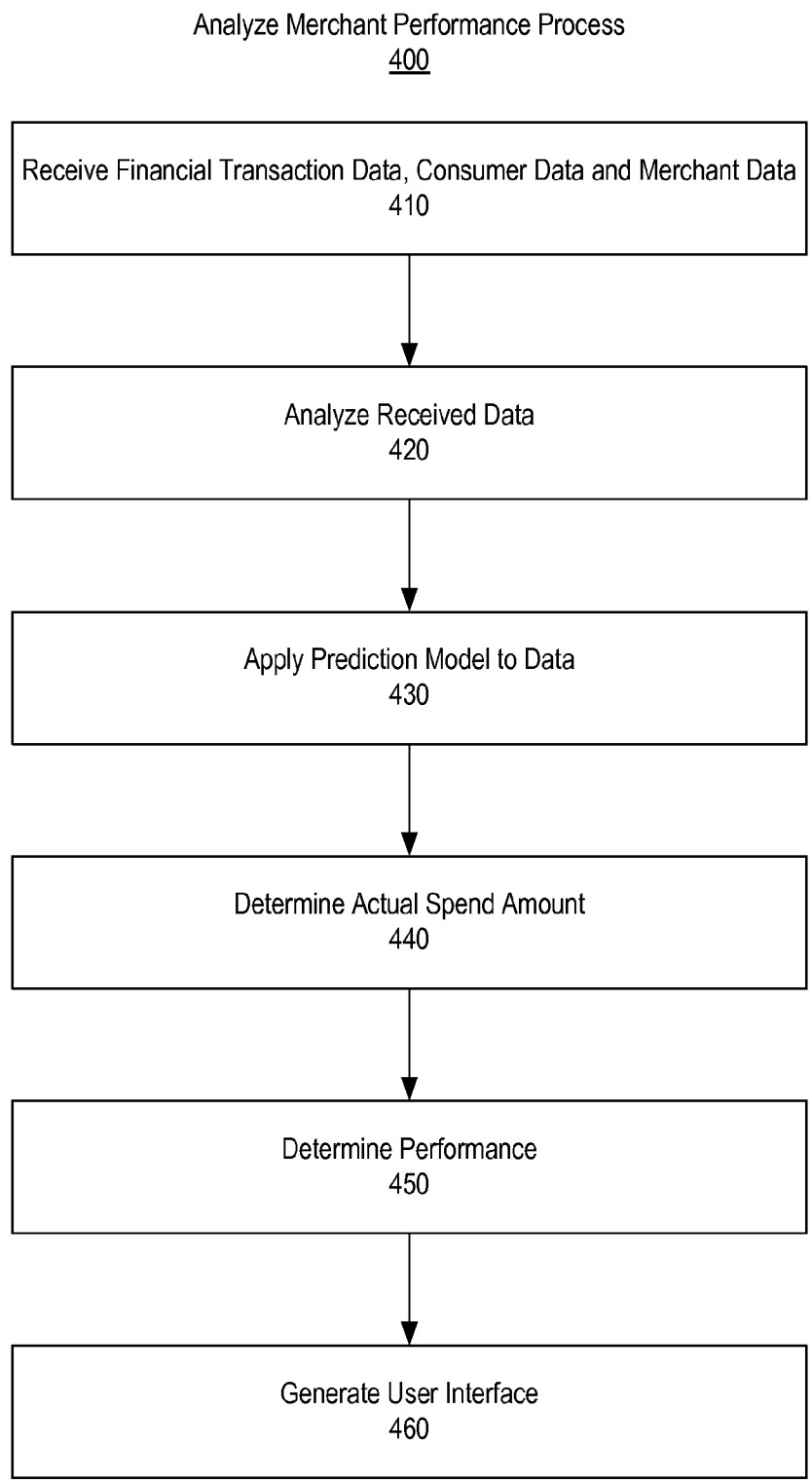
FIG. 4 is a flowchart representing an exemplary process for analyzing entity performance, consistent with the embodiments of the present disclosure.
Figure 5:
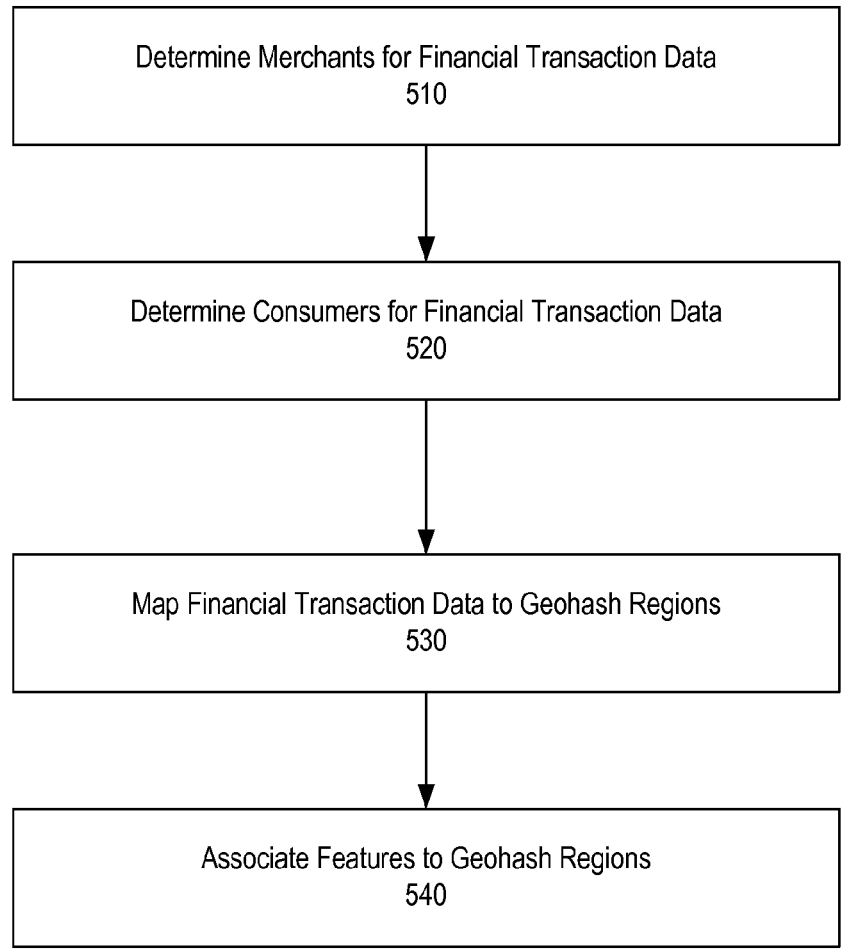
FIG. 5 is a flowchart representing an exemplary process for analyzing received data, consistent with the embodiments of the present disclosure.

As described above with respect to FIG. 2, merchant analysis system 210 can perform one or more processes for analyzing the performance of merchants based on predicted sales and actual sales. FIGS. 4 and 5 are flowcharts illustrating exemplary processes for analyzing data and merchant performance, consistent with embodiments of the present disclosure. While FIGS. 4 and 5 illustrate embodiments processes using particular methodologies or techniques, other methodologies or techniques known in the art can be substituted without detracting from the spirit and scope of these embodiments. Also, while the description that follows describes the processes of FIGS. 4 and 5 as performed by merchant analysis system 210, in some embodiments, another component of system 200, or some sub-system of the components of system 200 (not shown) can perform part or all of these processes.

FIG. 4 is a flowchart representing an exemplary process for analyzing merchant performance. While the flowchart discloses the following steps in a particular order, it will be appreciated that at least some of the steps can be moved, modified, or deleted where appropriate, consistent with the teachings of the present disclosure.

In some embodiments, a merchant analysis system (e.g., merchant analysis system 210) receives financial transaction data, consumer data, and merchant data from one or more financial services systems (e.g., financial services systems 220), merchant management systems (e.g., merchant management systems 240), and/or consumer data systems (e.g., consumer data systems 250) (step 410). The merchant analysis system can receive the data after it requests it via an API or it can receive the data automatically via a network (e.g., network 260). It will be appreciated that additional methods for data transfer between a merchant analysis system and data systems may be implemented, without changing the scope and sprit of the disclosed embodiments.

In some embodiments, the financial services systems, the merchant management systems, and the consumer data systems can provide the data to the merchant analysis system in a batch format on a periodic basis, such as daily, weekly, or monthly. The financial transaction data, consumer data, and merchant data can be sent as a data stream, text file, serialized object, or any other conventional method for transmitting data between computing systems.

In some embodiments, the financial transaction data can reflect purchase transactions at one or more merchants offering goods and/or services, and it can include information regarding one or more consumer transactions. A consumer transaction can include, among other things, the date and time for the transaction, the purchase amount for the transaction, a unique consumer identifier associated with the transaction, a description of the merchant for the transaction, a category code associated with the merchant (e.g., retail goods, medical services, dining), and geographic indicator (e.g., postal code, street address, GPS coordinates, etc.). As financial transaction data can originate from several financial services systems, each providing different information for each consumer transaction, the information contained in the spending transaction data originating from a first financial data system can be different from the information contained in spending transaction data originating from a second financial data system. Accordingly, in some embodiments, the merchant analysis system can translate the data received from the financial services system. For example, the merchant analysis system can import the received data into an object model according to an ontology using a transformation component (e.g., transformation component 120).

Consumer transactions reflected in the received financial transaction data can include several types of consumer transactions. For example, the consumer transactions can correspond to credit card purchases or refunds, debit card purchases or refunds, eChecks, electronic wallet transactions, wire transfers, etc. The consumer transactions can also include transactions associated with reward or loyalty programs. For example, the consumer transactions can include the number of loyalty points, and their cash equivalent, used to earn discounts or receive free dining. Financial transaction data received from one financial data system can include more than one type of consumer transaction type. For example, spending transaction data received from a bank can include debit card, credit card, and eCheck consumer transactions.

In some embodiments, the consumer data can include demographic information regarding one or more consumers. For example, the consumer data can include information about consumers' income, gender, age, employment status, home ownership status, or ethnicity, among others. In some embodiments, the consumer data can be associated with a geographic region. For example, the consumer data can be associated with a zip code, neighborhood, or street address. In some embodiments, the merchant analysis system can receive the consumer data with respect to particular individuals. For example, the consumer data can be a data set where each record of the dataset corresponds to an individual consumer.

The merchant analysis system can also receive merchant data. In some embodiments, the merchant analysis system receives merchant data from the merchant management system. The merchant data can include information about a merchant. For example, the merchant data can include the address of a merchant's retail locations and attributes of the merchant's retail locations such as square footage, product lines, typical price points, number of parking spaces, whether the retail location is in a mall or shopping center, or other features that can make the merchant location attractive or unattractive to consumers. According to some embodiments, the merchant data can include information about the merchant's competitors. For example, the merchant data can include the names of the competitors, the locations of the competitors retail locations and attributes of the merchant's competitor's retail locations such as square footage, product lines, typical price points, number of parking spaces, whether the retail location is in a mall or shopping center, or other features that can make the competitor location attractive or unattractive to consumers.

After the merchant analysis system receives the financial transaction data, the consumer data, and the merchant data, the merchant analysis system 210 can analyze it (step 420). In some embodiments, the merchant analysis system 210 can organize the received data using an object model (e.g., object model 160 described above with respect to FIGS. 2A and 2B) for allowing users to better analyze the data.

The analyzing of the received data in step 420 can be implemented according to FIG. 5, which is a flowchart representing an exemplary process 500 for analyzing received data, consistent with embodiments of the present disclosure. While the flowchart of FIG. 5 discloses the following steps in a particular order, it will be appreciated that at least some of the steps can be moved, modified, or deleted where appropriate, consistent with the teachings of the present disclosure. For example, in some embodiments, while performing analyze received data process 500, the merchant analysis system can determine consumers for financial data (step 520) before determining merchants for the financial data (step 510), or it can map the financial transaction data to geohash regions (step 530) before determining merchants or consumers associated with the financial data (steps 510, 520).

In some embodiments, while performing analyze received data process 500, the merchant analysis system can reorganize the received data using an object model (e.g., object model 160) to better utilize that data. For example, the merchant analysis system can use a schema map, a transformation component and an ontology (e.g., schema map 140, transformation component 120, and ontology 150) to translate date received from the financial services systems or the merchant management systems into an object model (e.g., object model 160) for later analysis. In some embodiments, a different data translation method may be implemented to analyze the received data (e.g., a data translation method that does not use an object model, schema map, transformation component or ontology).

One non-limiting example of an object that could be included in the object model is a merchant object. The merchant object can include one or more properties describing a merchant and an instance of that object can have values assigned to the properties corresponding with the data received from one or more data sources. For example, the merchant object can have properties such as name, location, street address, zip code, merchant ID, merchandise category, transaction price range, among others, and the values of the properties can be set to "John's Gas," "Irvine, Calif.," "123 Main St." "92614," "123456," "fuel; food," and "$0-$100," respectively. Another non-limiting example of an object that could be included in the object model is a location object. A location object, in some embodiments, can include properties related to the demographic features of the location. For example, the location object can have properties such as city, state, zip code, average age of resident, average income of resident, among others, and the values of the properties can be set to "Irvine," "CA," "92614," "36," and "75,000" respectively. Another non-limiting example of an object that can be included in the object model is a purchase object. A purchase object, in some embodiments, can include properties related to purchases such as the amount of the purchase, the time of purchase, the nature of the good purchases, or the information regarding the purchaser. The purchase object can be used, for example, to determine features such as the seasonality of purchases (e.g., the time period when purchases are typically made, on average) or customer clusters that are making the purchases (e.g., "businessperson," "home owner"). One example of a customer cluster can include a "business person" cluster.

In some embodiments, the merchant analysis system can analyze received data process 500 by determining merchants for the received financial data (step 510). The financial transaction data typically will not come with an identifier for the merchant where the financial transaction data occurred. For example, a typical consumer transaction can include the amount of the transaction, a merchant category code (e.g., retail, restaurant, automotive), a description of the merchant (e.g., "John's Gas, Irvine, Calif."), time and date of the transaction, and other information associated with the transaction but not specifically identifying the merchant where the transaction occurred (e.g., using a unique merchant identification number). As a result, the merchant analysis system can perform a matching process to match the consumer transactions of the financial transaction data with one or more merchant of which the merchant analysis system has knowledge.

In some embodiments, the merchant analysis system can have access to data associated with, and describing, a plurality of known merchants. The data can be received by the merchant analysis system (e.g., at step 410) from merchant management systems, the financial services systems, or it can be part of the schemas used to create the object model before merchant analysis system performs analyze received data process 500. The data describing the known merchants can include the name and address of the payee, the payee category code of the payee (e.g., retail, restaurant, etc.), typical spending ranges, or other data. As most of the consumer transactions of the financial transaction data include at least a category code and a postal code, after the merchant analysis system performs the merchant identification process, it can filter the possible known merchants to match to the financial transaction data based on category code and postal code. For example, after the merchant analysis system receives financial transaction data indicating that a consumer transaction took place at a retail merchant in postal code 92603, it can access the data of known merchants and attempt to match only those merchants that are retail merchants in postal code 92603 with the consumer transaction. If only one merchant is known with the category code and the postal code, then the merchant analysis system can match the consumer transaction with that merchant. If more than one merchant is known for that category code and postal code, the merchant analysis system can compare the remainder of the parameters of the consumer transaction (e.g., description, transaction amount) to the parameters of known merchants. For example, if two retail merchants in postal code 92603 are known, the merchant analysis system can compare the description of the consumer transaction to the descriptions of each merchant. In some embodiments, transaction amount can also be used to determine the merchant associated with a consumer transaction of the financial transaction data. For example, if one merchant in 92603 typically has transactions that average in orders of magnitude of $10, and a second merchant in 92603 has transactions that average in orders of magnitude of $100, the merchant analysis system can match a transaction of $23 to the first merchant, and not the second.

In some embodiments, the merchant analysis system can also match consumer transactions of the financial transaction data with one or more consumers (step 520). In some embodiments, the merchant analysis system can associate a consumer transaction with an individual consumer. For example, the merchant analysis system can match a consumer transaction to a consumer based on the name, address, phone number, or account number associated with the consumer transaction. In some embodiments, the financial transaction data can include a consumer identifier that has been generated by the system providing the financial transaction data for the purposes of consumer identification by merchant analysis system. For example, the financial services systems can include, with each consumer transaction, a unique, anonymous consumer identifier that allows the merchant analysis system to match consumer transactions coming from the same consumer without providing the merchant analysis system with actual data to specifically identify the consumer. For example, a consumer transaction made by John Smith, 123 Main St, Newport Beach, Calif. 92660, Account Number 4123 4444 5555 6666, phone number 949-555-1122 can be provided to merchant analysis system with a consumer identification number of 98765. When John Smith makes additional purchases, each of his consumer transactions will be received by the merchant analysis system with consumer identification number 98765. In some embodiments, the merchant analysis system can assign a unique consumer identification number when it imports the financial transaction data into the object model.

In some embodiments, the merchant analysis system can map the financial data transaction to geohash regions (step 530). A geohash region, or geohash bucket, is a region associated with a latitude/longitude, hierarchal geocode system that subdivides regions of the Earth into grid shaped buckets. The level of granularity of geohash regions can vary depending on the length of the geohash code corresponding to that region. For example, a geohash code that is one bit in length corresponds to a geohash region of roughly 20 million square kilometers, and a geohash code that is six bits in length corresponds to a geohash region of roughly 1.2 square kilometers. In some embodiments, a geohash region of five bits (roughly 18 square kilometers) is preferred, although the size of the geohash region can depend on the character of the overall region which is being geohashed. For example, a six bit geohash can be more suitable for a densely populated urban area, while a four bit geohash can be more suitable for a sparsely populated rural area.

In some embodiments, the merchant analysis system can map the financial transaction data to a geohash region by utilizing a standard geohash translation library. For example, the merchant analysis system can pass as input the address of the consumer associated with a consumer transaction of the financial transaction data and specify the number of geohash bits to return for the address, and the library can return the geohash for the passed in address. As the returned geohash code represents a level of precision for a given address, two addresses that are in the same geohash region will return the same geohash code. In some embodiments, the geohash translation library, or API, can be offered or exposed by the geographic data systems (e.g., geographic data systems 230).

After the merchant analysis system maps the financial transaction data to one or more geohash regions, the merchant analysis system can associate features to the geohash region (step 540). According to some embodiments, a feature is some characteristic of the financial transaction data or consumer data that describes some aspect of the geohash region. For example, a feature could be a demographic feature such as the income, gender, age, employment status, home ownership status, or ethnicity of the consumers residing within the geohash region. In some embodiments, a feature can also be a transactional feature of financial data. For example, a transactional feature can include total number of transactions originating from consumers residing in the geohash region, transactions (or "tickets") above a particular value originating from the geohash region, or other features relating to the financial transaction data. According to some embodiments, the merchant analysis system associates features through the use of the object model and the relationship between the financial transaction data and the consumer data as defined in the schema map or the ontology.

Returning to FIG. 4, after the merchant analysis system has analyzed the received data, it can apply a prediction model to the data (step 430). A prediction model, in some embodiments, is a model that attempts to predict the performance for a particular merchant location. The performance can be measured in total sales, total transactions, or sales or transactions for a particular demographic feature (e.g., $1200 for males making over $100,000 a year). In addition, the prediction model can be used to predict performance based on the category of shopper. For example, the merchant analysis system can determine the spending habits of a particular consumer based on the financial transaction data and the consumer data analyzed by the merchant analysis system. For example, the merchant analysis system can determine that a particular consumer is a frequent purchaser of clothing, shoes, or electronics, or it can determine that the a consumer frequents restaurants or certain types of restaurants. Further, the merchant analysis system can determine the number of consumers of a particular category that reside within a particular geohash region. In some embodiments, the merchant analysis system can use the category of shopper information to predict the performance of a merchant location. For example, the merchant analysis system can predict that a merchant location should receive $10,000 a month from clothing shoppers.

According to some embodiments, the merchant analysis system predicts the performance of a merchant location by aggregating the predicted performance for the merchant location for each geohash region that is within the merchant location's territory. For example, the merchant analysis system can use the following equation to determine the predicted performance for a merchant location:

$$P = \sum_{r \in G} n_r p_r x_r \quad (1)$$

where P is the performance of the merchant location, G is the set of all geohash regions in the merchant location's territory (the territory from which the merchant location expects sales), r is an index representing each of the geohash regions, $n_r$ is the number of consumers residing in geohash region r, $p_r$ is the probability that a shopper from geohash region r will shop at the merchant location, and $x_r$ is the expected spend amount associated with geohash region r across all competitors of the merchant location.

In some embodiments, the size of G can be variable and set by the merchant management system (or other computer system) requesting analysis of a merchant location it is managing. For example, a merchant location in an urban area might have a small G while a merchant location in a rural location can have a large G. In some embodiments, the merchant analysis system can limit the size of G to ensure efficient processing of predicted performance because as G increases, the number of calculations the merchant analysis system must complete to find P increases. For example, merchant analysis system can limit G to a five hundred square kilometer region so that calculations can be performed efficiently. In some embodiments, the size of G can be set through the use of a user interface, such as the exemplary user interface of FIGS. 6-10.

The number of consumers for a geohash region can be determined based on the consumer data the merchant analysis system receives. For example, the merchant analysis system can determine that all residents of a geohash region above a certain age are included in $n_r$. In some embodiments, the number of consumers for a geohash region that the merchant analysis system uses to determine predicted performance may be set through the use of a user interface, such as the exemplary user interface of FIGS. 6-10. For example, a filter can be applied so that only consumers of a certain gender or income level are included in $n_r$.

In some embodiments, $p_r$, the probability that a shopper from geohash region r will shop at the merchant location, is determined using a Huff model. The Huff model attempts to determine the probability that a consumer located at particular distance from a retail location will shop at the retail location. In some embodiments, the Huff model uses the following equation:

$$P_{ij} = \frac{A_j^\alpha D_{ij}^{-\beta}}{\sum_{j=1}^{n} A_j^\alpha D_{ij}^{-\beta} + C} \quad (2)$$

where i is a consumer, j is a retail location, $A_j$ is a measure of the attractiveness of store j, $D_{ij}$ is the distance from consumer i to store j, $\alpha$ is an attractiveness parameter estimated from empirical observations, $\beta$ is a distance decay parameter estimated from empirical observations, n is the total number of stores, including store j, in store j's retail area, and C is a constant representing sales leakage to non-retail location sales channels such as catalog sales and/or Internet sales, which has been estimated from empirical observations.

The numerator of equation (2) calculates the attractiveness to distance ratio for store j, while the denominator calculates the sum of the ratios of attractiveness to distance for store j and all of its competitors. In some embodiments, competitors include the same merchant as j, but in another location. The merchant analysis system can use a list of competitors provided to it by the merchant management systems as part of the merchant data it received (at step 410).

According to some embodiments, the attractiveness of a particular merchant location ($A_j$) is based on features of a particular merchant location. For example, the square footage, number of parking spaces, whether it is in a mall or shopping center, or pricing can be features that contribute to attractiveness of a particular merchant location. The value of the measure of attractiveness can be some index that combines one or more of these features into a single value. In some embodiments, an attractiveness parameter can be applied to the measure of attractiveness to weigh it according to how important the features contributing to the measure of attractiveness are in determining the probability that a particular consumer can make a purchase at the retail location. The attractiveness parameter can be adjusted overtime based on empirical observation.

In some embodiments, to calculate the distance from a geohash region to a retail location, the merchant analysis system calculates the distance from the centroid of the geohash region to the retail location. The merchant analysis system can calculate the distance using aerial distance, or it can calculate the distance using the driving or walking distance (e.g., using established roadways, walkways, or bicycle paths, where appropriate). In some embodiments, the merchant analysis system requests the geographic data systems to calculate the distance from the centroid of the geohash region to the retail location. The merchant analysis system can also use a distance decay parameter to weigh the impact of distance on the probability that a consumer from a geohash region would purchase an item from the retail location. For example, in rural locations, the large distances between consumers and retail locations is not as important as would be for urban locations. Thus, in some embodiments, the merchant analysis system can use a larger decay parameter in urban areas and a smaller one in rural areas.

Returning to equation (1) above, the merchant analysis system also determines the expected spend amount associated with geohash region or $x_r$. The expected spend amount is a learned value, or weight, that is determined using online machine learning applied to the financial transaction data that has been received over time for a particular store. In some embodiments, financial transaction data, including the demographic or transactional features used to determine the performance of the store, are selected from geohash regions around a merchant location to form a test data set. The merchant analysis system then feeds the test data set into an online machine learning algorithm, which uses the data in a series of trials. The first trial occurs at a first point in time using a seed value, and the spend amount is predicted for a second point in time. The actual spend for the second point in time is them compared to the predicted spend for the second point in time. The difference is then used by the online machine learning algorithm to construct a second trial. This feedback loop continues until the difference between the predicted and actual spend over the test data set is minimized, and the learned weight can then be used to determine performance according to equation (1) above. While the merchant analysis system can use any known online machine learning method for determining the learned weight, in some embodiments, the merchant analysis system uses the Vowpal Wabbit library for determining the learned weights.

After applying the prediction model to the received data, the merchant analysis system can determine the actual amount spent at the merchant location for which it is calculating performance (step 440). In some embodiments, merchant analysis system uses the financial transaction data it received to determine the actual spend amount. For example, merchant analysis system 210 can add up all of the consumer transactions associated with the merchant location that match the features for which the merchant location's performance is being measured.

After it determines the actual spend amount for a merchant location, the merchant analysis system can determine performance of the merchant location (step 450) by comparing the predicted performance (at step 430) to the actual spend amount (at step 440), and express that performance through the use of a generated user interface (step 460). The performance can be expressed as a percentage (e.g., −5%), in dollars (e.g., −$400,000), in transactions (e.g., −5000 transactions), and/or some other metric. In some embodiments, the merchant analysis system can express the performance of the retail location with a text string, such as "under-performing," "over-performing," or "performing as expected." In some embodiments, the user interface can include an icon or color to represent the performance of the merchant location. For example, an under-performing merchant location can be colored red.

In some embodiments, the merchant analysis system can generate one or more user interfaces communicating the financial transaction data, consumer data, and/or merchant data it received, as well as predicted and actual performance of merchant locations. According to some embodiments, the generated user interface contains a map showing one or more merchant locations, and/or one or more locations of the merchant's competitors. The merchant analysis system can generate a user interface by creating code that renders a user interface on another computing device, such as merchant management systems 240. For example, the merchant analysis system can generate HTML code that when interpreted by a web browser, renders the user interface. The merchant analysis system can also generate a user interface as a serialized object that is transmitted to a client application executing on other computing systems (e.g., merchant management systems 240), which then uses the serialized object to display the user interface on its screen.

FIGS. 6-10 illustrate several exemplary user interfaces that can be generated by merchant analysis system, consistent with embodiments of the present disclosure. The exemplary user interfaces of FIGS. 6-10 are meant to help illustrate and describe certain features of disclosed embodiments, and are not meant to limit the scope of the user interfaces that can be generated or provided by the merchant analysis system.

Figure 6A:
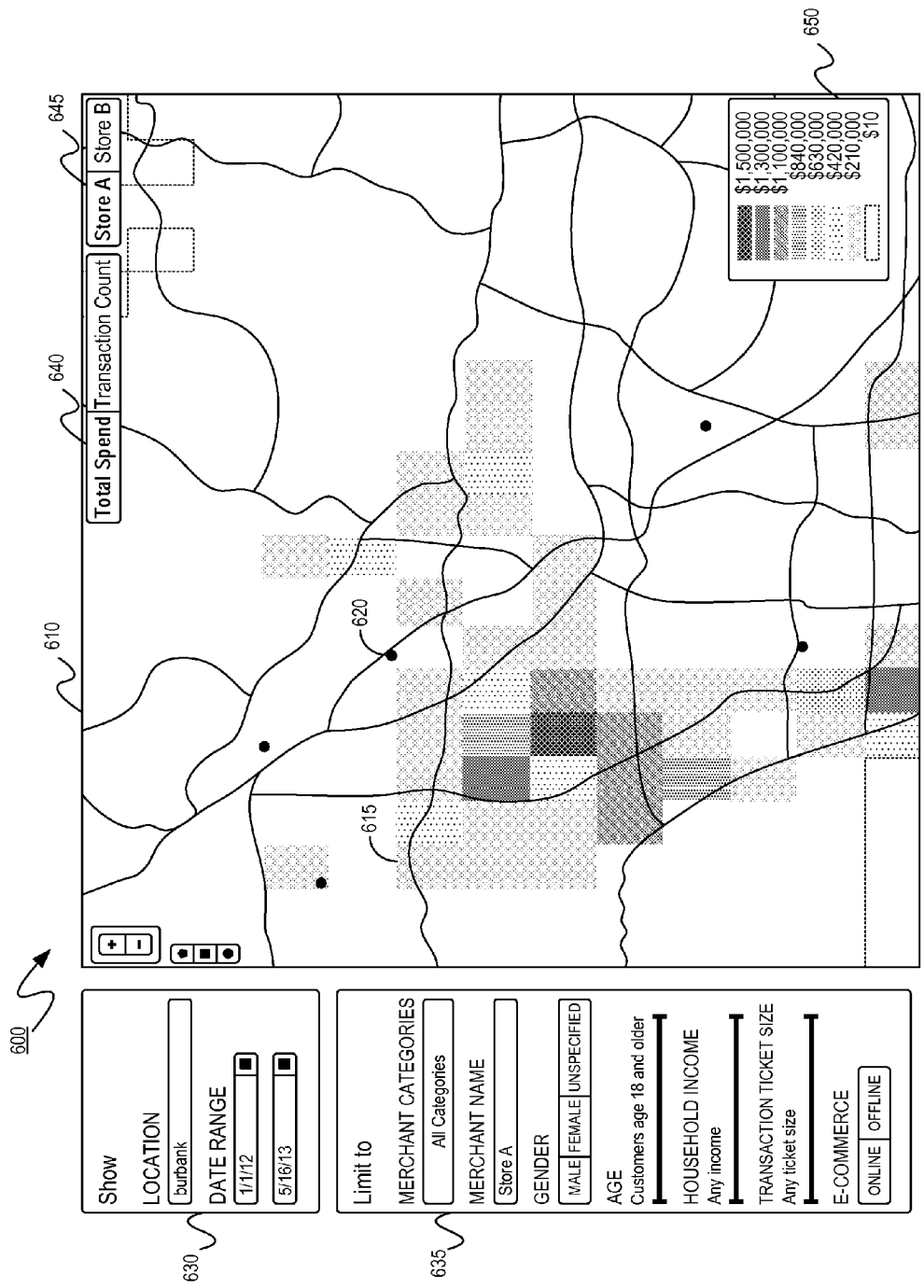
FIG. 6A is a screenshot of an exemplary depiction of a graphical user interface, consistent with embodiments of the present disclosure.
Figure 6B:
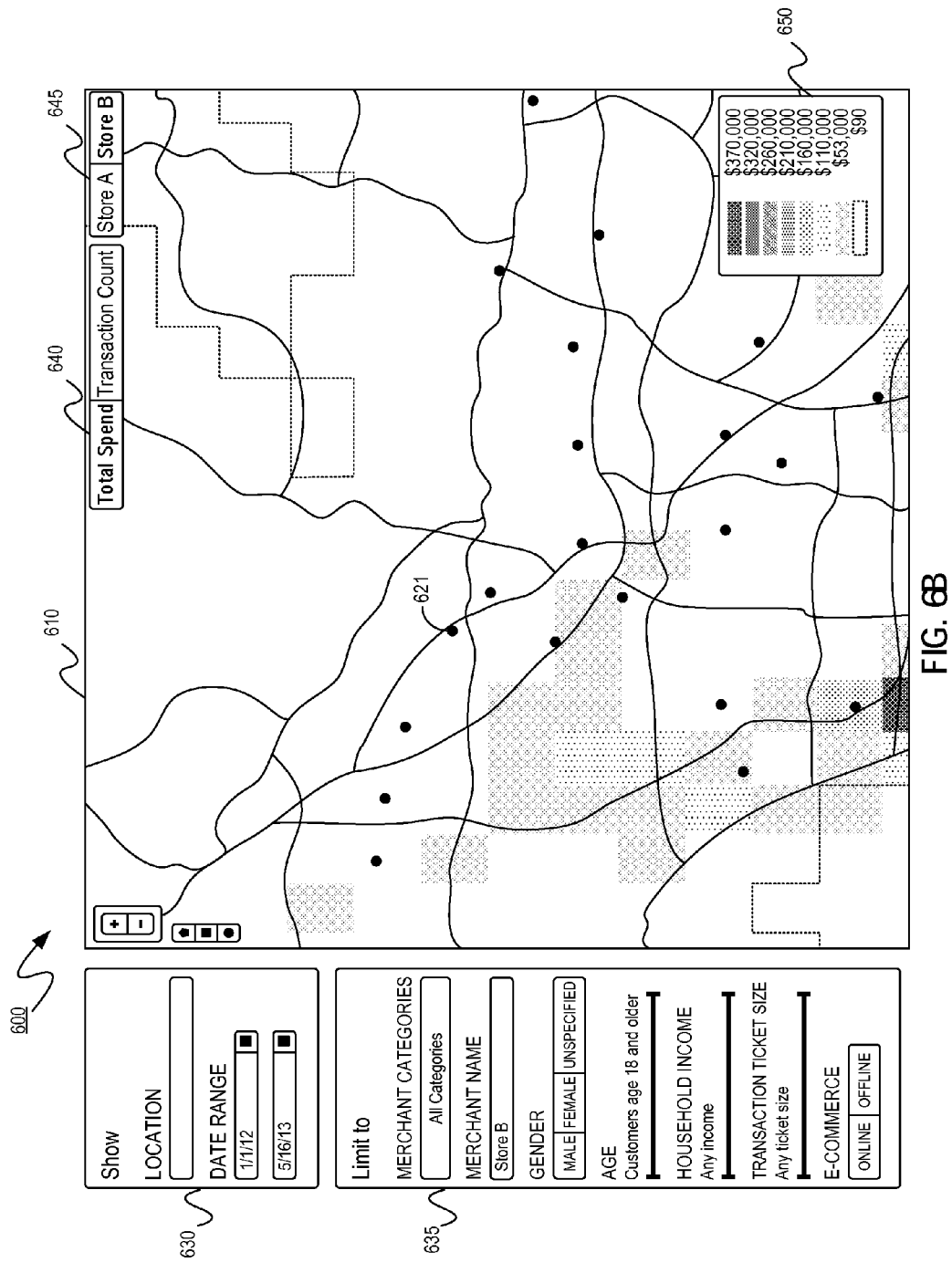
FIG. 6B is a screenshot of an exemplary depiction of a graphical user interface, consistent with embodiments of the present disclosure.

FIGS. 6A and 6B show user interface 600 that merchant analysis system (e.g., merchant analysis system 210) generates, according to some embodiments. User interface 600 includes map 610, which shows the location of merchant locations 620 and geohash regions (while shown as shaded rectangles, they can also include any unshaded rectangles, such as the unshaded rectangles in FIG. 7B). The user interface 600 also includes show user interface filter 630 and limit user interface filter 635. Show user interface filter 630 can be used to command the merchant analysis system to show a particular location (e.g., Burbank) and show data for a particular date range (e.g., Jan. 1, 2012 to May 16, 2013). In some embodiments, when a user enters information into the show user interface filter 630, the merchant analysis system receives a message to regenerate or modify the user interface. For example, if a user entered "Oceanside, Calif." into the location box, the merchant analysis system would receive a message indicating that a user interface should display a map for Oceanside, Calif., and it can generate a user interface with map 610 showing Oceanside, Calif. In some embodiments, when a user enters information into limit user interface 635, the merchant analysis system receives a message to modify information displayed on user interface 600.

User interface 600 includes performance display selector 640 and merchant selector 645. The performance display selector 640 can be used to command merchant analysis system to change the performance data being displayed for merchant locations mapped on map 610. For example, when "Total Spend" is selected, merchant analysis system 210 generates user interface 600 such that performance data is shown in the amount, in dollars, spent, and when "Transaction Count" is selected, the merchant analysis system generates user interface 600 such that performance data is shown in the number of transactions. Merchant selector 645 can be used to command the merchant analysis system to show merchant locations for particular merchants. For example, as shown in FIG. 6A, Store A is selected in merchant selector 645 and the merchant analysis system generates user interface 600 to show data associated with Store A: merchant locations 620 are the locations of Store A's retail locations and the performance data shown in user interface 600 is for Store A. When Store B is selected, as shown in FIG. 6B, merchant analysis system generates user interface 600 to show data associated with Store B: merchant locations 621 are the locations of Store B's retail locations and the performance data shown in user interface 600 is for Store B. In some embodiments, when merchant selector 645 is selected, the displayed merchant locations include both the locations for the selected store and the selected store's competitors. For example, after Store A is selected, merchant locations 610 may include locations for Store A, and locations for Store C, a competitor of Store A.

In some embodiments, the merchant analysis system generates user interface 600 with color coded geohash regions (e.g. geohash region 615). The geohash regions can be color coded or highlighted in various ways to reflect the total spend amount or transaction count (depending on the performance data metric selected in performance data selector 640). User interface 600 can include key 650 that informs a user of the amount of sales for a particular color. As shown in FIG. 6A, when no specific retail location is selected, geohash regions 615 can be color coded or highlighted with the performance data for all locations of the merchant. For example, as shown in FIG. 6A, the darkest of geohash regions 615 contributed $1,500,000 in transactions for all merchant locations of Store A.

In some embodiments, the merchant analysis system can receive an indication that one of the merchant locations was selected by a user and it can update or regenerate the user interface to reflect the selection. FIGS. 7A-7D show several user interfaces that the merchant analysis system can generate when one merchant location has been selected by a user, consistent with the disclosed embodiments.

Figure 7A:
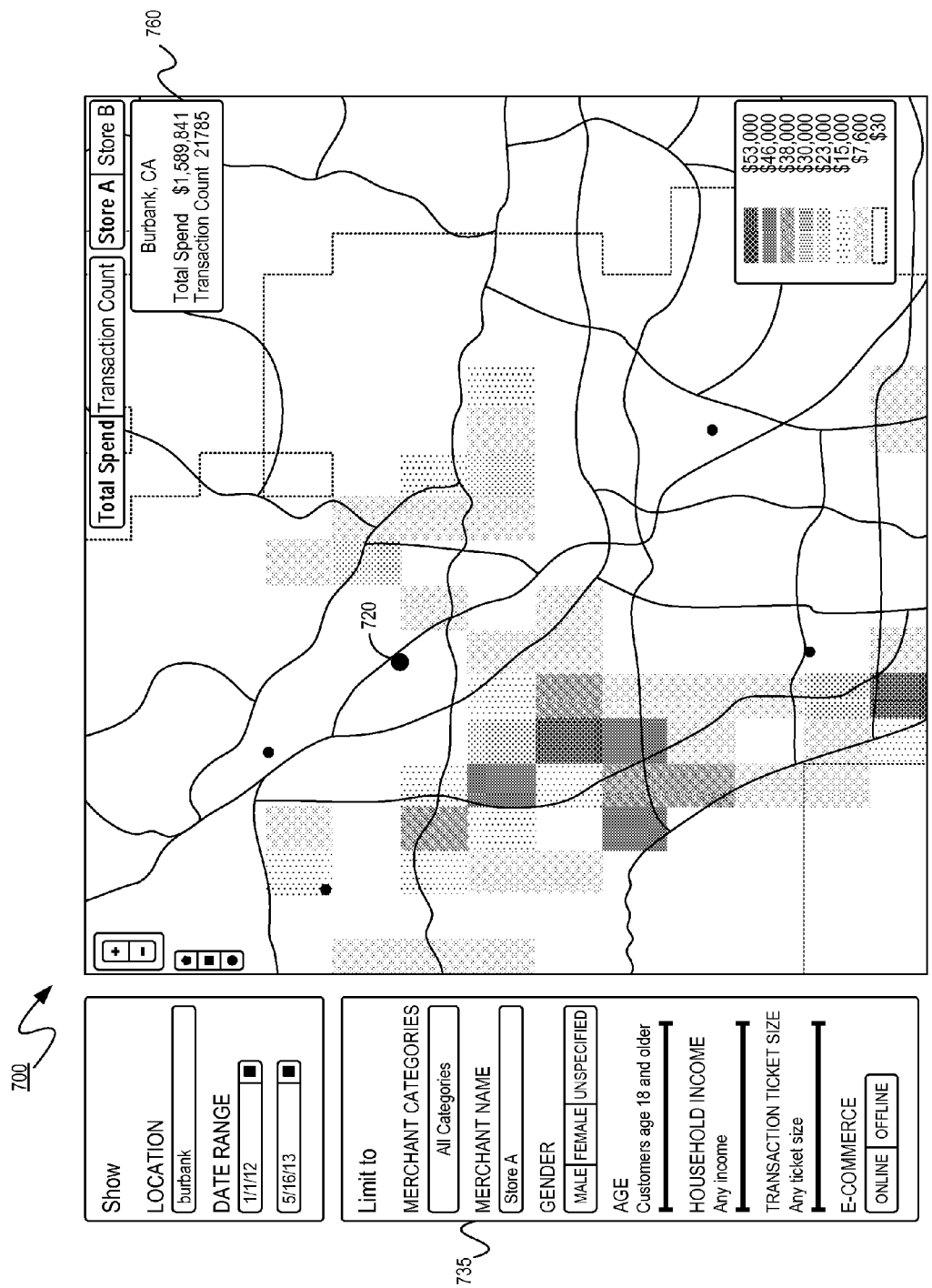
FIG. 7A is a screenshot of an exemplary depiction of a graphical user interface, consistent with embodiments of the present disclosure.

FIG. 7A illustrates user interface 700 including a map 710 where merchant location 720 has been selected. In response to receiving a message that merchant location 720 has been selected, the merchant analysis system generates user interface 700 to include performance data for merchant location 720. As shown in FIG. 7A, the geohash regions of map 710 are updated to reflect each geohash region's contribution to the performance of merchant location 720, i.e., the amount of spend or transactions of merchant location 720 that originated from that geohash region. In some embodiments, user interface 700 can also include performance element 760, which displays performance data for selected merchant location 720.

Figure 7B:
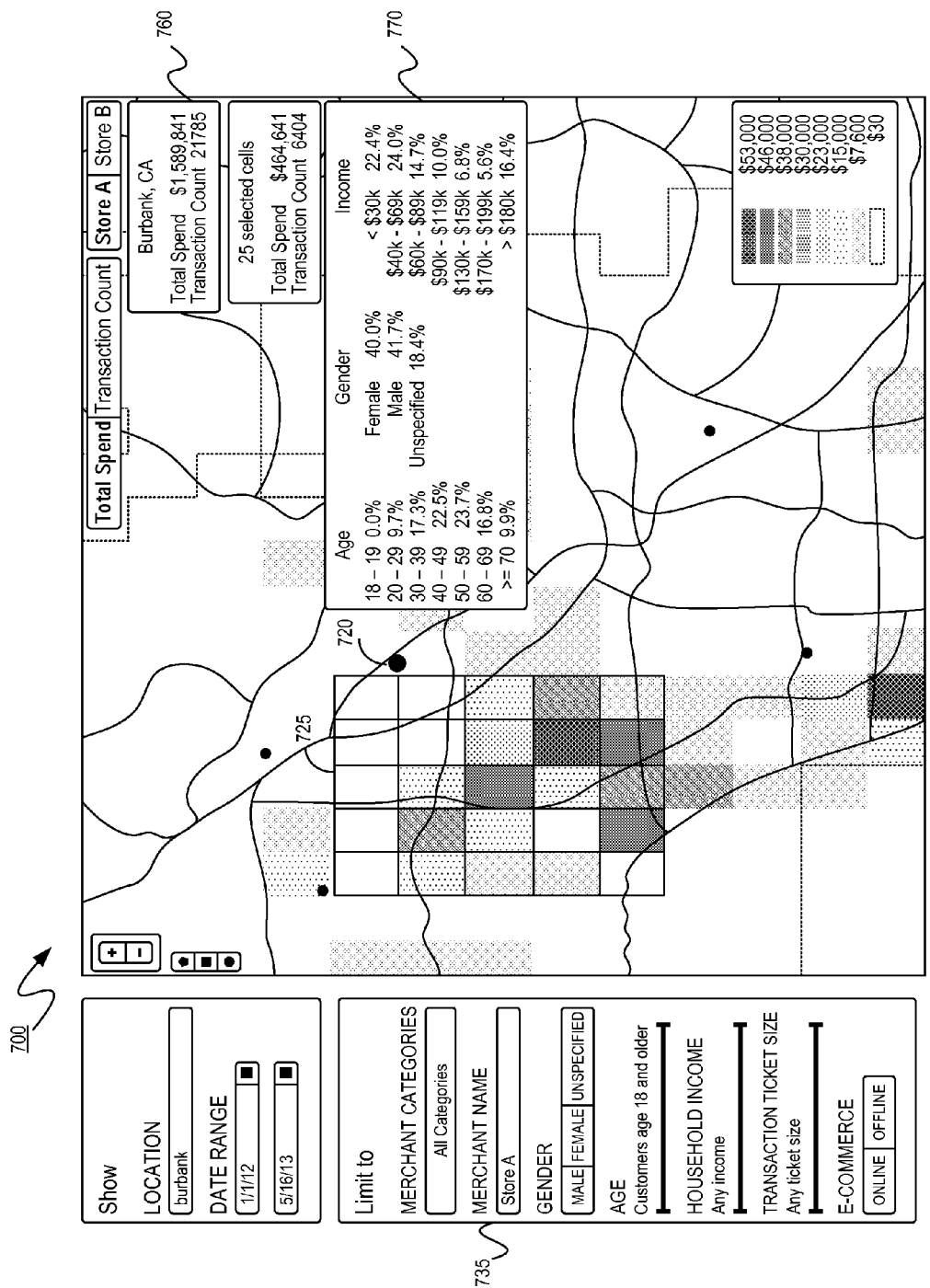
FIG. 7B is a screenshot of an exemplary depiction of a graphical user interface, consistent with embodiments of the present disclosure.

In some embodiments, the merchant analysis system generates user interface 700 and provides the ability for a user to select a group of geohash regions and display performance data for those geohash regions. FIG. 7B shows a selected group of geohash regions 725. When the merchant analysis system receives a command that one or more geohash regions were selected, it can regenerate user interface 700 to reflect performance data for the selected geohash regions. In some embodiments, user interface 700 can also include feature display 770, which shows feature characteristics for the selected geohash regions.

Figure 7C:
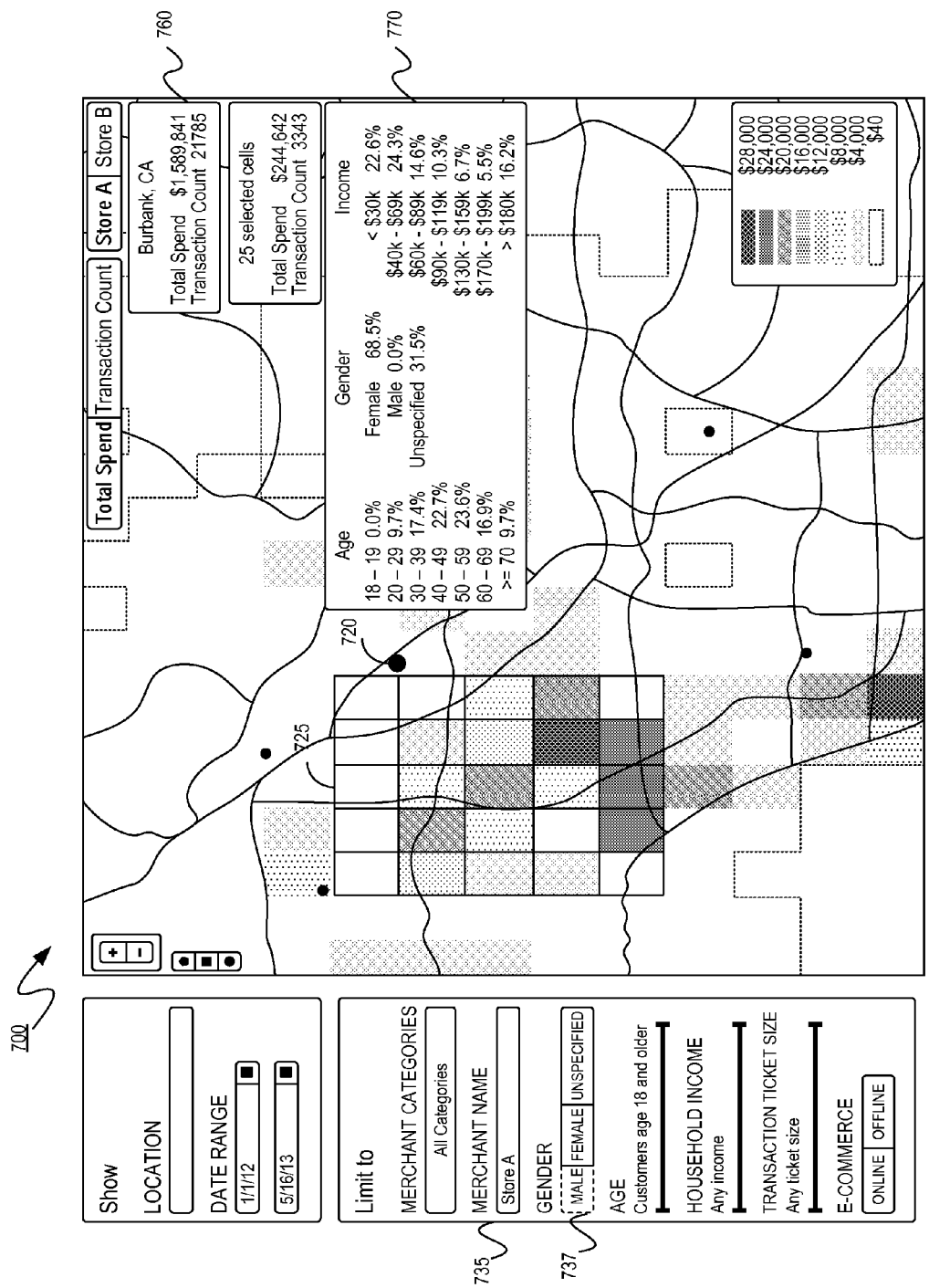
FIG. 7C is a screenshot of an exemplary depiction of a graphical user interface, consistent with embodiments of the present disclosure.
Figure 7D:
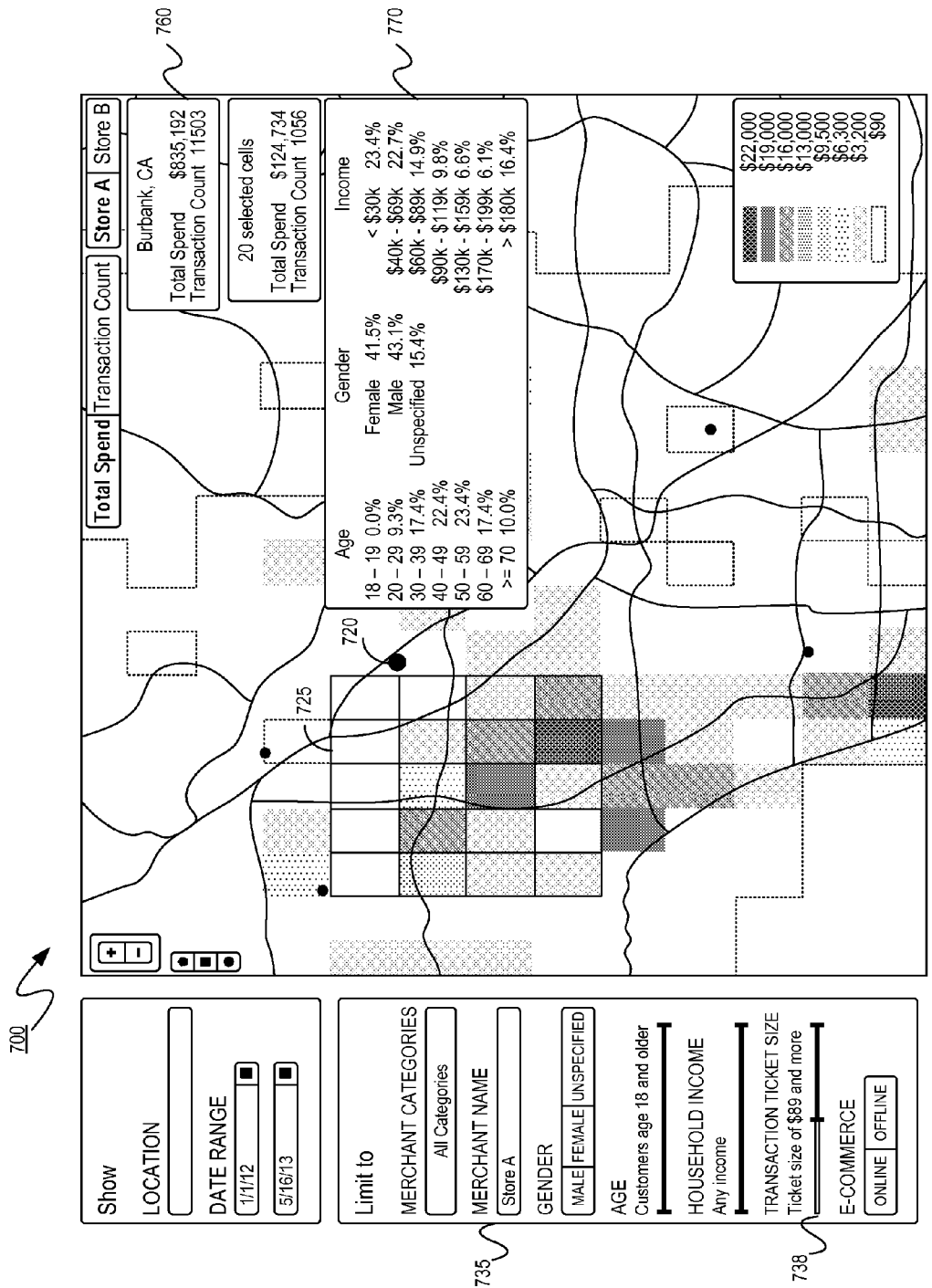
FIG. 7D is a screenshot of an exemplary depiction of a graphical user interface, consistent with embodiments of the present disclosure.

As noted above with respect to FIGS. 6A-6B, user interface 700 can include limit user interface element 735. As shown in FIG. 7C, limit user interface element 735 can include a gender filter 737 and user interface 700 can reflect data corresponding to selected genders. For example, as shown in FIG. 7B, user interface 700 is not displaying performance data for males as males have been deselected in gender filter 737. Limit user interface element 735 can also include transaction ticket size filter 738 (shown in FIG. 7D), which can be used to limit the size of transactions shown by user interface 700. When a transaction ticket size is selected, the merchant analysis system can regenerate or update user interface 700 to show performance using financial transaction data satisfying the selected transaction ticket size.

Figure 8A:
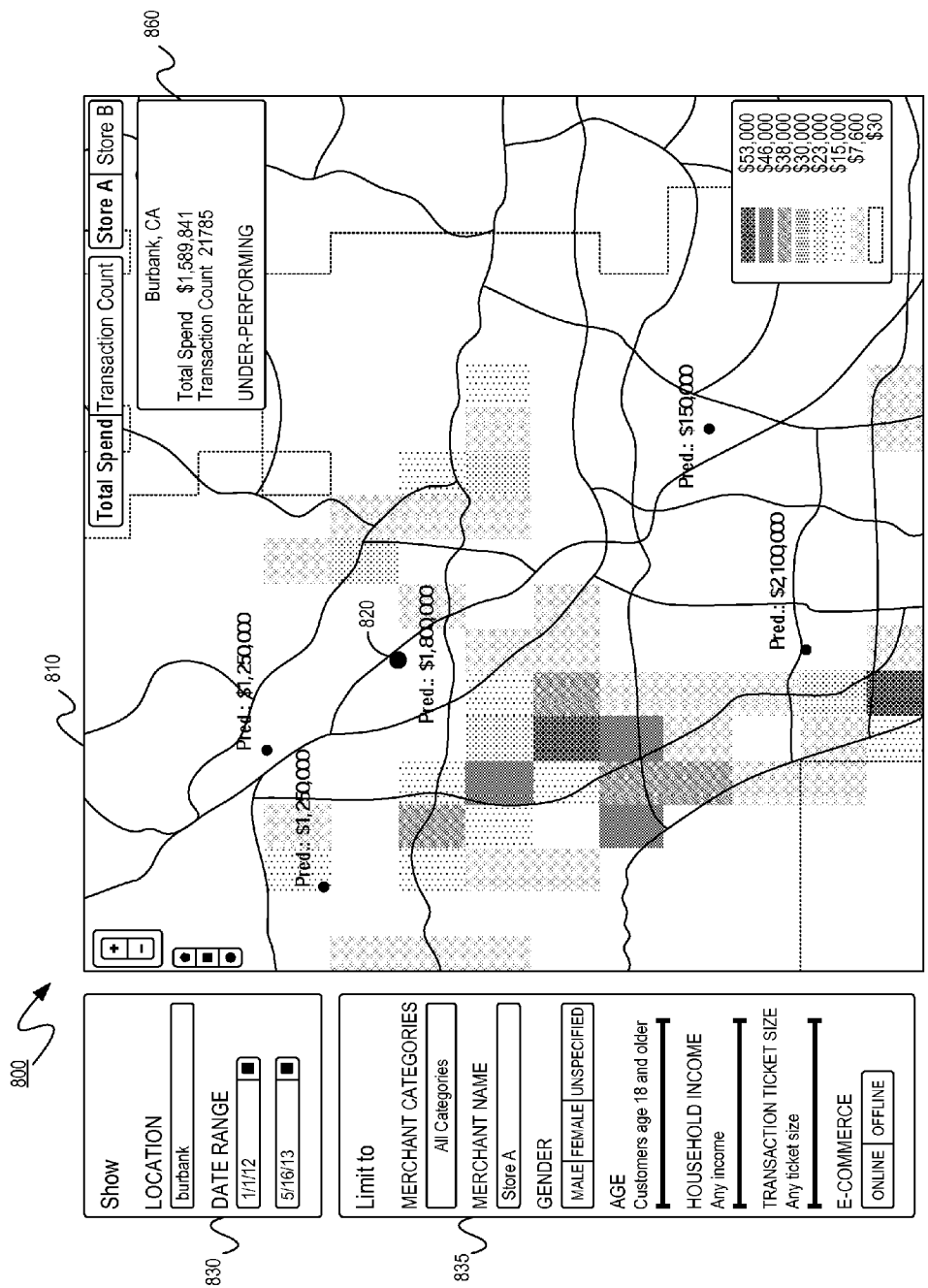
FIG. 8A is a screenshot of an exemplary depiction of a graphical user interface, consistent with embodiments of the present disclosure.
Figure 8B:
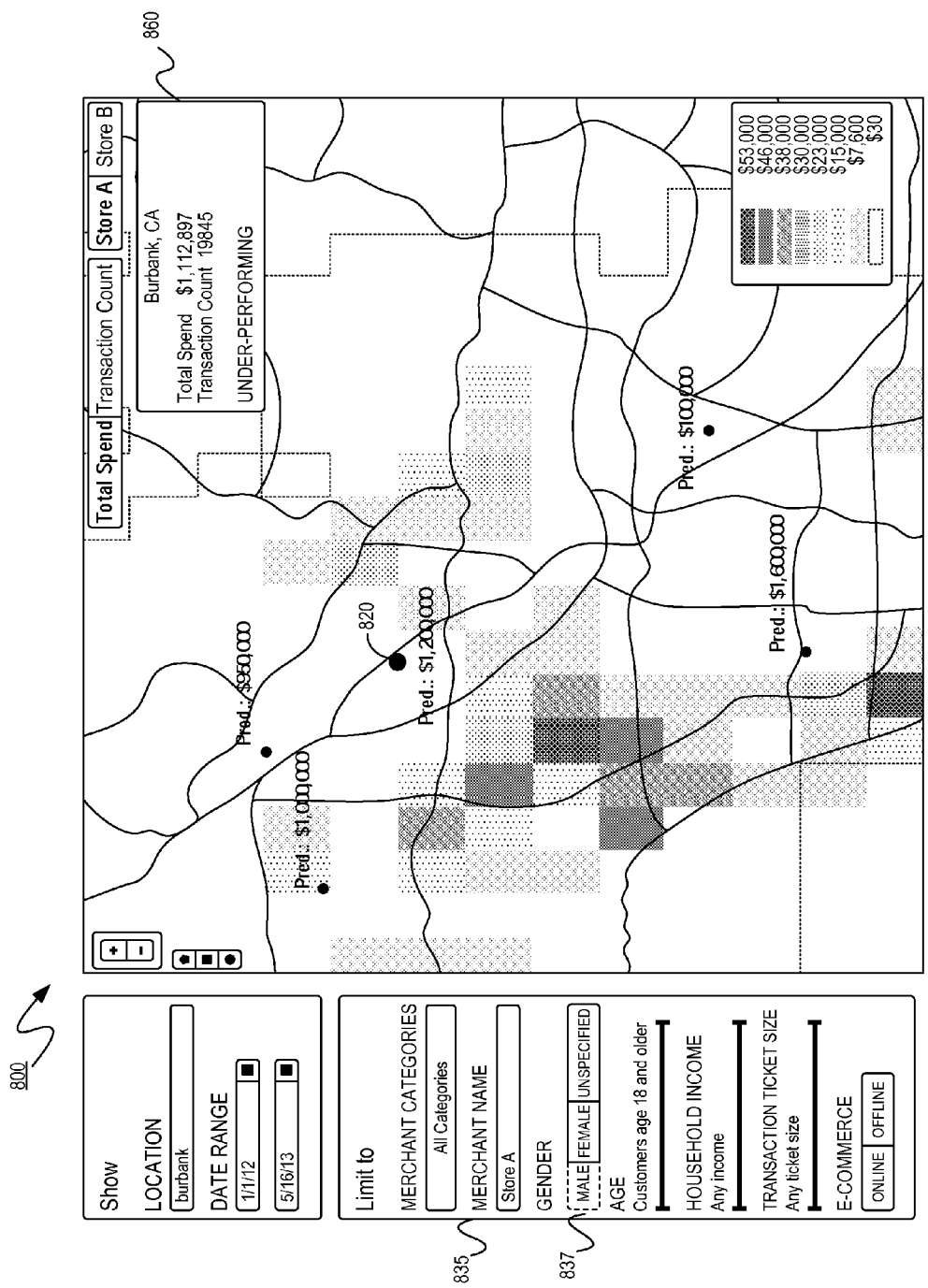
FIG. 8B is a screenshot of an exemplary depiction of a graphical user interface, consistent with embodiments of the present disclosure.

In some embodiments, the merchant analysis system can generate a user interface that includes predicted performance for merchant locations. FIGS. 8A-8B illustrate user interface 800 including predicted performance, consistent with embodiments of the present disclosure. User interface 800 includes map 810 which shows several merchant locations. According to some embodiments, user interface 800 includes indications of the predicted performance for each of the merchant locations. For example, as shown in FIG. 8A, the predicted performance in total spend amount is shown for each merchant location. When a merchant location is selected, the merchant analysis system can update user interface 800 to reflect performance data for the selected merchant location. In some embodiments, user interface 800 can include performance element 860, which displays the total spend and transaction count for the selected merchant, as well as an indication of performance (e.g., the text "UNDER-PERFORMING").

According to some embodiments, in addition to displaying performance data, user interface 800 can include one or more of the features described above with respect FIGS. 6-7. For example, as shown in FIG. 8B, user interface 800 can include limit user interface element 835 and gender filter 837. When males are deselected from the gender filter, the user interface 800 can display performance data with respect to all consumers that are not male (i.e., female and unspecified consumers). Other filters can be used to limit the display of predicted performance data to certain features. For example, limit user interface element 835 can provide filters for merchant categories, age, income, transaction ticket size, or whether the transaction was associated with an e-commerce channel. In addition, predicted performance displayed can also be limited to category of shopper or other features consistent with disclosed embodiments.

Figure 9:
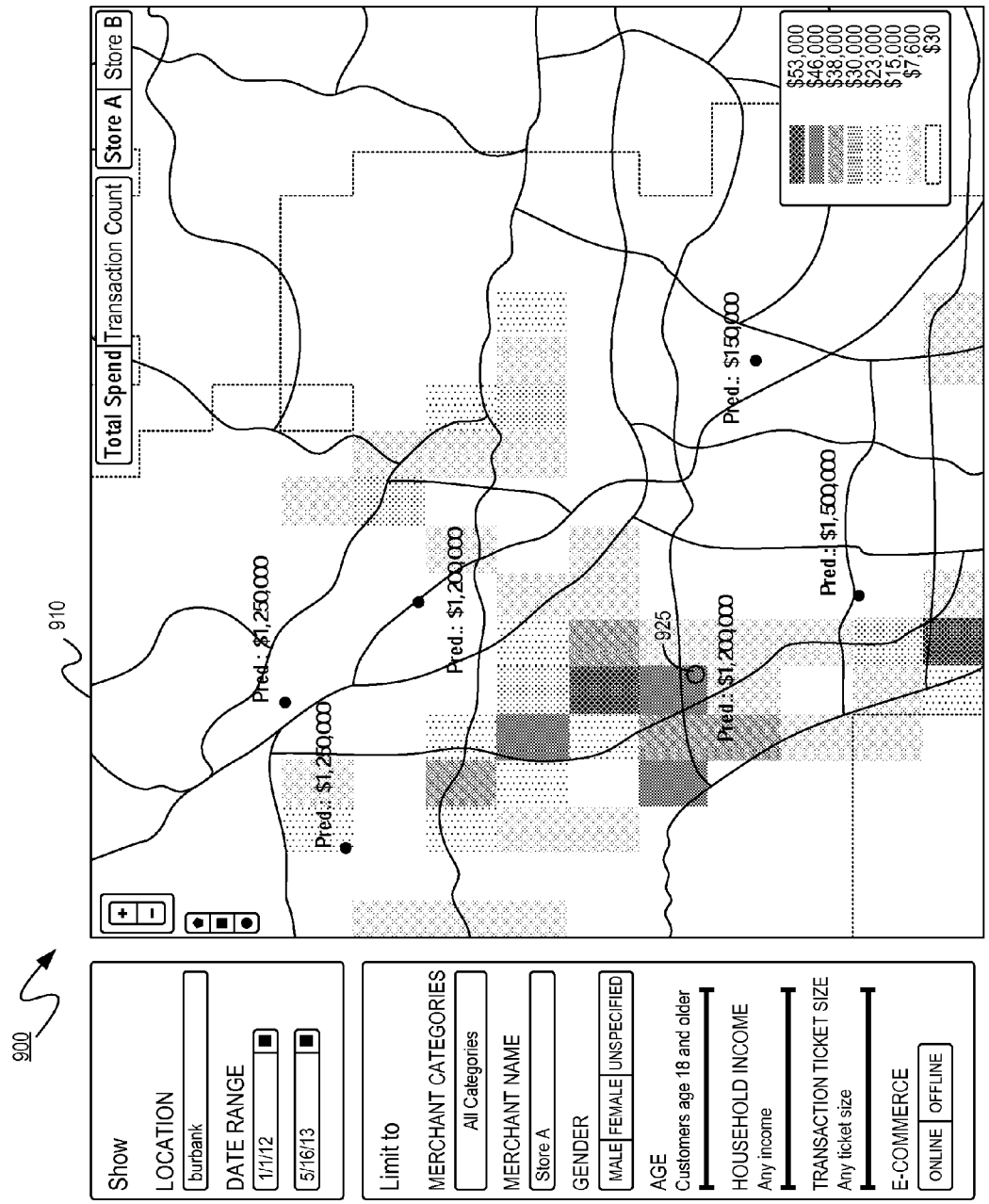
FIG. 9 is a screenshot of an exemplary depiction of a graphical user interface, consistent with embodiments of the present disclosure.

In some embodiments, the merchant analysis system can predict revenue for a hypothetical entity location, with certain attractiveness attributes, at a particular placement. FIG. 9 shows user interface 900 including hypothetical entity location at placement 925. According to some embodiment, user interface 110 can provide the ability to select the placement of hypothetical entity location 925 by providing the ability to select a region on map 910 using an input device, such as a mouse or touchscreen. When a region on map 910 is selected, the merchant analysis system can receive a message containing the coordinates associated with the selection region, and it can then apply prediction models to the hypothetical entity location, and other entity locations within the same area as the hypothetical entity location, as described above with respect to FIG. 4 and equations (1) and (2). After the predicted spend amount for each entity location is determined (including for the hypothetical entity location), the merchant analysis system can generate or update user interface 900 to display the predicted spend. For example, as shown in FIG. 9, hypothetical entity location 925 has a predicted spend amount of $1,200,000.

Figure 10:
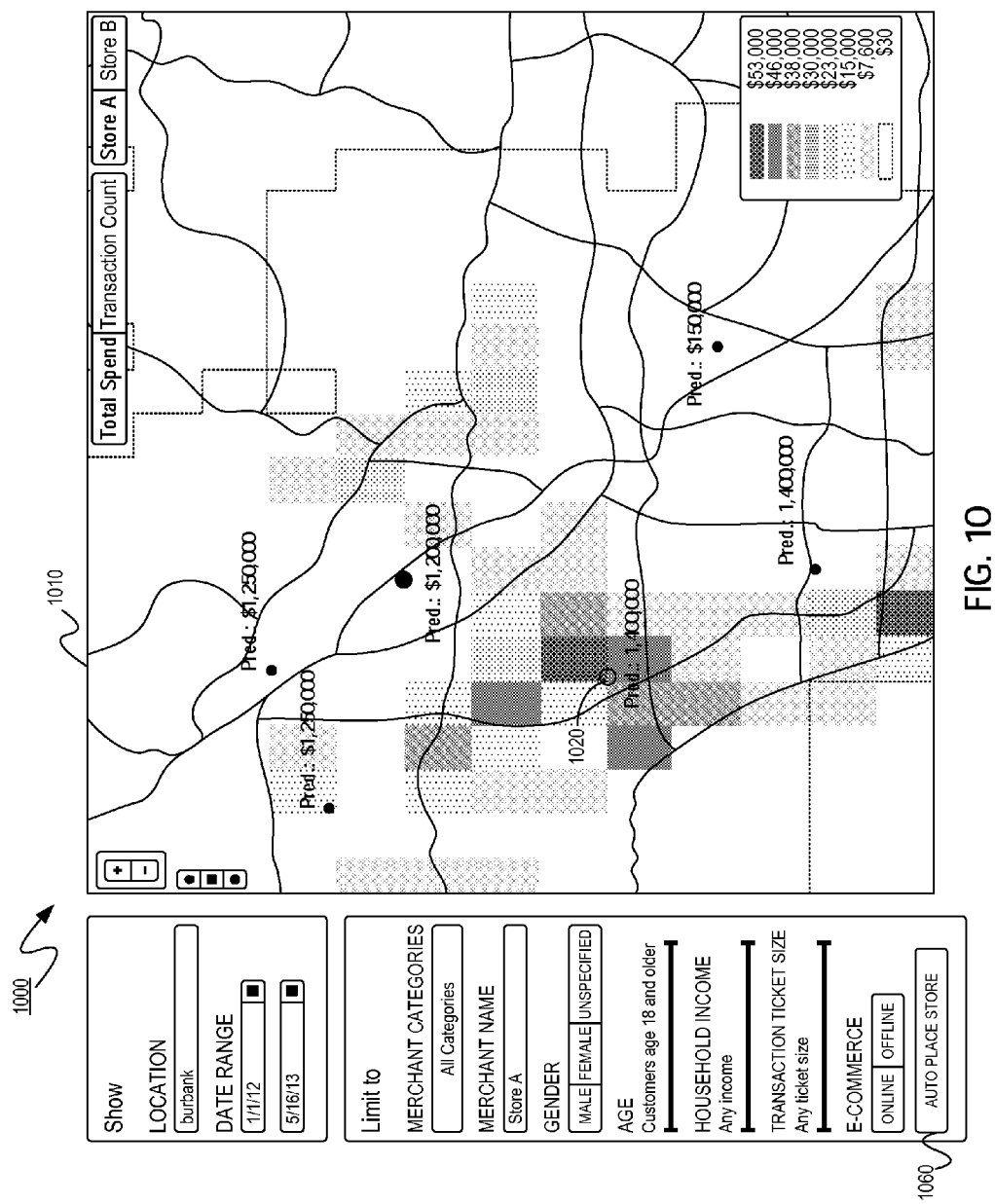
FIG. 10 is a screenshot of an exemplary depiction of a graphical user interface, consistent with embodiments of the present disclosure.

According to some embodiments, the merchant analysis system can provide the ability to automatically place a store at an optimal placement based on the financial transaction data and the location of existing stores. FIG. 10 shows user interface 1000 with auto place button 1060. When selected, auto place button 1060 sends a message to the merchant analysis system to determine the optimal placement for a new retail location. In some embodiments, the merchant analysis system uses equations (1) and (2) described above with several hypothetical placements to the determine the optimal placement. Once determined, the merchant analysis system can generate user interface 1000 showing optimal placement 1020 on map 1010.

In the foregoing specification, embodiments have been described with reference to numerous specific details that can vary from implementation to implementation. Certain adaptations and modifications of the embodiments described herein can be made. Therefore, the above embodiments are considered to be illustrative and not restrictive.

What is claimed is:
1. A system for analyzing organizational entity performance, the system comprising:
 a memory device that stores a set of instructions;
 one or more processors configured to execute the set of instructions that cause the one or more processors to:

receive data associated with a geographic region, the geographic region including a plurality of distinct merchant stores, wherein the received data is transformed into an object model using a schema map and an ontology, the object model comprising objects, properties and relationships;

analyze the object model to associate the received data with an organizational entity and to associate the received data with a plurality of sub-geographic regions of the geographic region;

apply a prediction model to the plurality of sub-geographic regions using the object model to determine a predicted performance associated with the organizational entity; and provide a user interface that includes information associated with the predicted performance.

2. The system of claim 1 wherein the received data includes at least one of financial transaction data, consumer data associated with the geographic region, or entity data associated with the organizational entity.

3. The system of claim 1 wherein the user interface includes:
a representation of the geographic region;
a representation of locations of the organizational entity overlayed on the geographic region; and
a representation of the sub-geographic regions overlayed on the geographic region.

4. The system of claim 1 wherein the predicted performance includes determining the predicted spend amount associated with the organizational entity based on the object model.

5. The system of claim 4 wherein the user interface further includes:
a representation of the predicted spend amount for the sub-geographic regions associated with the organizational entity.

6. The system of claim 1 wherein the user interface further includes:
a representation of the predicted performance associated with the organizational entity.

7. The system of claim 1 wherein the one or more processors are further configured to receive a placement of a hypothetical entity location of the organizational entity wherein applying the prediction model further uses the placement of the hypothetical entity location to determine a predicted performance associated with the organizational entity.

8. The system of claim 7 wherein the one or more processors are further configured to determine the predicted performance for the hypothetical entity location.

9. The system of claim 1 wherein the one or more processors are further configured to determine a placement for a hypothetical entity location of the organizational entity based on the object model.

10. A method for analyzing organizational entity performance, the method being performed by one or more processors of one or more computers and comprising:
receiving data associated with a geographic region, the geographic region including a plurality of distinct merchant stores, wherein the received data is transformed into an object model using a schema map and an ontology, the object model comprising objects, properties and relationships;
analyzing the object model to associate the received data with an organizational entity and to associate the received data with a plurality of sub-geographic regions of the geographic region;
applying a prediction model to the plurality of sub-geographic regions using the object model to determine a predicted performance associated with the organizational entity; and
providing a user interface that includes information associated with the predicted performance.

11. The method of claim 10 wherein the received data includes at least one of financial transaction data, consumer data associated with the geographic region, or entity data associated with the at least one organizational entity.

12. The method of claim 10 wherein the user interface includes:
a representation of the geographic region;
a representation of locations of the organizational entity overlayed on the geographic region; and
a representation of the sub-geographic regions overlayed on the geographic region.

13. The method of claim 10 wherein predicted performance includes determining the predicted spend amount associated with the organizational entity based on the object model.

14. The method of claim 13 wherein the user interface further includes:
a representation of the predicted spend amount for the sub-geographic regions associated with the organizational entity location.

15. The method of claim 10 further including receiving a placement of a hypothetical entity location of the organizational entity and wherein applying the prediction model further uses the placement of the hypothetical entity location to determine a predicted performance associated with the organization entity.

16. The method of claim 15 further including determining the predicted performance for the hypothetical entity location.

17. The method of claim 10 further including determining a placement for a hypothetical entity location of an organizational entity based on the object model.

18. A non-transitory computer readable medium that stores a set of instructions that are executable by at least one processor of one or more computers to cause the one or more computers to analyze organizational entity performance, the set of instructions causing the one or more computers to:
receive data associated with a geographic region, the geographic region including a plurality of distinct merchant stores, wherein the received data is transformed into an object model using a schema map and an ontology, the object model comprising objects, properties and relationships;
analyze the object model to associate the received data with at least one organizational entity and to associate the received data with a plurality of sub-geographic regions of the geographic region;
apply a prediction model to the plurality of sub-geographic regions using the object model to determine a predicted performance associated with the organizational entity; and
provide a user interface that includes information associated with the predicted performance.

19. The non-transitory computer readable medium of claim 18 further comprising instructions executable for the at least one processor of the one or more computers to cause the one or more computers to perform:
receiving a placement of a hypothetical entity location of the organizational entity and wherein applying the prediction model further uses the placement of the hypothetical entity location to determine a predicted performance associated with the organization entity.

20. The non-transitory computer readable medium of claim 18 further comprising instructions executable for the at least one processor of the one or more computers to cause the one or more computers to perform:
   determining the predicted performance for the hypothetical entity location.

\* \* \* \* \*